United States Patent
Crouse et al.

(10) Patent No.: US 11,935,424 B2
(45) Date of Patent: *Mar. 19, 2024

(54) SYSTEMS AND METHODS FOR AUTOMATIC DISTILLATION OF CONCEPTS FROM MATH PROBLEMS AND DYNAMIC CONSTRUCTION AND TESTING OF MATH PROBLEMS FROM A COLLECTION OF MATH CONCEPTS

(71) Applicant: ValueCorp Pacific, Incorporated, Westlake Village, CA (US)

(72) Inventors: Mark S. Crouse, Westlake Village, CA (US); Fredric C. Gey, Berkeley, CA (US); Terry J. Ligocki, Pinole, CA (US)

(73) Assignee: ValueCorp Pacific, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,969

(22) Filed: Jan. 17, 2023

(65) Prior Publication Data
US 2023/0282132 A1 Sep. 7, 2023

Related U.S. Application Data

(63) Continuation of application No. 15/275,335, filed on Sep. 23, 2016, now Pat. No. 11,557,222.
(Continued)

(51) Int. Cl.
G09B 19/02 (2006.01)
G09B 5/00 (2006.01)
(Continued)

(52) U.S. Cl.
CPC ............ *G09B 19/025* (2013.01); *G09B 5/00* (2013.01); *G09B 7/00* (2013.01); *G09B 19/00* (2013.01)

(58) Field of Classification Search
CPC .......... G09B 19/025; G09B 5/00; G09B 7/00; G09B 19/00
See application file for complete search history.

(56) References Cited

U.S. PATENT DOCUMENTS 6,018,617 A * 1/2000 Sweitzer .................. G09B 7/02
434/350
6,263,335 B1 * 7/2001 Paik ...................... G06F 16/367
707/999.005

(Continued)

*Primary Examiner* — Eddy Saint-Vil
(74) *Attorney, Agent, or Firm* — K&L Gates LLP

(57) ABSTRACT

Systems and methods of automatically distilling concepts from math problems and dynamically constructing and testing the creation of math problems from a collection of math concepts comprising: providing a user interface to a user; receiving as input: a math problem; one or more math concepts; and/or a user data packet; extracting and compiling a concept cloud of one or more CLIs that comprise the mathematical concepts embodied in the input, describe the operation of the one or more math concepts, or relate to the UDP, respectively; generating one or more math problem building blocks from the concept cloud CLIs; applying a mathematical rules engine to the one or more math problem building blocks to build one or more additional math problems; and returning to the user, through the user interface, the one or more additional math problems built from the CLIs that define the concept cloud extracted from the input.

19 Claims, 17 Drawing Sheets

Related U.S. Application Data

(60) Provisional application No. 62/373,198, filed on Aug. 10, 2016, provisional application No. 62/222,591, filed on Sep. 23, 2015.

(51) Int. Cl.
*G09B 7/00* (2006.01)
*G09B 19/00* (2006.01)

(56) References Cited

U.S. PATENT DOCUMENTS

| | | | | |
|---|---|---|---|---|
| 6,421,061 B1* | 7/2002 | Sudoh | ...................... | G09B 5/00 345/643 |
| 8,202,097 B1* | 6/2012 | Brittingham | ............. | G09B 7/00 434/323 |
| 2004/0122844 A1* | 6/2004 | Malloy | .................. | G06F 16/283 707/999.102 |
| 2008/0104032 A1* | 5/2008 | Sarkar | .................... | G06F 16/958 707/999.102 |
| 2008/0312885 A1* | 12/2008 | Chu | ........................ | G06F 17/11 703/2 |
| 2009/0017427 A1* | 1/2009 | Kunz | .................... | G09B 19/025 434/188 |
| 2012/0329029 A1* | 12/2012 | Rauta | ....................... | G09B 7/02 434/350 |
| 2013/0212060 A1* | 8/2013 | Crouse | .................. | G06F 16/367 707/602 |
| 2013/0295537 A1* | 11/2013 | Park | ......................... | G09B 7/00 434/201 |
| 2015/0004585 A1* | 1/2015 | Das | .......................... | G09B 7/02 434/276 |
| 2015/0026188 A1* | 1/2015 | Crouse | .................. | G06F 16/367 707/741 |

\* cited by examiner

| To Obtain this System Response... | ... This Would be the General Function |
|---|---|
| 12<br>+27 | addition (addend 1, addend 2, addend 3,... addend *n*)<br>↓<br>of type ⎡ integer ⟹ # of digits<br>⎢ real ⟹ # of digits, # of decimals<br>⎢ imaginary ⟹ a + b*i*<br>⎣ irrational ⟹ function (argument 1)(e.g., √2) |
| 4 + 7 | integer - add (addend 1, addend 2 ... addend *n*)<br>↳ integer (# of digits)<br>(± sign) |
| 4.2 + 6.9 | real - add (addend 1, addend 2 ... addend *n*)<br>↳ real (# of digits / # of decimals) |
| (4 + 2*i*) + (6 + 9*i*) | imaginary - add (addend 1, addend 2 ... addend *n*)<br>↳ imaginary → ( a real (# of digits / # of decimals)<br>+<br>b*i* pure imaginary ) |
| √2 + ³√6<br>π + 2π | irrational - add (addend 1, addend 2 ... addend *n*)<br>↳ irrational → (root (2 (½), etc., etc.)) |

| To Obtain this System Response... | ... This Would be the General Function |
|---|---|
| $x^2 + y + 3xy + y^2$<br>$+ 2x^2 + 4xy - y^2$<br>$3x^2 ...$ | variable (name, exponent)   variable [(x, 2) = $x^2$<br>                                            variable [(y, 1) = y<br>                                            variable ⎡(x, 1)<br>                                                      ⎢(y, 1)  = 3xy<br>                                                        ⎣(3, integer) |

FIG. 6

SYSTEMS AND METHODS FOR AUTOMATIC DISTILLATION OF CONCEPTS FROM MATH PROBLEMS AND DYNAMIC CONSTRUCTION AND TESTING OF MATH PROBLEMS FROM A COLLECTION OF MATH CONCEPTS

CROSS-REFERENCE TO RELATED APPLICATIONS

This application comprises a continuation application of U.S. application Ser. No. 15/275,335 filed Sep. 23, 2016, which incorporates by reference and claims the benefit of priority to U.S. Provisional Application No. 62/373,198 filed on Aug. 10, 2016 and U.S. Provisional Application No. 62/222,591 filed on Sep. 23, 2015.

BACKGROUND OF THE INVENTION

The present subject matter relates generally to systems and methods of automatically distilling concepts from math problems and dynamically constructing and testing the creation of math problems from a collection of math concepts. In addition, the present subject matter provides systems and methods of using branching algorithms to test and map a user's skills.

Teachers and students approach the study of mathematics with widely divergent skill sets and are required to work with textbooks and supplementary materials selected by their school, school district, state, or perhaps national department of education. These conditions can make it difficult to consistently achieve world-class results for all students at any grade level for any given math subject.

In math education, many discussions lead by teachers and explanations written in textbooks skip or gloss over the intermediate concepts required for a student to progress from concept a to concept n. As a result, many talented students may question their natural talent for mathematics simply because their intuition is thrown off by the missing steps. This leads to the unfortunate situation in which students who in fact possess a natural talent believe themselves not to be cut out for mathematics.

Math education materials tend to exhibit five kinds of information gaps described herein as Speed Bumps, Y-Intersections, Potholes, Gaps, and Chasms (collectively and generically referred to as "Gaps"). Gaps, in the generic sense of the term, can be interruptions to the contiguous flow of math concepts presented in textbooks, course lectures, or discussions, often characterized by one or more skipped steps, concepts, or insights that may not be specifically stated or clearly explained. In order of least severe to most severe, Speed Bumps can be characterized by descriptions or explanations that are poorly written. Y-Intersections can be characterized by descriptions or explanations that may be interpreted in more than one way, any one of which may or may not work for the current objective but one of which can support continued growth in mathematical skills. Potholes can be moderate interruptions to the flow of math concepts characterized by a lack of information or by unclear or misleading descriptions. Gaps—in the more specific application of the term—can be incidents of one or more skipped steps or concepts or insights that may not be made explicit or that are poorly explained. Chasms can represent the most severe breaks in the otherwise contiguous flow of math concepts as they may be characterized by the absence of a complement of concepts that comprise one or more topics.

As successful system or method for addressing math education should be adapted to effectively address each of these types of Gaps.

While most easily described as an issue relating to education, addressing Gaps in mathematics knowledge can be important to people outside of a purely educational context. Identifying and improving people's math skills can be important in personal and professional development as well.

Accordingly, there is a need for systems and methods of automatically distilling concepts from math problems and dynamically constructing and testing the creation of math problems from a collection of math concepts, as described and claimed herein.

BRIEF SUMMARY OF THE INVENTION

Before moving into the substantive summary of the systems and methods presented herein, it is beneficial to first provide definitions for a number of words and phrases used herein. The following definitions help to provide additional structure and meaning to the detailed and summary descriptions provided herein.

Definitions

Algorithmic Math Problems and Expressions: problems and expressions (including statements) of mathematics that can be expressed in values, variables, and operators, such as $(4+2i)+(6+9i)=10+11i$. Algorithmic does not refer to dynamically written word problems, but does include dynamically selected textual instructions for math problems (e.g., "Simplify . . . ," "Using this picture, explain why . . . ," "Identify the greater . . . ," "Evaluate . . . ," "What is . . . ," "Solve for x . . . ," "Is . . . defined?" etc.).

Automated Concept Cloud Extraction/Concept Cloud Reconstitution ("CCE/CCR") Module. A two-phase module that (1) automatically distills from an expression of mathematics representative concept clouds, and (2) automatically composes representative expressions of mathematics from one or a collection of concept clouds.

CLI Data Packets (CLI-DP): data packets that store system instructions as to each CLI's properties, attributes, variables, and associated templates. These data packets describe and govern how a CLI may interact with the system's overarching logic that conducts dynamic generation of math problems from concept clouds. In conversion of linguistically-expressed math concepts to machine-readable code (e.g., concept line items, their attributes, properties, variables, templates, functions, operators, arguments, and system instructions expressed in code), these data packets may act as repositories of bibliometric data that can include—in addition to the attributes, properties, variables, templates, and system instructions—relevant keywords, the origin of the CLI (e.g., analyst name, problem extracted, redundancies, bibliographic data), importance scores, weight scores, the CLI as a predictor of concept consolidation, the CLI as a contributor to a user's procedural flexibility, performance with the CLI or concept cloud by individuals as well as population segments of users and their co-workers, etc.

Concept Cloud: the collection of concepts of mathematics that can be encapsulated in an object of mathematics, usually (but not exclusively) expressed as sets of concept line items. A concept cloud can be conceived as a capital "T." The top horizontal bar can represent the most advanced concepts of the concept cloud (often referred to as the "top bar concepts"), usually ordered in terms of prerequisites and dependencies, that may be taught at a common grade level or math subject, as defined by some curriculum (e.g., the five-country curriculum, defined below). The vertical bar can represent concepts of mathematics that may support or otherwise make possible the existence of the concepts in the horizontal bar (often referred to as the "downline concepts"). Again, these too may be ordered in terms of prerequisites and dependencies. For example, concept clouds at the level of Pre-Algebra may be comprised of 18% top bar concepts and 82% downline concepts. That percentage becomes increasingly concentrated with top bar concepts in the early years of mathematical awareness, and increasingly concentrated with downline concepts as a user's skills become more advanced.

Concept clouds may be represented by a plurality of data types, including algorithmic, geometric, and graphic means, by word problems, and by computer code.

Concept Line Item ("CLI"): a mathematical concept expressed as a word phrase, a single idea of mathematics expressed as a simple sentence. Concept line items can be derived by process of extraction from expressions and problems of mathematics of any kind, from written materials about mathematics, and from experience with mathematics. Concept line items can be written to be interpreted and understood independent of any context, such as the exercise problem under extraction, any adjacent line items, and the math topic or math subject.

A CLI may address a single concept, or, for more advanced concepts, an integration of several concepts. For example, a CLI that reads, "A counting number can be both the order of an object in an enumeration of a set (ordinal numbers), and the size of the set (cardinality)," integrates (at the highest level and without extraction of any more granular concepts) counting numbers, the order of counting (ordinal numbers), sets, and the size of sets (cardinality) to crystallize the idea that a number can describe both the order of an object in a set and the set cardinality.

Note that in a succession of math concepts, Gaps of any type can signal a poorly constructed concept cloud. Some CLIs in an ontology of mathematics can be operational or actionable; some can be merely descriptive.

Concept line items may be represented by a plurality of data types, including algorithmic, geometric, and graphic means, by word problems, and by computer code.

Customized Study and Practice Program (CSPP): automatically compiled collections of hyperlinks to stored content organized to comprise learning, exploration, practice, application, and collaboration programs of study. CSPPs include dynamically generated (i.e., by the CCE/CCR Module) and system located materials (e.g., in a textbook by means of stored TextMaps, or on the Internet by means of the Research System, the Research System is the subject of U.S. Pat. No. 8,727,780, the entirety of which is hereby incorporated by reference) customized to formulate study programs organized in accordance with the lesson plans and progress of a user's class and the user's UDP. Users of any type and for any purpose, by way of non-limiting example students, teachers, tutors, and parents can direct CSPPs to motivate and support specific learning, skill development, or analytical objectives.

Diagnostic Tests: automated and adaptive exams. The systems and methods described herein support at least three types of diagnostic tests: (1) a gestalt exam that tests the range of user capabilities in mathematics; (2) a special-purpose exam that targets specific concepts, concept clouds, or applications of either; and (3) an assessment developed on the basis of a user's interaction with the system over a period of time.

Diagnostic tests may support different methods of testing. For example, tests may be conducted as a pathway along the spine of the ontology with algorithms that branch, on the basis of user responses, to explore the depth of skill or to isolate difficulty with certain concepts. Diagnostic exams may also follow a series of concept clouds as they progress from one objective to another.

The CCE/CCR Module's ability to dynamically generate math problems facilitates fine-tuned testing methodologies and exploration of the roots of any impediments to mathematical skill and rapid assessment of user skill sets including construction of user SkillsMaps. Other testing methodologies can be possible including means to standardize exams across populations of users.

In preferred embodiments of the systems and methods described herein, for exams, the output is data that may be sufficient to model a user's or group's skill set and construct a drillable and interactive SkillsMap.

Five-Country Curriculum: the collective range of math concepts typically taught in PK-12 (and their international equivalents) in the United States, India, Singapore, Russia, and Japan.

Headline Concepts: one or several CLIs in a concept cloud that determine the purpose, function, and/or behavior of the concept cloud. A concept cloud may be headlined by a single CLI (unipolar concept clouds) or several CLIs operating separately (in a succession of solution steps) or in concert with one another (multi-polar concept clouds). This suggests that the primary purpose of a mathematical object may be expressed (or governed in the operations of the CCE/CCR Module) by one or a few concept line items, but other concept line items in the same cloud may be either (1) CLIs that shape the functional or operational context of the headline concept(s) for the math object, or (2) components of the root systems of either the headline concept(s) or the determinants of the functional or operational context.

The headline concept(s) may often be the most advanced concept(s) in a concept cloud. A CLI's weight score (the number of nodes in the ontology supported by the CLI in question) or importance score (the number of nodes that point to the CLI plus the number of nodes that the CLI in turn points to) may identify it as the most advanced concept in a concept cloud and may therefore identify it, and perhaps its network of CLI nodes in close proximity, as a headline concept. Alternatively, a CLI's relative position among prerequisites and dependencies in a directed graph, arrayed in a linked list, may identify it as a headline concept.

Interrelationship (among Concept Line Items and Concept Clouds): relationship between two or more concept line items (whether or not the two CLIs may be part of the same concept cloud), two or more concept clouds, or a concept line item and a concept cloud. This definition applies even if the two concepts or concept clouds may be identical (e.g., a relationship between a CLI or a concept cloud and itself). Interrelationships may be of a particular character (e.g., prerequisite or dependency) or may lack a relationship. Interrelationships among concept line items and concept clouds animate mathematics. Otherwise, concept line items, alone or in collections, represent isolated bits of mathematical meaning. Together, however, the concepts of mathematics illuminate much. The following is a more detailed discussion of possible types of interrelationships, their treatments, and resulting capabilities.

Interrelationships among concept line items and their nature can be described and determined by a plurality of systems, or schemas, such as prerequisites and dependencies, hierarchical relationships modeled by textbooks (e.g., subject, unit, chapter, section, concept line item, CLI component, and n-gram), distances, and edge weights among others. Schemas can be essentially a selection of lenses by which to map and understand the rules of mathematics. They illuminate and animate the rules of mathematics, provide the architecture by which to compose and decompose ideas of mathematics and ideas expressed in terms of mathematics, and, we believe, may be likely to formulate the logical basis for and logical extensions of the CCE/CCR technology (e.g., the "rules of translation" from concept cloud to mathematical exercise problem). Schemas, therefore, may be part of a method to construct an overarching logic for the second component of the CCE/CCR Module (i.e., the rules of translation that govern dynamic composition of math problems from concept clouds). So, interrelationships solve the problem of the functionality of mathematics, and perhaps in part solve the problem of how to construct the overarching logic of the CCE/CCR technology.

Networks of interrelationships can extend to form meta-systems, interrelationships that describe and determine how schemas interact with each other. For example, concept clouds derive from prerequisites and dependencies. We may discover that their composition, governed by one system (e.g., prerequisites and dependencies), can be interpreted by other systems (e.g., intra-subject or inter-topic hierarchies) to identify one or more headline concepts that govern composition of ideas from that concept cloud (likely to be determined by linked lists derived from prerequisites and dependencies, hierarchical architectures, and perhaps some other system). It is contemplated that interactions among schemas can be codified, classified, and enacted as programmable objects. Similar interactions among schemas may be applied to achieve other objectives.

Maps of inter-conceptual relationships woven on the basis of organizing principles and the criteria and attributes that determine those connections, present opportunities for more organic, responsive, and agile exploration and learning curricula. Interrelationships between CLIs, therefore, solve part of the problem as to how the systems and methods provided herein can customize study (exploration and learning) and practice (application and collaboration) programs (the CSPPs defined above) for any number of individuals and any number and size of groups, and guide each to develop world-class math skills.

Interrelationships open unique possibilities for advanced data-mining algorithms as well as user queries, data storage, and management. Mapped interrelationships may establish the foundation for artificial intelligence capabilities, e.g., Bayesian inference; determining the nature, construction, and content of spines of the ontology; and driving the functionality of frameworks and identified archetypes of skill development derived from that model (a capability of the artificial intelligence employed within these systems and methods).

Ontology (with alternate interrelationships): the collection of concept line items. Given a collection of CLIs, the Ontology Editor System supports arrangement of CLIs into interrelationships such as (for example) prerequisites and dependencies (by way of non-limiting example, in a directed graph) or an ontology architecture (by way of non-limiting example, in a directed or undirected graph). In some embodiments, there may be an ontology of concept clouds. For contemplated ontologies of mathematics, edge weight graphs and distance graphs may enable further functionality.

Predictors of Concept Consolidation: CLIs that may be accurate predictors of when, over how long of a time span, and how concretely a concept solidifies (i.e., becomes owned and operational mathematical knowledge) in the mind of a user such that its acquisition and application by the user is consistently reflected in the user's math skill set. Such system analyses also apply to groups of users across variously defined populations.

The system enables users of all types to identify predictors of concept consolidation (PoCC). A PoCC is not an event, but a concept or collection of concepts. The systems and methods described herein can pinpoint PoCCs and build study materials that assist users in appropriately navigating to and through the PoCCs.

By way of non-limiting example, a predictor of concept consolidation can be the CLI that helps a user to grasp the meaning of the horizontal line between two numbers in a fraction, transferring the meaning of 1:2 to ½. Again by way of non-limiting example, should a user then achieve consistent performance with that concept at the 85th percentile, the system may be able to predict when, under what conditions, which CLI(s) or concept cloud(s), and by what pedagogical path (or method) a user with a math skill set with those characteristics can perform at the 90th percentile with addition of fractions, multiplication of fractions, division of fractions, and conversion of fractions into decimals. Such predictors of concept consolidation may also alert users to the possibility that people who perform at the 65th percentile with concept a, may be likely to reach the 50th percentile with concept n unless certain intervention is offered. Predictors of concept consolidation may be identified in relationship to other concepts. The systems and methods described herein can pinpoint, track, and measure a user's progress with CLIs and concept clouds that formulate predictors of concept consolidation and build study and work materials that support development of those capabilities.

Procedural Flexibility: math skill sets that enable a user to formulate, conceptualize, represent, analyze, and solve math problems from multiple approaches and with a variety of skills exhibit the hallmarks of procedural flexibility. A user who can, for example, solve a geometric problem algebraically, or an algebraic problem geometrically, is demonstrating procedural flexibility.

Procedural flexibility is considered to be the hallmark of a well-developed math skill set. It reflects the ability to formulate, conceptualize, represent, analyze, and solve math problems from multiple perspectives with a variety of skills. The systems and methods described herein can pinpoint, track, and measure a user's progress with CLIs and concept clouds that have been identified as developers of procedural flexibility and build study materials that target development of those capabilities.

Developers of procedural flexibility may be identified in relationship to one another, because a concept or concept cloud based on geometry is, in isolation, a concept or concept cloud based on geometry. But if that concept or concept cloud is placed in relationship to a concept or concept cloud of algebra, and the distance between them is carefully mapped, then the mapped distance between the geometric space and the algebraic space can become a method to develop procedural flexibility.

SkillsMap: a graphic, drillable, and interactive representation of data and information that describes the current, historical, and—with artificial intelligence, predictors of concept consolidation, and developers of procedural flexibility—projected status of a user's math skill set. A SkillsMap may also be created to represent the math skills of any number of users such as a single person, a remedial or advanced class, a population segmented on the basis of any attribute (e.g., difficulty or expertise working with certain concepts or concept clouds), a learning characteristic (e.g., ADD), a teacher, a faculty, a school, a school district, a state, or a nation.

A TextMap, defined below, MediaMap, and WidgetMap may embody a similar data presentation as a SkillsMap. WidgetMaps can be composite representations of the math concepts comprised in mathematical descriptions of tangible objects.

For example, a SkillsMap may be a representation in which concepts (CLIs) may be visually distinct from each other and their relative size is based on the weighted value of their importance, relevance to a particular subject matter, recency in acquisition, degree of difficulty, number of prerequisites or dependencies, or other characteristic(s). It can be any form of graphic representation (e.g. a heat map), it can be tabular, or any other data form.

Spine of the Ontology: a collection of the foundational concepts of mathematics that represent the core of mathematical knowledge for a selected range of curricula as determined, for example, by the fundamental concepts of each grade level or math subject. Nodes on the spine of an ontology can be determined on the basis of their location in one of four quadrants described by two intersecting continua: fundamentality (i.e., primitive concepts of math vs. derivative concepts of math), and CLI motive (e.g., object identification vs. object behavior).

User Data Packet (UDP): a collection of attributes, properties, and variables that describe a user's unique personal math skill set. The systems and methods described herein create for each user his or her own data packet, and constantly update that packet as the user interacts with the system. The UDP can also store historical versions of the user's UDP so that she, her co-workers, teachers, tutors, and parents, can review her progress and map her mathematical development. UDPs may include an extensive collection of captured data that describe the user's online practice, development, and current and projected capabilities.

The overarching logic of the system to dynamically construct the math problems and customized study and practice programs (CSPPs defined above), is informed by the user's capabilities as described by her UDP. For example, if a user can perform vertical multiplication with single-digit numbers, but has difficulty with vertical multiplication of two-, three-, and four-digit numbers, particularly as mixed (e.g., a two-digit number multiplied by a four-digit number), the system can dynamically construct and populate her CSPP with problems and educational materials (by way of non-limiting example, from the system, the Internet, and the user's textbook and supplementary materials) that review, support exploration with, and support practice with those transitions. It can introduce applications to expand her skill set and add historical and scientific context and substance to her comprehension. The system can also highlight opportunities for collaboration with users from around the world.

TextMap: similar to a SkillsMap, a graphic and drillable representation of the math concepts explicitly covered by a textbook and implicitly covered by the same textbook in the context of exercises. The systems and methods described herein automatically mine the text and problems of math textbooks (in some embodiments, the charts and geometric figures as well) for their conceptual content, define and map that conceptual content, and assess its mathematical and pedagogical value in isolation and even as it is presented in succession, thereby providing an assessment of the match or fit between resource, user, teacher, class, and objective.

Overview

The present disclosure provides systems and methods of automatically distilling concepts from math problems and dynamically constructing and testing the creation of math problems from a collection of math concepts. In addition, the present subject matter provides systems and methods of using branching algorithms to test and map a user's skills. Various examples of the systems and methods are provided herein.

As described herein, the foundation of any system that functions as an intelligent math education assistant can embed at its core a finely granular and comprehensive ontology of the concepts of mathematics. Then can the gaps in continua of math concepts be identified, which is a prerequisite for supplying and explaining the omitted insights. The most effective systems and methods can both identify the requisite concepts and provide the omitted concepts. Accordingly, the systems and methods described herein rely on an underlying comprehensive otology of mathematics. U.S. Pat. No. 8,727,780 describes the systems and methods designed to capture and manage, organize, sort, and vet many concept line items and describes how to standardize the CLI development process; how to standardized the CLIs themselves; how to identify and fill Gaps between successions of CLIs; how to organize and coordinate the work of geographically dispersed extractors; how to control redundancies among CLIs; and how to render the output, an ontology of mathematics, user-interactive, searchable, and functional.

To meet these foundational requirements, the systems and methods described herein can be embodied in a two-part module that automatically (1) parses expressions and representations of mathematics into their component concepts, and (2) composes expressions and representations of mathematics from collections of math concepts. As used herein, the term for this two-part module is the Concept Cloud Extraction/Concept Cloud Reconstitution Module or the "CCE/CCR Module" or the "Module". Each module is independently referred to herein as the CCE module and the CCR module.

The Module provided herein is intended to render that ontology operational by providing the ability to automatically distill math expressions into their component concepts and, conversely, to compose from collections of concepts algorithmic math expressions. In various versions, the CCE/CCR Module may become the platform upon which applications and products that teach, practice, or apply mathematics are based.

High Level Summary of the OES and the Research System

To better understand the objectives of the present subject matter, it is helpful to provide a summary of the subject matter in U.S. Pat. No. 8,727,780 (the '780 patent). The systems and methods provided in the '780 patent form the basis for many practical applications. Two contemplated applications are an Ontology Editor System (an OES) and a Research System.

The OES may be designed to support and coordinate a team of math analysts in their work to extract concepts of mathematics from math problems, assemble those concepts into a finely-granular ontology of mathematics, and convert that ontology into machine-readable code, the principal step toward a functional ontology. The OES can be an end-to-end, throughput system that begins with a collection of selected textbooks and mathematicians and ends with an operational ontology of mathematics uploaded to a system or product that embeds the ontology and associated technologies (like the CCE/CCR Module) at the core of its functionality. The OES is discussed in more detail below.

The Research System may be a search engine that tags the math, science, and other content that is published on the Internet, and that appears in electronic documents (e.g., in private databases), with the unique identifiers of components of VCI's ontology. As math analysts develop an ontology, the OES automatically assigns each CLI a unique identification code. These codes are described as Math & Science Concept Identification Codes or MSCICs. The OES assigns MSCICs to CLIs and can also assign identifiers to other components of the ontology, such as known and frequently appearing concept clouds. With that foundation, the Research System responds to user search queries about mathematics and user search queries that can be composed in terms of the concepts of mathematics. The Research System is also described in greater detail below.

Summary of the OES

The Ontology Editor System is an online facility that coordinates teams of math analysts who, from their analyses of problems of mathematics, write finely granular sets of concept line items, perform quality checks on CLIs to identify Gaps in sequences of concepts, define interrelationships between the CLIs and map those interrelationships, and direct the system to automatically array those interrelationships in matrices and derivative data structures. In a preferred embodiment, output developed by math analysts with the OES is subjected to peer review, and the OES can coordinate those reviews. The OES has also been designed to house large databases to manage the vast quantity of data inherent in the systems.

Given that the bulk of mathematics knowledge in the textbooks of most countries is encapsulated in examples and exercise problems, it is believed that the original identification of the math concepts that are incorporated in examples and exercise problems—e.g., problems that are algorithmic, linguistic (word problems), geometric, or graphic (both to generate graphs and to motivate interpretation)—is the most effective method to build the ontology. An extraction process may be employed to provide a stepwise procedure to systematically derive from math problems finely granular concepts of mathematics, and the concepts of mathematics that derive from extraction are the data that comprises the ontology of mathematics.

Concept extraction can be a detailed, rigorous, and creative process. Extraction of concepts from problems of mathematics begins with a collection of selected textbooks and other materials (e.g., supplementary study and practice materials, including manipulatives). The output can be a finished ontology of mathematics, the product of test-driven development that may be converted into machine-readable language and re-tested for its ability to support targeted functions. "Test-driven development" in this context can refer to the method of Agile/Scrum software development when a test is first written which the software system, or in this case the ontology, that is under development initially fails. When the feature, or again in this case the CLI or concept cloud, has been developed it then passes the test. This can be particularly applicable when the ontology is converted to machine-readable code.

Through test-driven development, the ontology can be rendered functional. The culmination of the extraction process finalizes the ontology, compiles into executable code the data along with any technologies that render that data functional, and embeds the files into the core of products and systems that teach, practice, or otherwise apply mathematics.

Experimentations with extraction have demonstrated that manual performance of such work, even with spreadsheet and database software programs, can be a time-consuming process. Further, extraction of math concepts at the level of granularity described in these specifications, with a parallel objective to identify and close the five kinds of Gaps, and to detect and select between duplicate concept line items, can require significant coordination among math analysts. Even with electronic communications capabilities, when the process involves many analysts' coordination of the ontology development process such that inherent redundancies are controlled, the task can be difficult. Given that orchestration across teams of math analysts (not just individuals), whether they function in parallel or in succession, may be co-located or geographically dispersed, or originate from the same culture or diverse cultures, increases the difficulty of management coordination, the Ontology Editor System can be beneficial as the backbone of any extraction operations. The OES, therefore, can be one of the precursor steps to construction of the Research System and the CCE/CCR Module.

The '780 patent demonstrates an extraction of a math exercise problem selected from a Kindergarten math textbook (see FIG. 28 of the '780 patent). The extraction of that problem produced more than 3,800 written concept line items from three distinct solution strategies and several variations on those three strategies. From that collection, analysts filtered 568 unique concept line items determined to be the clearest and most succinct expressions. In that instance, about fifteen percent of the written CLIs were to be included in the final ontology. The majority of the remaining 3,300 (approximate) concept line items were redundancies, duplicates of other CLIs written during the extraction process. A directed graph comprised of 54 of the 568 selected CLIs appears in FIGS. 26A to 26E of the '780 patent and FIGS. 3A-3E herein.

In a preferred implementation, there may be annually released updates of the ontology until year-over-year changes to the content of the ontology are no longer material. Since the ontology is also upgradable and customizable (e.g., for other products or services), math analysts can work with the OES to construct and house multiple versions of the ontology over a number of years.

Unique or custom versions of the ontology may be developed to target, test, or develop certain capabilities. Since an ontology of mathematics built by the OES can also be embedded as a functional, even a core, component in other software, systems, and products, the Ontology Editor System may be the central enabling component for a wide array of technical objectives.

Summary of the Research System

The Research System offers another means (besides the OES) to mine the content of an ontology of mathematics. It includes an Internet-based search engine that targets the concepts of mathematics as well as applications of mathematics (e.g., to the sciences) and physical and technological manifestations of mathematics (e.g., mathematical descriptions of physical objects, and mathematical descriptions of technological specifications) based on the CLI content of the ontology as tagged (with MSCICs) and configured (e.g., into directed graphs by order of prerequisites and dependencies, e.g., concept clouds and WidgetMaps) by data-mining algorithms. Locations of content posted on the Web and identified by the Research System's Web crawlers as containing concepts, applications, and manifestations of mathematics (as well as the concepts, applications, and manifestations themselves) can be automatically appended to the database of the ontology and subsequently made available for users' search by textual (e.g., descriptions of math concepts) or mathematical (e.g., algorithmic descriptions) criteria.

In a first application of output from the OES, the Research System can respond to user queries and conduct database manipulations of ontology content. It can enable users such as students, teachers, parents, tutors, researchers, and their co-workers to search for finely granular concepts of mathematics and determine where on the Internet content about such concepts, or content that otherwise incorporates, assimilates, or comprises such concepts, appears. Discovered content need not be just educational, but may include mathematical descriptions of physical objects and mathematical descriptions of technological specifications.

Physical and technological manifestations (interpreted to be representations) of mathematics captured by the Research System's Web crawler can be mathematical descriptions of physical objects and mathematical descriptions of technological specifications that appear on any page posted on the Internet. Additional software tools may be used to help users to mathematically identify, describe, and tag, with MSCICs from the ontology, the attributes and variables of physical objects and technological documents, schematics, and code. Upon the user's election, these mathematical specifications can then be transmitted to the Research System's servers and thereby included in relevant search results. It is contemplated that, in some versions of the Research System, the searches of physical and technical representations can be automated.

The Research System's database may store substantially more data than just the ontology in its various versions and structures. Given the operations of the Web crawler, any Web content about mathematics, applications of mathematics to the sciences, and physical and technological representations of mathematics that are captured and stored by the Research System may regularly expand and contract the data stores on servers. These specifications require multiple matrices to configure and store large volumes of data about a variety of attributes, variables, and properties, etc., of math concepts and their interrelationships and to enable queries and other operations on that data. The system can continually maintain such data sets including perpetual automatic extensions of the matrices to add new data and to truncate data as necessary (e.g., to remove data duplications or links to Web pages no longer available on the Internet).

As the Research System's Web crawlers identify targeted content in pages and documents posted on the Internet (or private data networks), they may cache copies on remote servers. System algorithms may then parse textual, algorithmic, and geometric data by its mathematical content (that is, according to the CLIs that comprise the ontology). In node-edge incidence matrices, the system can then tag cached copies of Internet pages and documents with the MSCICs of discovered concepts, in preparation to respond to user queries.

Given more development, the Research System may extend its reach to identify material in data stores (e.g., the Internet) by the mathematical signature of objects, devices, documents, drawings, images, sound files, video files, or even web sites (i.e., concept clouds and a suite of distinguishing metrics) however those signatures are composed (e.g., algorithms, geometric representations, word problems, or computer code), instead of search just by text to identify matches with an ontology of textually expressed math concepts. The ability to search by mathematical signature, expressed in a plurality of ways (e.g., mathematical algorithms, geometric representations, graphic representations, even representations of concepts formulated in word problems, and any of the above represented as written computer code) is expected to become key technology in the field. One intermediate objective for the Research System is for the system to be able to parse algorithmic, geometric, graphic, or word problem representations for their component concepts or concept clouds.

It is understood that the Research System capabilities integrate with the CCE/CCR system and may be applied to geometric figures, problems of geometry, crossovers between geometric and algorithmic expressions and solutions (i.e., procedural flexibility), and related word problems and graphics.

The preceding descriptions of the Ontology Editor System and Research System illustrate how the two systems render construction, storage, management, and mining of large data sets that are organized and driven by a finely granular ontology of mathematics both technologically and operationally feasible. Together, the two systems lay the foundation capabilities that can make available to users such as, by way of non-limiting example, students, teachers, tutors, parents, researchers, and their respective co-workers a significant corpus of course data, including a static corpus of math problems, that may be tagged and rendered searchable by a compendium of concepts of mathematics (i.e., the ontology).

Applications of the CCE/CCR Technology

Potential applications of this technology are many and varied. For example, the systems and methods provided herein could form the basis of a search engine to identify math concepts where they appear in materials as text or mathematical expression, and math concepts (and groups of math concepts) that can mathematically describe substantially any math-related content (by way of non-limiting example, the contours, physical properties, and operation of a specific pair of gears that have been mathematically modeled by a laser scanner). One feature of this math-based search engine could be to automatically map the math concepts of any (electronic) educational materials and identify the concept gaps that are present in the explanations.

In another application, packets of longitudinal data that describe, at a fine level of granularity, the development and status of an individual's math skill set, could become components of applications to schools, colleges, and employers (for example, a user's SkillsMap). Organizations, equipped with a software program (and support services) to construct standardized exams that target and highlight markers of math skill sets known to support success in the organization's curricula or operations, may then upload the data packets and immediately obtain comparative scores derived from granular data. Analytical features of the software could support sensitivity and what-if analyses. The same systems and methods could help PK-12 schools, colleges, and universities track the development of their students, and provide accreditation agencies with definitive proof of the effectiveness of their teaching as reflected in each student's progress toward education standards, or even their own personal goals. It is contemplated that with widespread adoption of the systems and methods described herein, no person would have to sit for the mathematics component of the SAT or ACT exams.

For example, the systems and methods provided herein may be employed by schools, colleges, and universities to develop their own standardized tests, draw from the systems' databases the math skill set data of their students (each identified by a system-assigned identification tag), and automatically generate the descriptive statistics to support acceptance decisions and compliance vis-à-vis accreditation. Based on known predictors of concept consolidation, the quality of student math skill sets, and other system-stored data (e.g., frequency and periodicity of work, and assessments of historical progress), the system can also project growth of a person's and a group's math skill sets, particularly as they target the properties and attributes of a specific objective, like, by way of non-limiting example, achieving procedural flexibility with a particular concept cloud.

In their most refined form, the systems and methods provided herein are designed to be an online PK-college and professional math education, research, and development system that supports a variety of features to help users explore, play with, and learn, practice, apply, and collaborate with mathematics, and that constructs, with automation, high-resolution maps (in terms of the granularity of math concepts) of user math skill sets (e.g., SkillsMaps). The concept of the SkillsMap can be applied to map the mathematical content of textbooks ("TextMaps"), research papers, online content ("MediaMaps"), and objects like the pair of gears previously mentioned ("WidgetMaps"). The systems and methods comprise an advanced intelligent assistant that supports flexible diagnostics and research based on concept line items, concept clouds ("CCs"), the discoveries of its own artificial intelligence, and other attributes of mathematics as the basis for effective pedagogy and further product development. These systems and methods can help teachers plan and coordinate their classes and coursework, make possible in-depth education research with concepts that are, for example, predictors of concept consolidation or developers of procedural flexibility, enable the system to automatically generate educational materials tailored to a system user's unique skill set, and bring transparency to the comparative attributes of user skill sets, textbooks, and approaches to math and science education across the international spectrum. Derivative software products may further construct mathematical descriptions of tangible objects, rendering them interactive and searchable, and may provide the professional markets a means to assess employee math skills sets, individually and as an organization, and strategically hire, educate, and coordinate employees to target a key (perhaps technical) objective. PK-12 schools, colleges, and universities may also apply the same capabilities.

In one example, the systems and methods described herein provide an online, intelligent, math education assistant that is agnostic to: (1) the teacher's approach to a concept; (2) the grade level or math subject; (3) the textbook that the teacher and her students study; (4) any supplemental materials offered to students; (5) each student's level of achievement, and (6) the teacher's level of expertise as a teacher and as a mathematician. As such, the described systems and methods meet teachers, users, and co-workers where they are (given their respective skill sets), with the materials that they have on hand (the textbooks and supplementary materials assigned to them), and yet enables them to reliably achieve results commensurate with the best education systems in the world.

In each of these examples, the fundamental idea that motivates the CCE/CCR Module, as well as the other systems and methods described herein, is concept clouds.

Concept Clouds

A common challenge to people who study and work with mathematics is the nature of some individual concepts that prove difficult. Frequently, that difficulty arises in the way mathematics has evolved and why customs in notation, procedure, operations, and functions have been adopted over two millennia. This results in the difficulty people experience when they encounter a concept that is taught in its final, refined, and elegant expression, -or proof, detached from the comprehensive context of mathematics, including the original motivation and logic that lead to the concept's development in the first place, as well as the context of the concept's position among the hierarchy of mathematical concepts.

Another side to this same challenge is largely untreated, and that is concepts of mathematics as they coalesce into groups, interact with each other, and express themselves or otherwise exert their influence among other concepts in the roles of principal objective (e.g., expressed by one or a few headline concepts), contextual concept, transformative concept (the model for dovetailed concept line items is: antecedent . . . [transformation leads to] . . . consequence. For example, "An angle [antecedent] . . . is the configuration of [transformation leads to] . . . two lines that meet at a point [consequence]." The antecedent and consequence (angle and two lines that meet at a point) are contextual concepts. The transformative concept is " . . . is the configuration of . . . "), operational concept (e.g., functions and operations), or capacitating concept (e.g., the root systems of the foregoing as they extend to the foundations of mathematics).

Concept clouds seem to offer a way to effectively address both challenges. When narrowly defined, concept clouds can be imagined as the required collection of concepts, expressed as concept line items or CLIs, to solve a particular problem. A broader version is an understanding that any mathematical object can be expressed as a concept cloud: with or by nodes in the spine of the ontology, the root systems of concepts, mathematical objects, expressions, statements, examples, equations, functions, graphic representations, textual representations, geometric representations, word problems, solution steps, entire solutions, mathematical descriptions of objects and events, and any component or combination thereof. In fact, an alternate solution to a math problem would likely entail a different concept cloud from that of a "textbook solution," and would naturally generate a different solution, albeit resulting in the same answer or one that is substantially similar. Each step to a solution is also likely to represent its own concept cloud.

At a fine level of granularity, every mathematical representation is a collection of math concepts, and mathematical representations can be parsed such that their component concepts present as a collection of concepts expressed at the same degree of granularity and arrayed into networks, e.g., hierarchical constructs of parent-child-sibling nodes in undirected or directed graphs, such as directed graphs that array concepts into prerequisites and dependencies, minimum/maximum spanning trees, and objective-driven architectures (e.g., linked lists) with headline concepts, contextual concepts, operational concepts, and capacitating concepts.

For purposes of the subject matter described herein, it is best to think of every representation of mathematics as a collection of concepts that can be expressed as a concept cloud. An objective of the systems and methods provided herein is to focus on the identity and character of concept clouds in their unique complexions and how they resolve the problem of rational dissociation or well-developed comprehension of mathematics or strong development as with procedural flexibility and tracking and mapping predictors of concept consolidation, including searching for patterns among parallel or serial steps of the same solution as concepts enter and exit the solution process and the composition of concept clouds consequently shifts from initial problem to solution. Executed well, this approach addresses both rational dissociation and the roles and interactions of concepts in representative groups. Basing system algorithms on concept clouds, expressed as sets of written concept line items or their algorithmic (even their geometric or graphic) equivalents, and their components, the discoveries and possibilities that open are exciting. For example, a concept cloud may be headlined by a single CLI or several CLIs operating separately or in concert with each other (e.g., in tandem, as when two concepts are interacting at the same time [$Ax+By=C$ . . . for addition, variables, and linear equations], and serially, as in successive steps to the solution of a problem). As a result, it may be discovered that some concept clouds are multi-polar and some, like math problems designed to demonstrate a single particular concept, are unipolar. This suggests that the primary purpose of a mathematical object may be expressed by one or a few concept line items, but other concept line items in the same cloud either are components of the root system of the headline concept(s) (as the roots extend through Pre-Kindergarten and to the foundations of mathematics), or otherwise determine the functional or operational context of the headline concept(s) for the math object (i.e., contextual, operational, or capacitating concepts), and may lead to interesting data-mining methodologies.

A rich variety of opportunities to engineer and mine mathematics become possible when the fundamental data set is a fine-grain ontology. Concept clouds, the automatic creation and manipulation of their composition, and their use as maps of what is happening in any solution are part of that variety. The notion of concept clouds also makes many other possibilities feasible, particularly in light of the CCE/CCR Module provided herein.

Concept Cloud Classes

The character and composition of concept clouds suggests that they can be ordered into a classification system. In one example, several classes of concept clouds are used. The first and most generic of the classes are Mathematical Object Concept Clouds or MOCCs, the collections of concepts that comprise the identity and composition of a mathematical object, including: identification of the object; element(s) of the object, meaning the concepts that comprise the object (at certain levels of granularity, a mathematical object and an element of the object may be the same, single, concept); and attributes, variables, and characteristics of the object.

Concepts that regard the context of an MOCC include: insight and nuance about a single interaction of the object with one or more specific objects (especially if the mathematical object is assessed in the context of a mathematical expression composed of more than one mathematical object); descriptions of object character and behavior; treatment, function, and means of operation among objects in context; and whys and hows of each as they pertain to aspects of the context of the object.

The collection of concepts that comprise the prerequisite root system of a single CLI (where concepts are ordered in terms of prerequisites and dependencies) is classified herein as a Root Concept Cloud (RCC). Similarly, a collection of concepts that comprise, within some limited range or toward some defined target concept or concept cloud (for practical purposes), the branch system of dependencies that flows from a single CLI is a Branch Concept Cloud (BCC).

As suggested above, every approach to a solution (e.g., a finished solution with component steps) constitutes its own concept cloud. For example, the collection of concept clouds for any particular exercise problem (represented just as an expression or statement itself (an ExCC))—either as a single textbook approach to solution of the exercise problem, or as one or a collection of alternate approaches to solution of the exercise problem—can overlap to some extent. It is helpful to distinguish between these concept clouds. Any single approach to the solution of a math problem, therefore, is a Solution Concept Cloud (SCC) with further distinctions as to whether the SCC is the textbook solution to the exercise problem (SCC-textbook) or an alternate solution to the exercise problem (SCC-alternate). These distinctions are made in the context of a textbook that an analyst may have at hand. One textbook's SCC-textbook could be another textbook's SCC-alternate.

One step farther along on this continuum encompasses SCCs to an exercise problem, CLIs derived from error corrections (whether from common errors or otherwise) for the same exercise problem, and CLIs derived from responses to questions about the exercise problem (again, whether those questions are common or not). These collections are Master Concept Clouds (MCCs). Every problem, exercise, expression, equation, function, or other statement of mathematics has one Master Concept Cloud. For the purposes of the development of the systems and methods described herein, development of a Master Concept Cloud is understood to be an open and continuous process until the MCC is stable over time. Consequently, concept clouds of any components that collectively formulate a math exercise problem (e.g., MOCCs, an ExCC, including error corrections, and CLIs derived from actual or anticipated questions) collectively formulate the MCC for that exercise problem.

The information for two or more exercise problems or expressions of mathematics, as represented by their MCCs and related either by a common collection of CLIs (e.g., by significant overlap among their constituent MOCCs, ExCCs, or SCCs), or more specifically by shared prerequisite or dependency relationships (e.g., a significant portion of the root system of two exercise problems), collectively comprise a Composite Concept Cloud (CCC). Since the overlap defines a CCC, CCCs need to be accompanied by an indication as to whether they arise (1) by means of concept overlap, or (2) by shared prerequisite/dependency relationships. The distinction identifies at least two subclasses of Composite Concept Clouds. In other embodiments, there may be more. For the purposes of education, Composite Concept Clouds could arise as a user's study of or work with a particular topic of mathematics deepens, or as she investigates concept applications.

To take one step farther, Composite Concept Clouds can coalesce into Sector Concept Clouds (SectorCCs) for a specific area or topic of a math discipline. In the primary example provided herein, this is where the definitions of the classes of concept clouds stops. Extensions of concept clouds beyond this point may become quite a bit more complex, and for that reason could lose their practicality for the purposes of education. However, additional concept cloud extensions may be provided by looking at concept clouds that arise from edge weight graphs, distance graphs, from a structure of the ontology referred to as the Secondary Cloud, from applications, from continua of progressive changes over the course of a mathematical operation or application, from minimum and maximum spanning trees, from the composition of headline concepts, etc. It is believed that these additional concept cloud extensions prove interesting to consider for the purposes of data mining, research, and analysis.

For purposes of the systems and methods provided herein, it is helpful to view much of mathematics (and many other subjects) in terms of concept clouds. It is believed that the idea of concept clouds may prove to be significant with respect to, by way of non-limiting example, education for students, teachers, commerce, industry, technology, and those who work in such areas and lead to unique and helpful system capabilities.

Further, interesting data-mining algorithms may be employed to analyze commonalities and differences between concept clouds on the basis of prerequisite/dependency relationships. Information drawn from such analyses might provide insight as to why one user may be able to solve exercise problem A, but stumbles on exercise problem B, when the two problems otherwise share an 87% overlap (for example) between their respective concept clouds. That type of inquiry might point in the direction of prerequisites and dependencies—the root systems of two concept clouds for exercise problems A and B—and prompt us to identify what concepts are shared and what concepts are not shared among their respective root systems. If the user's difficulty is found to be with a concept that is not in common between the two prerequisite/dependency root systems of the two problems (a not-shared concept), then we can assess the concept in light of its individual role as a node in the spine of the ontology, as a predictor of concept consolidation, as a tangential concept to a node (in some type of relationship to that node), as a consequence of a (failed) predictor of concept consolidation, or perhaps as a key enabling concept for procedural flexibility. If, however, the system zeros in on a shared concept, one might surmise that the problem is one of transference from one context and application to another. At that point, one might re-assess the problem in light of concepts that support development of procedural flexibility, and that might suggest to look at the possibility of conceptual conversion and inversion as described by Hans Freudenthal.

The same logic applies to MCCs and CCCs. Commonalities among prerequisites (not dependencies) do not necessarily (at least in theory) presume commonalities among constituent concepts (considered apart from their root systems) in any SCC or MCC. Two MCCs could have different concepts that share a similar prerequisite root system or even a similar dependency branch system. In that case (and on the basis of filters), the system's job is to assess what degree of overlap, and what degree of overlap importance, qualifies two MCCs to formulate a CCC (and what pedagogical advancement or remedy that might offer to users and co-workers).

The CCE/CCR Module

The primary objective of the systems and methods taught herein is to develop core capabilities for: (1) automatically distilling concepts of mathematics that are in operation in any algorithmic expression of mathematics (the Concept Cloud), and, conversely, (2) automatically generate math problems that include one hundred percent of the concepts in any given concept cloud or collection of concept clouds. Both operations may be implemented in automatic systems and processes, as descried herein. Further, the operations may be applied to algorithmic expressions, word problems, graphic interpretation/graphic generation problems, and geometric problems.

Concept clouds serve as input to the process to automatically generate math problems that include one hundred percent of the concepts in any given concept cloud or collection of concept clouds. The concept cloud or clouds either be human-compiled or dynamically generated. In some embodiments, the operations are run as a cycle in which the output of the first operation. It is contemplated that it is beneficial for the math problems generated from any concept cloud to include 100% of the concepts in that cloud, and no fewer, so that the expression, or problem, and the concept cloud are perfectly matched, and so that the system is not tasked with construction of a universe of possible math expressions or problems.

The process to dynamically generate math problems from concept clouds (the second operation described above) is intended to mimic to a certain extent nature's rules of gene expression, particularly in the way that they govern sequences of nucleotides or amino acids along strands of DNA and RNA messengers. By analogy, and without too closely imitating the process of gene expression in nature, nucleotides or amino acids are nature's CLIs, and strands of DNA and RNA messengers are nature's concept clouds. Where nature creates viable life forms, the intent herein is for the CCE/CCR Module to create viable math problems. The systems and methods, including the CCE/CCR Module, can generate, test, identify, classify, and track math problems on the basis of mathematical phenotypes (however defined, e.g., by subject, topic, headline concept(s), concept cloud, etc.).

These systems and methods, particularly for the component of the CCE/CCR Module that dynamically constructs expressions of mathematics from concept clouds, define the rules of transcription and transfer that govern automatic construction of viable math problems from collections of CLIs, i.e., concept clouds. This is a basic genetic code of mathematics. Thereafter, mining data captured from the results of the CCE/CCR Module operations enable users to discover, perhaps continually, more about mathematics, human applications of mathematics, mathematical pedagogy, and student development in mathematics.

As described above, the entire operation may be performed in a single cycle: first distilling a concept cloud from an algorithmic math problem, and then using that same concept cloud to dynamically generate math problems that are similar to the original and that students may study and solve for practice. As a further objective, the systems and methods may be implemented to dynamically construct algorithmic math problems from a user's unique personal math skill set as stored and continually updated in the User Data Packet. Integrated with a diagnostic exam process that branches on the basis of user responses, the system's CCE/CCR Module should be able to dynamically identify finely granular concepts of mathematics that the user needs to study or practice, and automatically construct algorithmic math problems customized to the user's education requirements, perhaps presented serially, and gradually, from problems that derive from unipolar concept clouds to problems that derive from more complex, multi-polar concept clouds.

The following is an example of a process in which the operations described above function as part of a serial cycle.

Step 1: receive input as to what kind of algorithmic problem is required by the user, either by: (a) descriptive user input, such as: (i) a checklist of concepts or features to be included in the math problem (see (1)(d) below); (ii) an indication of the textbook, unit, chapter, and section being studied; (iii) a targeted math topic; or (iv) one or several keywords; (b) detailed online data about a user's development, e.g., from the user's UDP; (c) graded test question from a diagnostic exam (whether system-originated or manually entered from a hard copy test); (d) human-computer constructed concept cloud (human directed—e.g., from (1)(a)(i) above—with computer-assisted completion of the concept cloud); or (e) human-selected math problem.

Optional Step 2: assess user data packet (or "UDP") (if not already performed) to determine user(s) needs with respect to the requested problem or problem set (which may be represented by a concept cloud) and the requested output (which may be a problem or problem set generated by the CCR module) so that the output is customized to the user's math skills (if not already obtained from (1)(b) or (1)(a)(iii) above) and thoroughly and more effectively develops the user's capabilities with mathematics.

Step 3: compile a concept cloud around the requirements defined in Steps 1 and 2 (perhaps performed in (1)(a)(i) or (1)(d) above, or automatically performed by the system in (1)(e), and customized in Step 2);

Step 4: apply the concept cloud generated in Steps 1 through 3 as the necessary input to construct algorithmic problems that (when parsed into their component CLIs) can be shown to incorporate one hundred percent of the concepts that comprise the concept cloud;

Step 5: solve the constructed problems so that they are prepared for binary grading (correct/not correct);

Step 6: test the problems (an automated function of the system);

Step 7: deliver the problems to the user (without the answer).

It can be conceived that Steps 1 and 2 are the setup for the CCE Module, Step 3 is the primary function of the CCE Module, Step 4 is the primary function of the CCR Module, and Steps 5 through 7 are additional functions of the CCR Module.

If, as indicated by item (1)(a)(i) (RECEIVE INPUT|DESCRIPTIVE USER INPUT|A CHECKLIST OF CONCEPTS OR FEATURES TO BE INCLUDED IN THE MATH PROBLEM) above, the input is a list of concepts or concept features to be included in the generated math problem, that checklist should derive from the system's ontology, even if the user's search begins with key words in a computer-assisted search for targeted CLIs (an application of the Research System). The user may begin with a list of concepts built from scratch while the system helps to compile the concept cloud on the basis of its search capabilities, e.g., an internal search of the ontology, database, or perhaps a corpus of previously compiled concept clouds; an external search of representative content on the Internet; or directed/undirected graphs of some organizational schema (e.g., prerequisites & dependencies, a hierarchical architecture of the ontology, distances, edge weighs, or scores of individual CLIs or concept clouds). Since some math problems are particularly well-focused on demonstration of a single concept (unipolar CCs), or just a few concepts, users should be able to select as few as one, two, or three concept line items (the system can fill in the rest of the concept cloud, i.e., the roots of selected concept line items). Upon user direction, these concept line items may be regarded by the Concept Cloud Reconstitution part of the CCE/CCR Module to be the headline concepts of the intended concept cloud. The composed concept cloud then fulfills the input requirements to generate the requested set of math problems.

Indications of the textbook, unit, chapter, section, and location of concepts under study (item (1)(a)(ii): RECEIVE INPUT|DESCRIPTIVE USER INPUT|AN INDICATION OF THE TEXTBOOK, UNIT, CHAPTER, AND SECTION BEING STUDIED) is a fairly broad description. This input can come in a number of formats: (a) the system user can tell the system the textbook she is studying and her location in the book (simply input into the system the textbook's ISBN and the chapter, section, and page number), (b) the system can help the user to match the concept clouds to locations in one or several textbooks, or (c) the system can find the student's location in her textbook. Note that the system can hold a TextMap without holding an electronic copy of the textbook.

As defined herein, TextMaps are the data sets that identify concepts of math that are explicitly discussed in a textbook or other educational resource. Through analysis of an electronic copy of a book, the system is able to automatically construct TextMaps for that publication. Because the system has the capability to read math problems and parse them into their concept clouds, the system is able to categorize concepts covered in the textbook as explicitly discussed by the text or implicitly covered by exercise problems or examples.

The primary objective of a TextMap is to identify the five forms of missing concepts that commonly appear in math textbooks. It is possible that in spite of the system's automated capabilities, TextMaps can be vetted by people who carefully study each book for key criteria. TextMaps can then be stored in a system corpus.

Fulfillment of Item (1)(a)(ii) suggests that the system holds a corpus of TextMaps. The system's TextMap corpus includes the necessary data to identify a range of concepts discussed in any textbook, unit, chapter, and section, and the unique complexion of related concept clouds that represents a textbook's unique concept fingerprint. Of the three options listed above, option (a) is the simplest and the easiest for the system to execute. The second path (option (b)), the process to identify a textbook and a location within the textbook then becomes an estimate of best fit (given the data that is available, the estimate is likely to be accurate) between data from the user (perhaps as augmented by the system) and the TextMaps. The system provides the student with an educated guess, and requests confirmation of accuracy with the selection. This feature is believed to be particularly helpful to users such as students, teachers, tutors, and parents who want to see how other textbooks discuss the same concepts, or what supplementary materials may best fill any Gaps in a student's primary textbook. The system is able to automatically compose collections of materials on the basis of any textbook selected as the primary study resource, and even suggest and compare such groups of materials on the basis of alternative textbook selections. This capability helps teachers as they build and amend their lesson plans.

A user may elect to follow the third path (item (c) above): she may request that the system gather concept information from a teacher's or tutor's online lesson plan and match the concepts to the textbook and locations within the textbook (or other educational materials) via the TextMap corpus. The broader the descriptive input from the user—e.g., if the user input is a subject title, a chapter title, or even just a section title (a section in a textbook can imply many concept clouds)—the more the system may need a method to constrain the selection unless the user intends to have the system generate a large collection of concept clouds and related math exercises.

In a similar operation, item (1)(a)(iii) (RECEIVE INPUT|DESCRIPTIVE USER INPUT|A TARGETED MATH TOPIC) may require additional constraints to achieve a suitable level of granularity for the user. That input could come from the user's personal UDP, yet alternative objectives could also be achieved without such constraints as described below. With a user's UDP or class of users' composite UDP, as in the ordinary course of this process, the content of the UDP may direct the system with information like the specific concept line items or concept clouds the user(s) needs to practice, the concepts that her SkillsMap suggests are ready for advancement, and the level of accomplishment she has reached with any headline concept(s) of concept clouds (even in diverse contexts, depending on the content of the concept cloud) that the system has compiled. Given a topic of mathematics that the user chooses to study, the system should be able to apply input from the user's UDP to compile an appropriate concept cloud(s) controlled for appropriately graduated attributes, properties, and variables, and deliver one or a set of customized and dynamically generated math problems for study and practice. The result is a series of math problems that reflect a customized plan of practice and a progression of small, carefully graduated steps.

As alluded to above, without controls from an individual's UDP or a group's composite UDP, there are attractive applications for similar constructions. The user (or teacher, in the case of a class-wide application of this capability) is able to direct the system to disregard a UDP (or a class's composite UDP) when it constructs a concept cloud(s) and derivative math problems. If the user selects a broad description and configures the settings such that the system does not apply a UDP to dynamically generated math problems, then the system can output a large collection of math exercises and associated concept clouds unconstrained by the particulars of the user's, or class' collective, UDP. The same would occur if a teacher, in the case of a class-wide application of this capability, were to direct the system to disregard a class's collective UDP. In both cases, this feature may be helpful to users, particularly those who have been grouped together by the characteristics of their SkillsMaps (e.g., students grouped by difficulties with certain concepts that are held in common among classmates). While concept cloud/math problem construction limited by the contents of individual or group UDPs would render a stepwise approach to resolution of difficulties with targeted concepts or combinations of targeted concepts, construction without overriding restraints described by UDP data would broaden the variety of contexts (as described by the content of concept clouds and one or more possible headline concepts, and the math problems that can be generated from those concept clouds and headline concepts) for targeted concepts and perhaps render a litmus test of users' capabilities vis-à-vis that set of concepts.

Item (1)(a)(iv) (RECEIVE INPUT|DESCRIPTIVE USER INPUT|ONE OR SEVERAL KEYWORDS) references a system feature to lead users through a stepwise process that progressively narrows a desired range or network of concepts. This can be accomplished with a series of questions, recommendations, and targeted keywords. In contemplated embodiments, no keywords are likely to reflect a fine degree of granularity. Rather, any keyword is more likely to encompass a broad spectrum of granularity from coarse-granular subjects (e.g., Calculus) to fine-granular CLIs. As such, the system works with users who opt to follow this approach to progressively formulate a concept cloud that is appropriate for the user's purposes and that works with the CCR Module component.

Unless input to the system includes the user's or a class' composite UDP as described in item (1)(a)(iii), detailed data about a user's development—the input referenced in item (1)(b) (RECEIVE INPUT|DETAILED ONLINE DATA ABOUT A USER'S DEVELOPMENT, E.G., FROM HIS/HER UDP)—can come from the user's UDP and SkillsMap data that describe his progress though his studies. In one application of the systems and methods described herein, this approach can provide interesting capabilities to class management for students and teachers. Given a lesson plan for the year, as entered into the system by a teacher or tutor, or a customized study and practice program (CSPP), as automatically generated by system algorithms, the system may determine where each student needs to focus her attention given certain learning objectives entered by a school, teacher, parent, tutor, or student. For example, given that the teacher plans to direct her class to focus on a new topic in two weeks, and the student's SkillsMap indicates difficulties with root or predictor concepts of that topic, the system can direct the student to dynamically-generated remediation work on those concepts in advance of the planned shift in the teacher's lesson plan. The system is also able to alert the teacher to the underlying difficulty experienced by the student and further compile a report of such difficulties for each student in the class.

Item (1)(c) (RECEIVE INPUT|GRADED TEST QUESTION FROM A DIAGNOSTIC EXAM) refers to diagnostic exams provided through the application of the systems and methods described herein. When, in the context of an online diagnostic test, a user incorrectly answers a problem and the system grades the response, the system constructs another problem or series of problems that, in effect, performs a detailed search of the user's skill set, at the concept level, for causes of missed problems. Was the incorrect response a simple computational error? The system can quickly rule that possibility in or out. Might the user's difficulty have been an incorrect application or manipulation of a concept? Problems dynamically generated as branched subtests by, for example, a branching algorithm may be used to assess that probability.

In these instances, a binary correct/not correct grade can be viewed as a mini UDP and accompanied by the MSCICs of those concepts in the concept cloud that are associated with the answered problem. This might suggest that a concept cloud comprises an identifiable chain or network of headline concepts as the presenting concept cloud that represents as the problem from the diagnostic test is parsed and filtered into progressively finer and simpler problems. In some embodiments, the system then continually adjusts the concept clouds and progressively filter headline concepts with ever simpler math problems until the system identifies (with high probability) the concept(s) that the user has not mastered. The system is then able to track concepts and concept clouds and corresponding user performance across groups and populations to data-mine. Such data-mining may reveal insight into the effectiveness of pedagogical methods. The object of the system's search, then, would not be individual concepts alone, but concepts within certain contexts and applications that may prove consistently difficult for some users, as determined by the population analyses.

As noted, the system is able to perform analysis in addition to determination of a binary (correct/not correct) score. These interim analyses of concept clouds may determine and assess the steps toward a solution. Each step can feature its own concept cloud, and the spectrum of step-by-step changes in the composition of a series of concept clouds as a problem is progressively solved may be instructive in itself.

Further, the population analysis implies that the SkillsMap represents the level of a user's or group's performance, not with individual concepts alone, but also with the same concepts in the context of certain concept clouds, especially concept clouds that include insights and nuances that enable unique applications of those same concepts, perhaps as key or pivotal capabilities to achieve a certain result. As a result, the system may identify a number of common concept clouds and direct construction of its educational content to focus first on the individual concepts, their mastery and practice, and then progress to mastery and practice of the concepts in the context of a series of concept clouds that are ordered in terms of required insight and nuance and progressive complexity. The process to enable users to develop their math skills in this way, to show teachers how to help students in this way, and to analyze the data that flows from this work, is expected to be a lot of fun for user's, teachers, students, and data analysts alike.

Although a number of tests may be developed and implemented, the primary examples of the systems and methods provided herein describe two types of assessment tests: gestalt and special purpose. The gestalt test focuses on the entirety of a user's math education to the present, and continues to test, branch, and formulate more problems until the user's math skill set has been mapped. By contrast, a special purpose test is a targeted assessment that focuses on certain topics, concepts, or even concept clouds. In either case, as users work with the systems and methods, the systems continually update the user's UDP and SkillsMap to reflect the latest challenges and advancements. One contemplated method to track and interpret student progress is the dynamic complexity model.

It is believed that concept clouds are good pedagogical tools and there are instances in which it is beneficial for user to initiate the CCR Module with a concept cloud construction of his or her own. In the examples above, item (1)(d) (RECEIVE INPUT|HUMAN-CONSTRUCTED CONCEPT CLOUD) is similar in effect to item (1)(a)(i) (RECEIVE INPUT|DESCRIPTIVE USER INPUT|A CHECKLIST OF CONCEPTS OR FEATURES TO BE INCLUDED IN THE MATH PROBLEM) and item (1)(a)(iv) (RECEIVE INPUT|DESCRIPTIVE USER INPUT|ONE OR SEVERAL KEYWORDS). Each of these may be ways for the user to input a concept cloud or similar input to the CCR Module Accordingly, the user and members of the user's support networks—parents, teachers, tutors, peers, or the student himself—may construct their own concept clouds. While this saves the system a step in the process to dynamically construct math problems, it also opens to the users, including students and teaches alike, a unique and valuable venue to explore mathematics.

Item (1)(e) (RECEIVE INPUT|HUMAN-SELECTED MATH PROBLEM) requires the system to be able to read a mathematical expression and automatically parse it for its component concepts. This capability is the purpose and function of the CCE Module. When a user inputs a math problem, the output is a parsed concept cloud and, optionally, one or more (per the user's directions and the cycle described earlier in this section) math problems that enable the user to study and practice the same concept cloud (perhaps with progressively shifted headline concepts).

A new possibility arises with this option: when concept clouds are ordered in a continuum (perhaps a branched continuum for multi-polar clouds) from the most simple expression of the headline concepts through a smooth continuum to progressively more complex concept clouds—introducing one or a few concepts at each minute gradation, and for each configuration of the gradually morphed concept cloud generating a collection of math problems as examples and practice—then users can order collections of problems by their degree of separation from the original concept configuration and the output represents a finely graded progression of content to lead the user through fine-grained development and practice of mathematics skills. Presentation of the continuum—with bookend concepts—could resemble a timeline continuum or light spectrum. In one embodiment, at each change, the system specifies the concept change and provides a link to the collection of math problems that illustrate and practice the new cloud configuration. Accordingly, users may easily select a progression from one or a few headline concepts to another set and allow the system to dynamically construct the content and track the user's progression. If this functionality is combined with a TextMap of any document (textbook of mathematics, science, or a technical document in industry), the CCE module could automatically identify and fill in gaps, or be applied to identify where an explanation, or perhaps how the development of a new product, might be improved.

The optional step 2 described above (ASSESS THE USER'S USER DATA PACKET TO DETERMINE WHAT THE USER NEEDS) implies that the user's settings may direct the system to constrain its generated math problems by the status of the relevant UDP. As further discussed above, item (1)(a)(iii), (RECEIVE INPUT|DESCRIPTIVE USER INPUT|A TARGETED MATH TOPIC) also means that the user may direct the system to disregard the UDP when it constructs concept clouds and math problems so that it outputs a set of math problems based on the concept cloud and not on the attributes of the user's unique SkillsMap.

In some instances, item (1)(b) (RECEIVE INPUT 'DETAILED ONLINE DATA ABOUT A USER'S DEVELOPMENT, E.G., FROM THE UDP) and step 2 comprise a single step to determine the required problem and customize it to the user's requirements. In such instances, for items (1)(a) and its sub-points and items (1)(c)-(1)(e), step 2 customizes the problem on the basis of the type of input that the system receives about individual or collective user capabilities from the UDP.

Steps 3 and 4 represent core capabilities of the systems and methods: (a) given human or system input, assemble an appropriate concept cloud (step 3) and (b) automatically compose a set of algorithmic problems that individually, or at least collectively, represent or mathematically articulate that concept cloud in its entirety (but not more or less than its entirety) (step 4). It is contemplated that the generated set of problems may collectively represent the entirety of the concept cloud or they may each (individually) represent the entirety of the concept cloud. Effective limits to the universe of possible problems generated from the CCR Module may be external to the process (e.g., create a dozen problems) or more organically limited (such problems can incorporate one hundred percent of the concepts in the subject concept cloud).

The CCE/CCR Module is able to generate math problems from unipolar concept clouds, multi-polar concept clouds, intersections of concept clouds, multiple concept clouds, and serial or parallel concept clouds. These capabilities provide system researchers insights as to the nature and interconnectedness of mathematics and into new possibilities for effective pedagogy that builds procedural flexibility.

Finally, the concepts supporting steps 5, 6, and 7 (solve the constructed problem(s), test the problem(s), and deliver the problem(s) to the student) are self-explanatory.

To summarize the seven-step process, given a math problem, subject, or topic as context to set the range of concepts that drawn from an ontology of mathematics (which then comprises a concept cloud), and a description of a user's capabilities as a set of controls, human- or system-originated input (items (1)(a) and its sub-points through item (1)(e), including user-configured settings, can then instantiate and control the process to dynamically generate math problems. Certain input may truncate the process, e.g., by eliminating step 2 if the input to the system is from item (1) (b), or user-configured settings direct the system to disregard the user's UDP; or by eliminating step 3 if the input is a human-constructed concept cloud (item (1)(d), unless the system in step 3 performs a verification process to ensure the feasibility (i.e., no Gaps) of the concept cloud; or if the input is a machine-generated concept cloud (e.g., item (1)(e)).

In some embodiments, the systems and methods described herein store the math problems and concept clouds that are generated, as well as data that describes student performance with those problems and clouds. This enables the systems' data stores to be mined for any insights about users, system performance, and even about the nature of mathematics, and to identify new features to improve the system's ability to support users, including students and teachers, in their development.

CLI Instructions by Experience Level/Grade Level

In some contemplated examples of the systems and methods described herein, each set of CLI instructions includes properties, attributes, variables, and templates with functions operators, and arguments that are appropriate for the user's current level (e.g., for a student user, the student's grade level). For example, it may be the case that a given CLI can be related to several CLI instructions, each corresponding to a given grade level. In each CLI instruction, the instructions distinguish the operations by the grade level of the student user (stored in the user's UDP that captures relevant attributes of the user's math skill set and the history of its development) as located in the appropriate neighborhood of the ontology.

CCE Process

The objective of the CCE module is to automatically distill concepts of mathematics that are expressed in representation of mathematics. As used herein, the collection of concepts that comprise a representation of mathematics is called the concept cloud.

The problem being extracted to produce a concept cloud in this example is 6+x=7. The solution approach being extracted along with the problem is "involving Pre-Algebra". The output includes an associated segment of the spine. The headline concept for the problem is Variables (CLI 570). Below that as sub-headline concepts are Addition (CLI 635) and Equivalency (CLI 716).

The headline concept for the concept cloud that includes the problem and the solution is CLI 625 (Combining Like Terms). Below that are CLIs 701 (Subtraction), 622 (Inverse Operations), 719 (Additive Identity Property of Zero), and 718 (Symmetric Property of Equality), then followed by 570 (Variables), 635 (Addition), and 716 (Equivalency). While the problem's concept cloud is unipolar, when that same concept cloud is expanded to include concepts from the problem's algebraic solution, the concept cloud becomes multi-polar, especially since headline concept CLI 625 comprises several other CLIs.

The CCE algorithm starts with an algorithmic math expression ("AME") and its solution, and produces a subgraph of CLIs from the overall ontology that are needed to understand and solve the AME. This can be done as follows:

1. Rewrite the AME in, or transform it to, LaTex or MathML (either of which can be hierarchical descriptions, parsings of the AME, or intermediate steps between an AME and a hierarchical description), and/ or a hierarchical description such as an expression tree, or expressions of the AME in Polish notation (Prefix) or Reverse Polish Notation (RPN, Postfix).
2. Start at the highest level of the hierarchical description and move through the description from the top of the ontology, arrayed in a directed graph of antecedents and postcedents, to the bottom of the ontology.
3. At each stage, check all CLIs to see if their instructions/patterns/tags match the current portion of the description. If they do, add them to the set of CLIs needed for this AME and its solution.

At this point, the CCE module has the starting point it needs for the problem expression and each step of its solution. To complete the extraction, the CCE module takes each CLI in the set built in step 3 above and adds to it all of the CLIs needed to support that CLI in that set (the downline). This process continues until no more CLIs need to be added.

This final set of CLIs and the associated portion of the ontology graph form the extracted concept cloud.

Example CCE Algorithm

For reference, the following is the text file for the problem and solution to 6+x=7 in the MathML format:

```
<math xmlns="http://www.w3.org/1998/Math/MathML" display="block">
<mrow><mn>6</mn><mo>+</mo><mi>x</mi><mo>=</mo><mn>7</mn></mrow>
<mrow><mn>6</mn><mo>+</mo><mi>x</mi><mo>-</mo><mn>6</mn><mo>=</mo><mn>7</mn><mo>-</mo><mn>6</mn></mrow>
<mrow><mo>(</mo><mn>6</mn><mo>-</mo><mn>6</mn><mo>)</mo><mo>+</mo><mi>x</mi><mo>=</mo><mo>(</mo><mn>7</mn><mo>-</mo><mn>6</mn><mo>)</mo></mrow>
<mrow><mn>0</mn><mo>+</mo><mi>x</mi><mo>=</mo><mn>1</mn></mrow>
<mrow><mi>x</mi><mo>=</mo><mn>1</mn></mrow>
</math>
```

For further reference, the following is the text file for the problem and solution to 6+x=7 in the LaTex format:

```
\begin{equation}
6 + x = 7
\end{equation}
\begin{equation}
6 + x - 6 = 7 - 6
\end{equation}
\begin{equation}
(6 - 6) + x = (7 - 6)
\end{equation}
\begin{equation}
0 + x = 1
\end{equation}
\begin{equation}
x = 1
\end{equation}
```

The example problem and its solution appear in the following tables expressed in Infix notation, Polish prefix notation, LaTex, and MathML.

Problem

| Infix | Polish (Prefix) | LaTex | MathML |
|---|---|---|---|
| 6 + x = 7 | = + 6 x 7 | \begin{equation} 6 + x = 7 \end{equation} | <math xmlns="http://www.w3.org/1998/Math/MathML" display="block"> |

-continued

| Infix | Polish (Prefix) | LaTex | MathML |
|---|---|---|---|
| 6 + x = 7 | = + 6 × 7 | \begin{equation}<br>6 + x = 7<br>\end{equation} | <mrow><mn>6</mn><mo>+</mo><mi>x</mi><br><mo>=</mo><mn>7</mn></mrow><br><math xmlns="http://www.w3.org/1998/Math/MathML" display="block"><br><mrow><mn>6</mn><mo>+</mo><mi>x</mi><br><mo>=</mo><mn>7</mn></mrow> |
| 6 + x − 6 = 7 − 6 | = − + 6 x 6 − 7 6 | \begin{equation}<br>6 + x − 6 = 7 − 6<br>\end{equation} | <mrow><mn>6</mn><mo>+</mo><mi>x</mi><br><mo>−</mo><mn>6</mn><br><mo>=</mo><mn>7</mn><mo>−</mo><mn>6</mn></mrow> |
| 6 − 6 + x = 7 − 6 | = + − 6 6 x − 7 6 | \begin{equation}<br>6 − ) + x = 7 − 6<br>\end{equation} | <mrow><mn>6</mn><mo>−</mo><mn>6</mn><mo>+</mo><mi>x</mi><mo>=</mo><mn>7</mn><mo>−</mo><mn>6</mn></mrow> |
| 0 + x = 1 | = + 0 x 1 | \begin{equation}<br>0 + x = 1<br>\end{equation} | <mrow><mn>0</mn><mo>+</mo><mi>x</mi><br><mo>=</mo><mn>1</mn><br></mrow> |
| x = 1 | = x 1 | \begin{equation}<br>x = 1<br>\end{equation} | <mrow><mi>x</mi><mo>=</mo><mn>1</mn><br></mrow><br></math> |

Solution

In prefix notation, the AME and each step of its solution can be parsed into their components. For example, the AME 6+x=7 is parsed into the symbols +, x, and =, and the numerals 6 and 7. The CCE module searches CLIs that are tagged with these symbols and returns one or a few CLIs that have the greatest importance score or the lightest weight score within the range of concepts that apply to the grade level or math subject or topic in question (in this case, Pre-Algebra). The symbol x returns several CLIs, including CLI 570, the primitive node of the spine of the ontology for variables. Since CLI 570 is a node on the spine, it likely carries the heaviest importance score. So CLI 570 becomes the headline concept for the concept cloud of the AME 6+x=7.

The CCE algorithms then locate CLI 570 on the directed graph of the ontology (ordered by prerequisites and dependencies) and its associated node-edge incidence matrix, and follow the node-edge connections from CLI 570 down to the bottom of the ontology, adding each to the set of CLIs required for the AME concept cloud. This process is repeated for each step of the solution, and all identified CLIs are added to the set until each step of the solution has been parsed and extracted in this way.

The resulting set of CLIs for just the AME is the expression concept cloud, or ExCC, and the concept cloud for the solution is the Solution Concept Cloud, or SCC. Combined, the ExCC and SCC make up part of a Master Concept Cloud, or MCC. All CLIs that comprise the ExCC and the SCC are listed below. There are 415 example CLIs drawn from an example ontology of 730 CLIs.

Variables

569 Variables are placeholders used to express unknown quantities, define functions, express other universal statements, and serve as generic elements in mathematical discussions.
Ref.: Epp, Susanna S., DePaul University: http://condor.depaul.edu/sepp/VariablesInMathEd.pdf 570 A variable holds the place for an unknown quantity, a numeral or a range of numerals that complete the expression.
Ref.: Epp, Susanna S., DePaul University: http://condor.depaul.edu/sepp/VariablesInMathEd.pdf 572 The ideas of "any" and "some" are introduced to algebra by [variables]., Whitehead, A. N.: An Introduction to Mathematics.
Ref.: Henry Holt and Co., New York (1911)

573 A variable is just a placeholder that can be represented by a blank ("_") any letter or symbol such as x, y, a, b, m, n, or T.
Ref.: (Extractor), Analyst's Original Work 574 By holding the place for the unknown quantity in an equation, the variable enables us to work with it in the same way that we would work with a number [that has a] value that we know, and this is what enables us to deduce what its value or values might be. When we solve an equation, we operate with the unknown (or unknowns) as if it [they] were a known quantity.
Ref.: Epp, Susanna S., DePaul University: http://condor.depaul.edu/sepp/VariablesInMathEd.pdf 575 As opposed to the constants, the variables do not possess any meaning by themselves., Tarski, A.: Introduction to Logic and to the Methodology of Deductive Sciences.
Ref.: Oxford University Press, New York (1941)

577 Separate this traditional word of mathematics [variable] from its archaic connotations. The variable is not best thought of as somehow varying through time, and causing the sentence in which it occurs to vary with it.
Ref.: Quine, W. V. O.: Methods of Logic, 4th edn. Harvard University Press, Cambridge (1982)

578 The variable does not actually represent its entity, such as time, distance, apples, or pears, but holds a place for substituting the number of or a measure of the entity. So, it is not the t or the d that changes, it is the values—the number of hours, or the number of miles—that may be put in place of the variables.
Ref.: Epp, Susanna S., DePaul University: http://condor.depaul.edu/sepp/VariablesInMathEd.pdf 579 By themselves, expressions such as "y=2x+1" are meaningless; [they are] simply predicate[s], or open sentences, that achieve meaning when particular numbers and denominations are substituted in place of the variables or when they are part of . . . longer sentence[s] that [include] words such as "for all" and 'there exists.
Ref.: Epp, Susanna S., DePaul University: http://condor.depaul.edu/sepp/VariablesInMathEd.pdf 580 In equations or expressions with multiple variables, the number we begin with or plug in to the expression or equation is the independent variable.
Ref.: Paraphrased from Epp, Susanna S., DePaul University: http://condor.depaul.edu/sepp/VariablesInMathEd.pdf 581 In equations or expressions with multiple variables, the number we end up with when we solve the equation with the plugged-in variable is the dependent variable.
Ref.: Paraphrased from Epp, Susanna S., DePaul University: http://condor.depaul.edu/sepp/VariablesInMathEd.pdf 582 Specific letters that hold the places for the variables have no meaning to themselves.
Ref.: Epp, Susanna S., DePaul University: http://condor.depaul.edu/sepp/VariablesInMathEd.pdf 583 To solve an equation for a variable like x simply means to find all numbers (if any) that can be substituted in place of [the variable] x so that the left-hand side of the is equation equal to the right-hand side.
Ref.: Epp, Susanna S., DePaul University: http://condor.depaul.edu/sepp/VariablesInMathEd.pdf 584 The letter represents the number that we want to find.
Ref: http://www.helpingwithmath.com/by_subject/algebra/alg_solving01.htm Pattern Recognition 587 When you see a problem, look for patterns. Is it describing one or maybe more patterns?
Ref.: Analyst's Original Work 588 When you see a problem, ask yourself what the problem is really saying.
Ref: Analyst's Original Work 589 When you see a problem, first ensure that you understand each quantity and symbol.
Ref.: Analyst's Original Work 590 When you see a problem, ask yourself where else you might have seen anything that appears in that problem.
Ref.: Analyst's Original Work 591 Counting is a basic pattern that reoccurs in many forms throughout mathematics.
Ref.: Analyst's Original Work 151 Examples of temporal and kinesthetic patterns are finger patterns, rhythm patterns, and audio patterns.
Ref.: http://gse.buffalo.edu/fas/clements/files/Subitizing.pdf Successorship, Succession Counting, and Size 1 "One more than" some number is the same as the successor to that number.
Ref: Analyst's Original Work 701 "One less than" some number is the same as the predecessor to that number.
Ref: Analyst's Original Work 2 "One more than" is used in counting on to find the next number.
Ref: Dr. Wright's Kitchen Table Math, Book 1, p. 7

14 A finite sequence is a sequence in one-to-one correspondence with a finite set, that is, a set that has limits or bounds.
Ref.: Nelson, Penguin Dictionary, p. 398

447 The opposite of "one less than" is "one more than."
Ref: Analyst's Original Work 474 The successor of four is five.
Ref: Analyst's Original Work 475 The successor of three is four.
Ref: Analyst's Original Work 480 The successor to five is six.
Ref: Analyst's Original Work 484 The successor to one is two.
Ref: Analyst's Original Work 487 The successor to six is seven.
Ref: Analyst's Original Work 490 The successor to the previous number is also a number.
Ref: http://mathworld.wolfram.com/PeanosAxioms.html 493 The successor to two is three.
Ref: Analyst's Original Work 534 Two numbers with equal successors [or, the same successor] are equal.
Ref: http://mathworld.wolfram.com/PeanosAxioms.html 553 When counting, the previous number is one less than the next number.
Ref: Analyst's Original Work 567 Zero is not the successor of any counting number.
Ref: http://mathworld.wolfram.com/PeanosAxioms.html 592 The result of the addition of one to a number is the successor of that number.
Ref: https://en.wikipedia.org/wiki/Elementary_arithmetic 593 Every natural number has a successor.
Ref: https://en.wikipedia.org/wiki/Elementary_arithmetic 594 The successor to zero is one.
Ref: https://en.wikipedia.org/wiki/Elementary_arithmetic 595 The predecessor of the successor of a number is the number itself.
Ref: https://en.wikipedia.org/wiki/Elementary_arithmetic 596 Every natural number except zero has a predecessor.
Ref: https://en.wikipedia.org/wiki/Elementary_arithmetic 597 The natural numbers are the positive integers (or whole numbers), including zero.
Ref.: Paraphrased after the Apple Dictionary 598 If a number is the successor of another number, then the first number is said to be larger than the other number.
Ref.: https://en.wikipedia.org/wiki/Elementary_arithmetic 599 If a number is larger than another number, and if the other number is larger than a third number, then the first number is also larger than the third number.
Ref.: https://en.wikipedia.org/wiki/Elementary_arithmetic 600 If two non-zero natural numbers are added together, then their sum is larger than either one of them.
Ref.: https://en.wikipedia.org/wiki/Elementary_arithmetic 602 If a number is larger than another one, then the other is smaller than the first one.
Ref.: https://en.wikipedia.org/wiki/Elementary_arithmetic 604 A number cannot be at the same time larger and smaller than another number.
Ref: https://en.wikipedia.org/wiki/Elementary_arithmetic 605 A number cannot be at the same time larger than and equal to another number.
Ref: https://en.wikipedia.org/wiki/Elementary_arithmetic 606 For every pair of natural numbers, one of the following cases must be true: the first number is larger than the second one, the first number is equal to the second one, or the first number is smaller than the second one.
Ref.: https://en.wikipedia.org/wiki/Elementary_arithmetic
607 In the context of integers, subtraction of one also plays a special role: for any integer a, the integer (a−1) is the largest integer less than a, also known as the predecessor of a.
Ref.: https://en.wikipedia.org/wiki/Elementary_arithmetic#Subtraction
702 The opposite of "one more than" is "one less than."
Ref: Analyst's Original Work
703 The successor to x is (x+1).
Ref: Analyst's Original Work
704 The predecessor to x is (x−1).
Ref: Analyst's Original Work Counting and Number Identity 3 "One, two, three, . . . " is the beginning of the order used to count.
Ref: Dr. Wright's Kitchen Table Math, Book 1, p. 5
5 The cardinal number of a set refers to the size of the entire collection of objects.
Ref: Young Children Continue to Reinvent Arithmetic—2nd Grade: Implications of Piaget's Theory, Kamii and Joseph, p. 7
10 A counting number can be both the order of an object in an enumeration of a set (ordinality), and the size of the set (cardinality).
Ref.: Young Children Continue to Reinvent Arithmetic—2nd Grade: Implications of Piaget's Theory, Kamii and Joseph, p. 7
12 A counting order is an organization of a collection wherein each object can be easily counted one after the other.
Ref.: Analyst's Original Work
15 A finite set is a set whose cardinality is some counting number.
Ref: http://en.wikipedia.org/wiki/Finite_set
23 A one-to-one correspondence is a pairing between two sets with each element in one set associated to exactly one element in the other set.
Ref.: Nelson, Penguin Dictionary, p. 319
24 A physical quantity is a quantifiable and reproducible characteristic of matter or energy.
Ref.: Penguin Dictionary, Nelson, p. 340
27 A running total is a sum to which the value of any additional number is successively added.
Ref.: http://en.wikipedia.org/wiki/Running_total
28 A sequence is a succession of terms in one-to-one correspondence with the counting numbers.
Ref.: Nelson, Penguin Dictionary, p. 398
39 A unit of measurement is a standard used to measure some physical quantity either by groups, in skip counting for example, or by some quantity of matter or energy.
Ref.: http://en.wikipedia.org/wiki/Units_of_measurement
45 Addition of whole number addends represents collecting objects into a larger collection.
Ref.: http://en.wikipedia.org/wiki/Addition
49 After the number one, additional fingers may be raised to represent a larger count.
Ref: http://en.wikipedia.org/wiki/Finger_counting
53 An order used to count objects is a selection of one object as first, another object as second, and so on.
Ref.: Analyst's Original Work
54 An ordinal number refers to the order of a specific object in a collection.
Ref: Young Children Continue to Reinvent Arithmetic—2nd Grade: Implications of Piaget's Theory, Kamii and Joseph, p. 7
57 Assigning multiple groupings to one finger may violate the one-to-one principle and result in an erroneous total.
Ref.: Analyst's Original Work
58 Associating more than one counting number to a toe is a violation of the one-to-one principle.
Ref.: Analyst's Original Work
59 Associating more than one toe to a counting number is a violation of the one-to-one principle.
Ref.: Analyst's Original Work
67 In some cases and for some people, subitization becomes more difficult to perform beyond four objects.
Ref.: Number Sense, p. 68/Where Mathematics Comes From, p. 15
69 By the last number principle, the last item counted determines the cardinality of a set.
Ref.: Dr. Wright's Kitchen Table Math, Book 1, p. 5
70 By the last number principle, the size of a collection is the number of the last item counted in the collection.
Ref.: Dr. Wright's Kitchen Table Math, Book 1, p. 5
74 Cardinal-number assignment is the ability to apply the last number principle. It transfers the final ordinal number, out of the sequence of counting, and assigns it as the size of the group counted.
Ref.: Where Mathematics Comes From, p. 51
85 Conceptual subitization is the ability to recognize a collection both as a composition of units and as a complete whole.
Ref.: http://gse.buffalo.edu/fas/clements/files/Subitizing.pdf
86 Conceptual subitization assumes accurate enumeration skills.
Ref: http://gse.buffalo.edu/fas/clements/files/Subitizing.pdf
88 To count a horizontal array of objects, while counting items progress from one end of the row to the other.
Ref.: Analyst's Original Work
89 To count a vertical array of objects, while counting items progress from one end of the column to the other.
Ref.: Analyst's Original Work
93 Counting a collection again, after it has already been counted, is called recounting.
Ref.: Analyst's Original Work
94 Counting a collection of objects is not dependent on the types of objects being counted.
Ref.: Dr. Wright's Kitchen Table Math Book 1, p. 5
95 Counting by 5 is frequently used when making tally marks.
Ref: http://en.wikipedia.org/wiki/Tally_marks
96 Counting vertically is convenient if the objects are arranged in columns.
Ref: Analyst's Original Work
97 Counting horizontally is convenient if the objects are arranged in rows.
Ref: Analyst's Original Work
98 An example of counting from one is counting, with opposing hands, two collections with up to five elements each. As the counting of the second collection begins, start with one rather than counting on from the count of the previous collection.
Ref.: Analyst's Original Work 99 "Counting from one" means the count resets to one at the beginning of each grouped sub-collection.
Ref: Analyst's Original Work 100 Counting from one can render the cardinality of a set. Counting on can render the cardinality of a collection of sets
Ref.: Analyst's Original Work 101 Counting in groups is a useful strategy when a large collection of objects is being counted.
Ref.: Dr. Wright's Kitchen Table Math Book 1, p. 7

102 Counting in groups is also called skip counting.
Ref: Dr. Wright's Kitchen Table Math Book 1, p. 68

103 Counting is the process of enumeration.
Ref: Oxford Dictionary, Clapham and Nicholson, p. 101

104 Counting is the same as group counting when the group has size one.
Ref: Analyst's Original Work 105 Counting larger sets with tally marks is not always feasible because of the number of tallies required.
Ref.: http://en.wikipedia.org/wiki/Tally_marks 106 Counting next from the counted and grouped, or counted but not yet grouped, sub-collections results in double-counting.
Ref.: Analyst's Original Work 107 Counting objects one after the other is a good way to adhere to the One-to-One principle.
Ref.: Dr. Wright's Kitchen Table Math, Book 1, p. 5

108 Counting on can be used to count multiple columns by starting from the beginning of a new column when the end of the current column is reached.
Ref.: Analyst's Original Work 109 Counting on can be used to count multiple rows by starting from the beginning of a new row when the end of the current row is reached.
Ref.: Analyst's Original Work 110 If the collection being counted is large, counting on from the start of each sub-collection requires knowledge of a wide range of counting numbers.
Ref: Analyst's Original Work 111 Counting on is the process of counting when the starting number of a new set being appended to the count is greater than one.
Ref.: Dr. Wright's Kitchen Table Math, Book 1, p. 7

113 Counting stops when there are no objects left to be counted in any sub-collection or collection.
Ref.: Analyst's Original Work 114 Counting to five proceeds in the order one, two, three, four, five.
Ref: Dr. Wright's Kitchen Table Math, Book 1, p. 8

706 Counting to [number n] proceeds in the order [1, . . . n].
Ref: Analyst's Original Work 115 Counting to ten proceeds in the order one, two, three, four, five, six, seven, eight, nine, ten.
Ref.: Dr. Wright's Kitchen Table Math, Book 1, p. 9

117 Counting verbally is a good way to gain mastery of the words used to describe quantities.
Ref.: Dr. Wright's Kitchen Table Math, Book 1, p. 8

126 Double counting is likely to result in an erroneous total for the size of a collection.
Ref.: http://en.wikipedia.org/wiki/Double_counting_(fallacy)

128 Double-counting occurs when the counted and grouped sub-collections have objects in common.
Ref.: Analyst's Original Work 129 Each finger must correspond to no more than one object when counting with fingers.
Ref.: Analyst's Original Work 131 Each number word between thirteen and nineteen ends in -teen.
Ref: Elementary Math Teacher's Book of Lists, p. 116

133 Each tally represents one object in a count.
Ref: http://en.wikipedia.org/wiki/Tally_marks 142 Emergent Counting is a stage when a student cannot count visible items.
Ref: Early Numeracy, Wright, p. 20, 22

143 An enumeration is a complete, ordered listing of the items in a collection.
Ref: http://en.wikipedia.org/wiki/Enumeration 152 Facility in conversion between digits and the quantities they represent is called analogical representation of quantitative meaning.
Ref.: Number Sense, p. 74

153 Failure to combine the totals from each counted and grouped collection when tabulating the total results in a total that is too low.
Ref.: Analyst's Original Work 157 Figurative Counting is a stage when a student can count concealed items, but may add unnecessary steps.
Ref.: Early Numeracy, Wright, p. 20, 22

158 Five can be represented by extending all of the fingers on one hand.
Ref: Dr. Wright's Kitchen Table Math, Book 1, p. 8

160 Five ones marked as counted can be collected into one group of five.
Ref: Analyst's Original Work 166 For counts between five and ten (or eleven and twenty if counting fingers and toes), previously raised fingers (or toes) remain raised.
Ref.: http://en.wikipedia.org/wiki/Finger_counting 168 For sub-collections of equal size, counting in groups begins by stating the number of objects in one sub-collection (skip counting).
Ref.: Analyst's Original Work 175 From one to five, each finger on one hand can be put in one-to-one correspondence with objects in a collection.
Ref.: Dr. Wright's Kitchen Table Math, Book 1, p. 8

176 Given multiple collections, counting each by counting on from the previous total gives the total for all collections.
Ref.: Analyst's Original Work 177 Given two collections, counting the second by counting on from the size of the first gives the total count of the two collections.
Ref.: Analyst's Original Work 178 Grouping by fives is natural because we have five fingers on each hand.
Ref: Analyst's Original Work 179 Grouping by location is more difficult for objects far from each other.
Ref: Analyst's Original Work 182 Hash marks are a form of numeral used for counting smaller sets.
Ref: http://en.wikipedia.org/wiki/Tally_marks 183 Hierarchical inclusion is the ability to mentally include smaller numbers inside of larger numbers.

Ref.: Young Children Continue to Reinvent Arithmetic—2nd Grade: Implications of Piaget's Theory, Kamii and Joseph, p. 7

188 If a circled sub-collection is larger than desired, group again but [this time] collect fewer objects.
Ref.: Analyst's Original Work 189 If a circled sub-collection is smaller than desired, group again but [this time] collect more objects.
Ref.: Analyst's Original Work 190 If a collection of objects has been labeled from one to n following the ordered numbers principle, then the number of objects is n.
Ref.: Analyst's Original Work 191 If a count does not follow the ordered numbers principle, the total obtained will likely be incorrect.
Ref.: Analyst's Original Work 193 If any of counted and grouped sub-collections have objects in common, regroup the collections so they do not share objects [to avoid double-counting].
Ref.: Analyst's Original Work 195 If counting from one is used after each counted and grouped sub-collection, the last number spoken is smaller than the ordinal number of the last item were the entire collection counted with the counting-on method.
Ref.: Dr. Wright's Kitchen Table Math, Book 1, p. 5

196 If counting on from one is used to count, the last number spoken is the ordinal number of the last item.
Ref.: Dr. Wright's Kitchen Table Math, Book 1, p. 5

197 If different orders produce different counts, at least one of the counts must be incorrect.
Ref.: Analyst's Original Work 198 If different orders produce the same counts, it is more likely the count is correct.
Ref: Analyst's Original Work 205 If the first object in a collection is associated to a number other than one, the total number of objects counted will be incorrect and will need adjustment by the distance of the first counting number is from one.
Ref.: Analyst's Original Work 206 If the group has size n, the next number when counting in groups is n more than the previous number.
Ref.: Analyst's Original Work 207 If the ordered numbers principle is violated, the largest number associated to a collection is unlikely to represent the size of the collection.
Ref.: Analyst's Original Work 208 If the ordering of the digits in the word form of a number is changed, the number represented usually changes as well.
Ref.: Analyst's Original Work 209 If toes are used to count, each toe should be associated to one counting number.
Ref: Analyst's Original Work 212 If you count from one after a collection has been grouped, you can combine the totals from each counted and grouped collection to arrive at the final total for all collections.
Ref: Analyst's Original Work 216 The unary numeral system is another name for the base-1 numeral system in which natural numbers N are represented by a symbol, such as a hash or tally mark, that represents 1 and that is repeated N times.
Ref.: http://en.wikipedia.org/wiki/Unary_numeral_system 235 Inclusion of smaller numbers inside of larger numbers allows us to distinguish between cardinal numbers and ordinal numbers.
Ref.: Young Children Continue to Reinvent Arithmetic—2nd Grade: Implications of Piaget's Theory, Kamii and Joseph, p. 7

236 Instead of counting on, collections can each time be counted starting from one.
Ref: Analyst's Original Work 239 When counting all elements from multiple collections, maintain a sum of sub-collection totals, updating it each time an new sub-collection is added by adding the number of elements in that new sub-collection to the previous total.
Ref.: Analyst's Original Work 242 Keeping a running total typically requires less calculation than continually adding from the beginning of a list of numbers.
Ref.: http://en.wikipedia.org/wiki/Running_total 707 A running total is the summation of a sequence of numbers which is updated each time a new number is added to the sequence, by adding the value of the new number to the previous total.
Ref.: http://en.wikipedia.org/wiki/Running_total 244 Marking an object as counted provides no information about the order used to count that object. There are ways to give yourself and others more information.
Ref.: Analyst's Original Work 245 Marking an object more than once may indicate possible double counting.
Ref: http://en.wikipedia.org/wiki/Double_counting_(fallacy)

246 Marking an object with a pen or pencil is a helpful way to identify previously counted objects.
Ref.: Analyst's Original Work 247 Marking multiple objects at once violates the one-to-one principle.
Ref: Dr. Wright's Kitchen Table Math, Book 1, p. 5

248 Members of a set can be counted by means of the one-to-one principle.
Ref: Dr. Wright's Kitchen Table Math, Book 1, p. 5

265 Objects in a collection have a total number depending on the collection itself.
Ref: Dr. Wright's Kitchen Table Math Book 1, p. 5

269 Once a sub-collection has been grouped, continue counting the collection either by counting on from the last number of the previous sub-collection or reset the count to one (and then when finished add all counts together).
Ref.: Analyst's Original Work 271 One counted set of [number] consists exclusively of previously counted [ones, tens, hundreds, etc.].
Ref.: Analyst's Original Work 284 One more than the previous number is always the next number when counting.
Ref: Dr. Wright's Kitchen Table Math, Book 1, p. 5

287 Select objects from the uncounted sub-collection to count next.
Ref: Analyst's Original Work 289 Ordinal numbers indicate position in a sequence.
Ref: Oxford Dictionary, Clapham and Nicholson, p. 330

301 Previously counted objects are less likely to be counted again if they are clearly marked when counted.
Ref.: Analyst's Original Work 305 Recounting with different orders is one way to check your work.
Ref: Analyst's Original Work 306 Removing objects from a collection decreases its size.
Ref: Analyst's Original Work 307 Representing each object in a count by its own tally implies that tallies are an example of the unary numeral system.
Ref.: http://en.wikipedia.org/wiki/Unary_numeral_system 308 When counting a collection of groups, resetting the count to one at the beginning of each sub-collection consequently involves smaller counting numbers than counting on after each counted sub-collection.
Ref.: Analyst's Original Work 312 Unless objects that are shared among several sub-collections are identified and counted once, they could be double-counted or even counted several times.
Ref.: Analyst's Original Work 313 Six can be represented using all the fingers of one hand and one finger on the other hand.
Ref.: Dr. Wright's Kitchen Table Math, Book 1, p. 9

708 [Number] can be represented using x fingers of one hand [and y fingers of the other hand].
Ref.: Analyst's Original Work 320 Skip counting is counting by [n], beginning with the numbers [n, 2n, 3n, 4n, etc.] and continuing until the count is complete.
Ref.: Analyst's Original Work 322 Skip counting is a faster way to count because not every counting number is explicitly used.
Ref.: Dr. Wright's Kitchen Table Math Book 1, p. 67

324 Skip counting is used to keep a running total of a collection as it is counted.
Ref: Analyst's Original Work 328 Combining counted and uncounted objects together may result in an erroneous total.
Ref.: Analyst's Original Work 329 Sorting counted objects makes it easier to focus on the uncounted objects.
Ref: Analyst's Original Work 330 Sorting objects based on whether or not they have been previously counted can be a helpful way to order a collection.
Ref.: Elementary Math Teacher's Book of Lists, p. 51

334 Taking half of a collection means to split it into two equally sized sub-collections.
Ref: Dr. Wright's Kitchen Table Math, Book 1, p. 89

335 Tally marks are also called hash marks.
Ref: http://en.wikipedia.org/wiki/Tally_marks 347 The assignment of one number word to one object in a collection is an example of observing the one-to-one principle.
Ref.: Dr. Wright's Kitchen Table Math Book 1, p 0.5

355 The cardinal number of a set containing n objects equals n.
Ref: Nelson, Penguin Dictionary, p. 47

356 The cardinality of a composed unit consisting of n objects equals n, if the units counted are objects in the unit rather than the composed unit itself.
Ref.: Analyst's Original Work 357 The cardinality of a set depends on how the elements of a set are grouped—those groups are called units—and applied as the basis for counting.
Ref.: http://ed.ted.com/lessons/one-is-one-or-is-it 358 The cardinality of a set is also called the cardinal number of the set.
Ref: Nelson, Penguin Dictionary, p. 47

359 The cardinality of a set is determined by the number of groups of [tens, hundreds, thousands, etc.] and the number of objects left over grouped into [hundreds, tens, ones, etc.] until nine ones or less remain.
Ref.: http://en.wikipedia.org/wiki/Positional_notation 360 The cardinality of a set is the ordinal number of the last item.
Ref: Dr. Wright's Kitchen Table Math, Book 1, p. 5

361 The ordering capacity enables us to put an order on a collection of objects for the purpose of counting.
Ref.: Where Mathematics Comes From, p. 51

364 A counted but not yet grouped sub-collection is a set of one or more objects that you have counted but not yet grouped into a collection of some determined size.
Ref.: Analyst's Original Work 365 A counted and grouped sub-collection is a set of objects that you have both counted and grouped into a collection of some determined size.
Ref: Analyst's Original Work 366 The counting numbers are also called the natural numbers.
Ref: Nelson, Penguin Dictionary, p. 233

367 It is often helpful when counting to mentally, physically, or on paper or a computer create multiple grouped sub-collections.
Ref.: Analyst's Original Work 381 The digits used when writing a count follow the order determined by the ordered numbers principle.
Ref.: Dr. Wright's Kitchen Table Math, Book 1, p. 5

383 The exhaustion-detection capacity is the ability to tell when all objects have been counted.
Ref.: Where Mathematics Comes From, p. 51

384 The final object in the uncounted sub-collection is called the last object.
Ref: Dr. Wright's Kitchen Table Math, Book 1, p. 5

388 The first [n] counting numbers are one [ . . . n].
Ref.: Dr. Wright's Kitchen Table Math, Book 1, p. 3

393 The fixed order used to count begins with the number one.
Ref.: Dr. Wright's Kitchen Table Math, Book 1, p. 5

394 The fixed order used when counting in groups depends on the size of the group.
Ref: Analyst's Original Work 395 The fixed quantity added when counting in groups is the quantity given by one of the equally sized sub-collections.
Ref.: Analyst's Original Work 399 The independent-order capacity is the ability to apply the unordered objects principle.
Ref.: Where Mathematics Comes From, p. 51

400 The last number principle states that the number associated with the final element of a set is the cardinality of the set.
Ref.: Dr. Wright's Kitchen Table Math, Book 1, p. 5

402 The last object is also called the last item.
Ref: Dr. Wright's Kitchen Table Math, Book 1, p. 5

405 The natural numbers are also called the whole numbers.
Ref: http://mathworld.wolfram.com/WholeNumber.html 406 The next number when counting in groups is obtained from the previous number by adding some fixed quantity.
Ref.: Analyst's Original Work 407 The next number when counting is also called the successor to the previous number.

Ref.: http://mathworld.wolfram.com/PeanosAxioms.html

408 A not-yet-counted sub-collection consists of objects you have yet to mark and count.
Ref.: Analyst's Original Work 419 The number of objects left over after counting and grouping by [number, e.g., millions, hundred thousands, ten thousands, thousand, hundreds, tens, etc.] as many times as possible corresponds to the digit in the ones place of the cardinality of the set.
Ref.: Analyst's Original Work 442 The one-to-one principle is an example of a one-to-one correspondence.
Ref: Analyst's Original Work 443 Writing more than one counting number on the same object does not observe the one-to-one principle.
Ref.: Analyst's Original Work 444 If the same counting number is written on the more than one object, the one-to-one principle has not been observed.
Ref.: Analyst's Original Work 445 The one-to-one principle states that when counting a set, each object of the set must correspond to exactly one counting number.
Ref.: Dr. Wright's Kitchen Table Math, Book 1, p. 5

448 The alternative to summation with a running total is repeatedly adding all numbers in a sequence each time a new number is appended to that sequence.
Ref: http://en.wikipedia.org/wiki/Running_total 450 The order followed when counting a collection of objects is determined by the ordinal number assigned, in succession, to each object in that collection.
Ref.: Analyst's Original Work 451 The ordered numbers principle applies to counting in groups as well as counting by ones.
Ref.: Analyst's Original Work 452 The ordered numbers principle states that the order used to count is always fixed.
Ref.: Dr. Wright's Kitchen Table Math, Book 1, p. 5

455 The other hand can be used to continue counting if all the fingers on one hand have been used.
Ref.: Dr. Wright's Kitchen Table Math, Book 1, p. 9

456 The pairing capacity enables us to sequentially pair objects we want to count with some useful counting mechanism, such as fingers.
Ref.: Where Mathematics Comes From, p. 51

467 The size of a collection is called the cardinality or cardinal number of a set.
Ref: Nelson, Penguin Dictionary, p. 47

468 The size of a collection of objects that has been sorted by color is equal to all of the sub-collections of a single color joined together.
Ref.: Elementary Math Teacher's Book of Lists, p. 51

473 The standard order for counting is the order where each number is the successor of the previous number.
Ref.: Analyst's Original Work 501 The unordered objects principle can be used to double-check the accuracy of a count.
Ref.: Dr. Wright's Kitchen Table Math Book 1, p. 5

502 The unordered objects principle states that the cardinality of a set is the same regardless of the order used to count the objects.
Ref.: Dr. Wright's Kitchen Table Math, Book 1, p. 5

507 The words "first," "second," and "third" are examples of ordinal numbers.
Ref: Oxford Dictionary, Clapham and Nicholson, p. 330

516 Three sub-collections useful for counting are (1) counted and grouped, (2) counted but not yet grouped, and (3) not yet counted.
Ref.: Analyst's Original Work 519 To count successfully requires "counting order" and "hierarchical inclusion."
Ref: Elementary Math Teacher's Book of Lists, p. 56

537 Uncounted objects outside of a circled group are easier to identify as not yet counted.
Ref.: Analyst's Original Work 538 Use the fingers on one hand to count from one to five.
Ref: Dr. Wright's Kitchen Table Math, Book 1, p. 8

539 Violating the one-to-one principle usually results in an erroneous total.
Ref: Analyst's Original Work 547 When counting a collection, each object in the collection can be viewed as one unit.
Ref.: Analyst's Original Work 548 When counting in groups, the order when counting is fixed.
Ref: Analyst's Original Work 549 When counting in groups, combining the size of one sub-collection with the size of another sub-collection forms a new number.
Ref.: Analyst's Original Work 551 When counting on from one, the last number spoken [at any point during the count] is the ordinal number of the last item.
Ref.: Dr. Wright's Kitchen Table Math Book 1, p 0.5

552 When counting, one number word is assigned to one object in a collection.
Ref: Dr. Wright's Kitchen Table Math Book 1, p 0.5

555 When objects in a collection are counted more than once, it is called double counting.
Ref.: http://en.wikipedia.org/wiki/Double_counting_(fallacy)

556 When the same number is combined with itself the number is said to have been doubled.
Ref.: Dr. Wright's Kitchen Table Math Book 1, p. 52

558 While counting objects, it helps to sort them into smaller sub-collections.
Ref: Analyst's Original Work 566 Zero is a [natural, counting, and whole] number.
Ref: http://mathworld.wolfram.com/PeanosAxioms.html 568 Zero represents the absence of quantity.
Ref: http://en.wikipedia.org/wiki/0_(number)

608 To count a group of objects means to assign a natural number to each one of the objects, as if it were a label for that object, such that a natural number is never assigned to an object unless its predecessor was already assigned to another object, with the exception that zero is not assigned to any object: the smallest natural number to be assigned is one, and the largest natural number assigned depends on the size of the group.
Ref.: https://en.wikipedia.org/wiki/Elementary_arithmetic 609 The largest natural number to be assigned to a member of a set or group is called 'the count' and it is equal to the number of objects in that group or set.
Ref.: https://en.wikipedia.org/wiki/Elementary_arithmetic 610 The process of counting a group or set is the following: (1) let 'the count' be equal to zero. 'The count' is a variable quantity, which though beginning with a value of zero, will soon have its value changed several times. (2) Find at least one object in the group which has not been labeled with a natural number. If no such object can be found (if they have all been labeled or counted) then the counting is finished. Otherwise choose one of the unlabeled objects. (3) Increase the count by one. That is, replace the value of the count by its successor. (4) Assign the new value of the count, as a label, to the unlabeled object chosen in Step (2). (5) Go back to Step (2).
   Ref.: https://en.wikipedia.org/wiki/Elementary_arithmetic Object Classification, Grouping, and Sets 6 A collection of objects of differing [distinguishing attribute] may be sorted by those [distinguishing attribute].
   Ref.: Analyst's Original Work
9 A column of objects is a line of objects arrayed from top to bottom.
   Ref: Analyst's Original Work
17 A left to right array is also called a horizontal array.
   Ref: http://en.wikipedia.org/wiki/Horizontal_plane
26 A row of objects is a line of objects arrayed from left to right (or right to left).
   Ref: Analyst's Original Work
34 A top-to-bottom or bottom-to-top array is also called a vertical array.
   Ref: http://en.wikipedia.org/wiki/Vertical_direction
79 Collections of objects with different attributes will have the same count as if the number of objects in each collection were the same.
   Ref.: Dr. Wright's Kitchen Table Math Book 1, p. 5
80 Color is one attribute used to distinguish objects in a collection.
   Ref: Elementary Math Teacher's Book of Lists, p. 51
123 Distinguishing characteristics of an object are differences between the object and other objects within a collection or outside a collection.
   Ref.: Elementary Math Teacher's Book of Lists, p. 51
149 Examples of distinguishing characteristics include color, shape, time, size, cardinality, kinetics, sounds, texture, smell, taste, matter, energy, location, equality, or assigned attribute.
   Ref.: Elementary Math Teacher's Book of Lists, p. 51
184 Homogenizing characteristics of an object are similarities among the object and other objects within a collection or outside a collection.
   Ref.: Analyst's Original Work
185 Identical objects can be distinguished by marking one of the objects with a pen or pencil.
   Ref.: Analyst's Original Work
259 Object classification sorts objects into separate groups on the basis of distinguishing and/or homogenizing characteristics.
   Ref.: Analyst's Original Work
260 Objects can be sorted into counted [objects] and uncounted [objects].
   Ref: Elementary Math Teacher's Book of Lists, p. 51
261 Objects in a collection are identical if they have no distinguishing characteristics.
   Ref: Elementary Math Teacher's Book of Lists, p. 51
262 Objects in a collection are identical when they share homogenizing characteristics.
   Ref.: Analyst's Original Work
397 The grouping capacity allows us to use sensory input to distinguish objects in a collection for counting.
   Ref.: Where Mathematics Comes From, p. 51
7 A collection of objects of differing color may be sorted by color.
   Ref: Elementary Math Teacher's Book of Lists, p. 51
270 Once the counted [elements] of a counted but not yet grouped sub-collection reach the fixed size, group them and begin to count from the uncounted collection.
   Ref.: Analyst's Original Work
709 Five can be represented by extending all of the fingers one hand.
   Ref: Dr. Wright's Kitchen Table Math, Book 1, p. 8
710 Five ones marked as counted can be collected into one group of five.
   Ref: Analyst's Original Work
16 A group of units can itself be considered to be a unit.
   Ref: http://ed.ted.com/lessons/one-is-one-or-is-it
38 A unit made up of other units is called a composed unit.
   Ref: http://ed.ted.com/lessons/one-is-one-or-is-it
82 Composed units can themselves to be grouped together to form new composed units.
   Ref.: http://ed.ted.com/lessons/one-is-one-or-is-it
192 If a large collection of objects is divided into smaller sub-collections of equal sizes, the number of objects is determined by the number of sub-collections.
   Ref.: Analyst's Original Work
273 Five is an example of a composed unit made up of five smaller units.
   Ref: http://ed.ted.com/lessons/one-is-one-or-is-it
340 Five smaller units combine to render a composed unit of one set of five.
   Ref: http://ed.ted.com/lessons/one-is-one-or-is-it
362 The combinatorial-grouping capacity is the cognitive mechanism that enables humans to assemble perceived or imagined groups into larger groups.
   Ref.: Analyst's Original Work
363 The combinatorial-grouping capacity can be combined with subitizing capability to quickly determine the size of larger sets.
   Ref.: Where Mathematics Comes From, p. 52
469 The size of a composed unit consisting of n objects equals n if the unit of measurement is the object rather than the composed unit itself.
   Ref.: http://ed.ted.com/lessons/one-is-one-or-is-it
470 The size of a composed unit consisting of n objects equals one if the unit of measurement is the composed unit itself.
   Ref.: http://ed.ted.com/lessons/one-is-one-or-is-it
517 To assemble groups together and form larger groups requires the combinatorial-grouping capacity.
   Ref.: Where Mathematics Comes From, p. 51
545 When composing composed units, individual objects within the composed unit cannot be separated from the composed unit.
   Ref.: http://ed.ted.com/lessons/one-is-one-or-is-it
561 Perceptual subitizing enables students to mentally formulate units to count, and connect each of those units with one number word.
   Ref.: Douglas H. Clements, Subitizing: What is It? Why Teach It?, March 1999, p. 401, http://gse.buffalo.edu/fas/clements/files/Subitizing.pdf
8 A collection sorted by color may consist of smaller sub-collections composed of objects of a single color.
   Ref.: Elementary Math Teacher's Book of Lists, p. 51
30 A set is a collection of objects that are also called elements or members.
   Ref: Nelson, Penguin Dictionary, p. 399
32 A sub-collection of a collection is a smaller collection containing some, but not necessarily all (but it could be all), of the objects in the original collection. If the size of the collection is n, no sub-collection is greater than n.

Ref.: Analyst's Original Work

33 A sub-collection of a collection is also called a subset of a set.

Ref: Analyst's Original Work

194 If collections are to be counted, the total from all collections is obtained by combining the counts of each of the collections.

Ref.: Analyst's Original Work

263 When counting between six and ten objects in a collection, students can count in one-to-one correspondence with fingers from both hands.

Ref.: Dr. Wright's Kitchen Table Math, Book 1, p. 9

304 Recognizing a composition of units as a complete whole requires pattern recognition abilities.

Ref.: http://gse.buffalo.edu/fas/clements/files/Subitizing.pdf

500 The universal principle states that any collection of objects can be counted.

Ref: Dr. Wright's Kitchen Table Math Book 1, p. 5

536 Two sub-collections are equally sized if they have the same cardinality.

Ref: Analyst's Original Work

720 With respect to another set, a subset is a set such that each of its elements is also an element of the other set.

Ref.: Analyst's Original Work

721 A unit is any measurement of which there is one.

Ref: Analyst's Original Work

Maintaining Equivalency (Also Addition, Subtraction, and Associative Property)

612 Maintaining equivalency reflects the basic nature of life. If you add one more element to a set, the number of elements in the set grows. If you have a set, and take away one member of the set, the set has fewer members. To maintain equivalency enables us to show the conditions before an action, demonstrate the action, and exhibit the results or the impact that the action has on the original conditions. It reflects how things have changed. Consider the alternative: Were we to ignore equivalency, we would assert, for example, that adding one to a set would maintain the original cardinality of the set. Conversely, were we to subtract one element from a set, the number of elements in the set would remain unchanged. Neither of those scenarios reflects what really happens in life.

Ref.: Analyst's Original Work

613 Rule of Change in Addition #1: When one of the addends is increased by a quantity, the sum is increased by the same quantity.

Ref.: Aharoni, Ron, Arithmetic for Parents, A Book for Grownups about Children's Mathematics (2007), pp. 68-75

615 Rule of Change in Addition #2: When one of the addends is decreased by a quantity, the sum is also decreased by this quantity.

Ref.: Aharoni, Ron, Arithmetic for Parents, A Book for Grownups about Children's Mathematics (2007), pp. 68-75

617 The Rules of Change in addition also have a formal name: the associative law.

Ref: Aharoni, Ron, Arithmetic for Parents, A Book for Grownups about Children's Mathematics (2007), pp. 68-75

618 The Rules of Change in Addition demonstrate why what you do to one side of an equation, you must do to the other side as well.

Ref.: Analyst's Original Work

619 We can get rid of whatever is next to the letter as long as whatever we do to get rid of it is also done on the other side.

Ref.: http://www.helpingwithmath.com/by_subject/algebra/alg_solving01.htm

620 If two things are equal and you do exactly the same thing to both things, they will still be equal.

Ref.: http://www.helpingwithmath.com/by_subject/algebra/alg_solving01.htm

Pre-Algebra

622 An inverse operation is an operation that reverses the effect of another operation.

Ref.: http://www.mathplanet.com/education/pre-algebra/introducing-algebra/equations-with-variables 623 Addition and subtraction are inverse operations of each other.

Ref: http://www.mathplanet.com/education/pre-algebra/introducing-algebra/equations-with-variables 625 "Combining like terms" means to gather all numbers together on one side of an equation, and to gather all variables together on the other side of the equation, each by adding them or subtracting as appropriate.

Ref.: Paraphrased from https://www.wyzant.com/resources/lessons/math/elementary_math/solving_equations/combining_like_terms 626 When we are solving equations, we are attempting to isolate the variable in order to determine what specific value that variable has in the given equation. We do this using inverse operations. Sometimes we refer to this as "undoing" the operations that have happened to the variable.

Ref.: http://www.charleston.k12.il.us/cms/Teachers/math/PreAlgebra/paunit5/L5-1.PDF 627 Before we begin inverse operations to solve a problem, we want to make the equation as simple as possible.

Ref.: http://www.charleston.k12.il.us/cms/Teachers/math/PreAlgebra/paunit5/L5-1.PDF 630 Collect constants together on the side of the equation where the largest constant is located.

Ref.: Analyst's Original Work

711 When you approach an equation, first mentally or on paper combine the constants on one side or the other of an equation to see whether the outcome is going to be a positive or negative number, a natural number or an integer.

Ref.: Analyst's Original Work

631 An operation is, for example, addition, multiplication, division and subtraction.

Ref: http://www.mathplanet.com/education/pre-algebra/introducing-algebra/equations-with-variables Addition 632 The meaning of addition is the [combining or] joining of two groups.

Ref: Aharoni, Ron, Arithmetic for Parents, A Book for Grownups about Children's Mathematics (2007), pp. 68-75

633 There are two different forms of addition: dynamic and static. In dynamic addition, to join means to change a situation. In static addition, joining signifies grouping of types.

Ref.: Aharoni, Ron, Arithmetic for Parents, A Book for Grownups about Children's Mathematics (2007), pp. 68-75

634 The operation of combining is one of several possible meanings that the mathematical operation of addition can have. Other meanings for addition include: comparing ("Tom has 5 apples. Jane has 3 more apples than Tom. How many apples does Jane have?"), joining (Tom has 5 apples. Jane gives him 3 more apples. How many apples does Tom have now?"), measuring ("Tom's desk is 3 feet wide. Jane's is also 3 feet wide. how wide will their desks be when put together?"), and separating ("Tom had some apples. He gave 3 to Jane. Now he has 5. How many did he start with?).
Ref.: https://en.wikipedia.org/wiki/Elementary_arithmetic #Subtraction 635 Addition property: If x=y, then x+z=y+z.
Ref: http://www.basic-mathematics.com/properties-of-equality.html 42 Adding objects to a collection increases its size.
Ref: Analyst's Original Work 43 Addition is a mathematical operation on pairs of numbers.
Ref: Penguin Dictionary, Nelson, p. 5

44 Addition is one example of a binary operation.
Ref: Penguin Dictionary, Nelson, p. 5

712 Doubling or twin addition can be expressed as follows: x is the number obtained by doubling y.
Ref.: Analyst's Original Work 138 Eight is the number obtained by doubling four.
Ref: Dr. Wright's Kitchen Table Math Book 1, p. 53

139 Eighteen is the number obtained by doubling nine.
Ref: Dr. Wright's Kitchen Table Math Book 1, p. 53

165 For any pair of numbers, the operation of addition returns a third number.
Ref: Penguin Dictionary, Nelson, p. 5

173 Four is the number obtained by doubling two.
Ref: Dr. Wright's Kitchen Table Math Book 1, p. 53

174 Fourteen is the number obtained by doubling seven.
Ref: Dr. Wright's Kitchen Table Math Book 1, p. 53

288 Operations that return a third number in a set, given two initial numbers from the set, are called binary operations.
Ref.: Penguin Dictionary, Nelson, p. 5

315 Six is the number obtained by doubling three.
Ref: Dr. Wright's Kitchen Table Math Book 1, p. 53

316 Sixteen is the number obtained by doubling eight.
Ref: Dr. Wright's Kitchen Table Math Book 1, p. 53

338 Ten is the number obtained by doubling five.
Ref: Dr. Wright's Kitchen Table Math Book 1, p. 53

386 The first addend is sometimes called the augend.
Ref: http://mathworld.wolfram.com/Augend.html 424 The number returned by addition is called the sum.
Ref: Penguin Dictionary, Nelson, p. 5

494 The sum is obtained by combining two numbers called addends.
Ref: Penguin Dictionary, Nelson, p. 5

520 Twelve is the number obtained by doubling six.
Ref: Dr. Wright's Kitchen Table Math Book 1, p. 53

523 Twin addition of eight results in sixteen.
Ref: Dr. Wright's Kitchen Table Math Book 1, p. 53

525 Twin addition of four results in eight.
Ref: Dr. Wright's Kitchen Table Math Book 1, p. 53

526 Twin addition of nine results in eighteen.
Ref: Dr. Wright's Kitchen Table Math Book 1, p. 53

527 Twin addition of one results in two.
Ref: Dr. Wright's Kitchen Table Math Book 1, p. 53

528 Twin addition of seven results in fourteen.
Ref: Dr. Wright's Kitchen Table Math Book 1, p. 53

529 Twin addition of six results in twelve.
Ref: Dr. Wright's Kitchen Table Math Book 1, p. 53

530 Twin addition of three results in six.
Ref: Dr. Wright's Kitchen Table Math Book 1, p. 53

531 Twin addition of two results in four.
Ref: Dr. Wright's Kitchen Table Math Book 1, p. 53

533 Two is the number obtained by doubling one.
Ref: Dr. Wright's Kitchen Table Math Book 1, p. 53

Common Denomination

637 To perform addition, a common denomination is required.
Ref: Aharoni, Ron, Arithmetic for Parents, A Book for Grownups about Children's Mathematics (2007), pp. 68-75

638 To perform subtraction, a common denomination is required.
Ref: Analyst's Original Work 639 When subtracting two numbers with units of measurement such as kilograms or pounds, they must have the same unit. In most cases, the difference has the same unit as the original numbers.
Ref.: https://en.wikipedia.org/wiki/Elementary_arithmetic#Subtraction Subtraction 640 The meaning of subtraction is removal.
Ref: Aharoni, Ron, Arithmetic for Parents, A Book for Grownups about Children's Mathematics (2007), pp. 68-75

642 The result of subtraction between the minuend and the subtrahend is called the difference.
Ref.: https://en.wikipedia.org/wiki/Elementary_arithmetic#Subtraction 643 The quantity or number from which another quantity or number is to be subtracted is called the minuend.
Ref.: Paraphrased after the Apple Dictionary 644 The quantity or number to be subtracted from another quantity or number is called the subtrahend.
Ref.: Paraphrased after the Apple Dictionary 645 The quantity by which two amounts differ, that is, the remainder left after subtraction of one value from another, is called the difference.
Ref.: Paraphrased after the Apple Dictionary 646 In subtraction, "take-away," "separating," or "removal" means that the situation changes over time. It is dynamic, meaning it involves motion. (For example, Tom has 8 apples. He gives away 3 apples. How many does Tom has left?)
Ref.: Aharoni, Ron, Arithmetic for Parents, A Book for Grownups about Children's Mathematics (2007), pp. 68-75; and https://en.wikipedia.org/wiki/Elementary_arithmetic#Subtraction 647 The "whole-part" meaning of subtraction is where there are two types of objects, the total of all objects and the number of objects of one type are known, and we are asked to find the number of objects of the other type.
Ref: Aharoni, Ron, Arithmetic for Parents, A Book for Grownups about Children's Mathematics (2007), pp. 68-75

648 There are two meanings of "whole-part" subtraction: "joining" (e.g., Tom has some apples. Jane gave him 3 more apples, so now he has 8 apples. How many did he start with?) and "combination" (e.g., Tom has 8 apples. Three of the apples are green and the rest are red. How many are red?) and both meaning are dynamic.

Ref.: Paraphrased from Aharoni, Ron, Arithmetic for Parents, A Book for Grownups about Children's Mathematics (2007), pp. 68-75; and https://en.wikipedia.org/wiki/Elementary_arithmetic #Subtraction 649 The "comparison" meaning of subtraction answers the question: "By how many is amount A greater than amount B?" This could be dynamic (how much faster) or static (how many more). (For example, Tom has 8 apples. Jane has 3 fewer apples than Tom. How many does Jane have?)
Ref.: Aharoni, Ron, Arithmetic for Parents, A Book for Grownups about Children's Mathematics (2007), pp. 68-75; and https://en.wikipedia.org/wiki/Elementary_arithmetic #Subtraction 650 Subtraction has at least three meanings: take-away (separation or removal), whole-part (joining or combination), and comparison.
Ref.: Analyst's Original Work, after Aharoni, Ron, Arithmetic for Parents, A Book for Grownups about Children's Mathematics (2007), pp. 68-75; and https://en.wikipedia.org/wiki/Elementary_arithmetic #Subtraction 651 The first of two rules of change in subtraction is when the minuend is increased by a quantity, the difference is also increased by the same quantity.
Ref.: Aharoni, Ron, Arithmetic for Parents, A Book for Grownups about Children's Mathematics (2007), pp. 68-75

652 The second of two rules of change in subtraction is when the subtrahend is increased by a quantity, the difference is decreased by the same quantity.
Ref.: Aharoni, Ron, Arithmetic for Parents, A Book for Grownups about Children's Mathematics (2007), pp. 68-75

653 The minus sign ("−") represents the subtraction operation. The statement "x minus y equals z" can be written "x−y=z."
Ref.: https://en.wikipedia.org/wiki/Elementary_arithmetic#Subtraction 654 Subtraction is not commutative (it is anti-commutative), so the order of numbers in the operation changes the result.
Ref.: https://en.wikipedia.org/wiki/Elementary_arithmetic#Subtraction 655 Subtraction is anti-commutative, meaning that if one reverses the terms in a difference left-to-right, the result is the negative of the original result. Symbolically, if a and b are any two numbers, then a−b=−(b−a).
Ref.: https://en.wikipedia.org/wiki/Subtraction 656 Subtraction is a mathematical operation that represents the operation of removing objects from a collection.
Ref.: https://en.wikipedia.org/wiki/Subtraction 657 Infix notation refers to an element, like the subtraction sign ("−"), inserted into an equation.
Ref.: Analyst's Original Work 658 Subtraction is not associative, meaning that when one subtracts more than two numbers, the order in which subtraction is performed matters.
Ref.: https://en.wikipedia.org/wiki/Subtraction 662 When performing repeated subtraction, it is important to remember that subtraction is non-associative.
Ref.: https://en.wikipedia.org/wiki/Subtraction 663 A method that is useful for mental arithmetic is to split up the subtraction into small steps.
Ref.: https://en.wikipedia.org/wiki/Subtraction 664 The same change method of subtraction uses the fact that adding or subtracting the same number from the minuend and subtrahend does not change the answer. One adds the amount needed to get zeros in the subtrahend. Example: 1234−567=x can be solved as follows: 1234−567=1237−570=1267−600=667.
Ref: https://en.wikipedia.org/wiki/Subtraction 667 Substitution property: If x=y, then y can be substituted for x in any expression.
Ref: http://www.basic-mathematics.com/properties-of-equality.html Subtracting and Adding with Zero 668 To reach zero everything you start with must be subtracted away.
Ref: Paraphrased from Chris Wright, Dr. Wright's Kitchen Table Math: Book 1, 2007, p. 32 (MQ 913)

671 Subtraction property: If x=y, then x−z=y−z.
Ref: http://www.basic-mathematics.com/properties-of-equality.html 673 "Nothing" or "none" is 0.
Ref: http://www.basic-mathematics.com/properties-of-zero.html 674 Any amount plus zero is the amount you started with.
Ref: Analyst's Original Work 675 The addition property says that a number does not change when adding or subtracting zero from that number.
Ref.: http://www.basic-mathematics.com/properties-of-zero.html 659 Subtraction of zero does not change a number.
Ref: https://en.wikipedia.org/wiki/Subtraction 678 When solving a simple equation, think of the equation as a balance, with the equals sign (=) being the fulcrum or center.
Ref.: cliffsnotes.com{study-guides{basic-math/basic-math-and-pre-algebra{variables-algebraic-expressions-and-simple-equate ions/solving-simple-equations 681 Solving an equation is the process of getting what you're looking for, or solving for, on one side of the equals sign and everything else on the other side. You're really sorting information.
Ref.: cliffsnotes.com{study-guides{basic-math/basic-math-and-pre-algebra{variables-algebraic-expressions-and-simple-equate ions/solving-simple-equations 683 Simplify the equation so that patterns and solution steps are easier to recognize.
Ref: mathplanet.com/education/pre-algebra/introducing-algebra/equations-with-variables Parentheses 686 Parentheses indicate priorities of order in performing operations: their content is calculated first.
Ref.: Aharoni, Ron, Arithmetic for Parents, A Book for Grownups about Children's Mathematics (2007), pp. 68-75

687 Parentheses are like a box: first the content of the box is calculated, and then it is used as a unit.
Ref.: Aharoni, Ron, Arithmetic for Parents, A Book for Grownups about Children's Mathematics (2007), pp. 68-75

688 Just as a box can contain additional boxes, so can parentheses contain additional parentheses.
Ref.: Aharoni, Ron, Arithmetic for Parents, A Book for Grownups about Children's Mathematics (2007), pp. 68-75

Other
- 689 Universal instantiation: If a property is true for all elements of a set, then it is true for each individual element of the set.
  Ref.: Epp, Susanna S., DePaul University: http://condor.depaul.edu/sepp/VariablesInMathEd.pdf
- 690 Existential instantiation: If we know or suspect that an object exists, then we may give it a name, as long as we are not using the name for another object in our current discussion.
  Ref.: Epp, Susanna S., DePaul University: http://condor.depaul.edu/sepp/VariablesInMathEd.pdf
- 691 The meaning of numbers and arithmetical operations is their link to reality.
  Ref: Aharoni, Ron, Arithmetic for Parents, A Book for Grownups about Children's Mathematics (2007), pp. 68-75
- 692 The meaning of number is derived from counting objects.
  Ref: Aharoni, Ron, Arithmetic for Parents, A Book for Grownups about Children's Mathematics (2007), pp. 68-75
- 695 One of the things that make the meaning interesting is the fact that it contains subtleties.
  Ref.: Aharoni, Ron, Arithmetic for Parents, A Book for Grownups about Children's Mathematics (2007), pp. 68-75
- 696 Meaning determines the rules that govern the operations.
  Ref: Aharoni, Ron, Arithmetic for Parents, A Book for Grownups about Children's Mathematics (2007), pp. 68-75
- 697 The meanings of the operations dictate the rules that govern them.
  Ref: Aharoni, Ron, Arithmetic for Parents, A Book for Grownups about Children's Mathematics (2007), pp. 68-75
- 699 Check: substitute your value for the variable in the original equation, and see whether the equivalency holds.
  Ref.: Analyst's Original Work
- 700 Once you have arrived at your answer, consider the different ways your answer to the problem can be checked.
  Ref.: Analyst's Original Work Digits
- 13 A digit is a symbol used to write numbers.
  Ref: Nelson, Penguin Dictionary, p. 124
- 187 The ability to correctly Identify the correct digits corresponding to a count is called numeral recognition.
  Ref.: Early Numeracy, Wright, p. 24
- 342 The 0 in the number 0 represents zero ones.
  Ref: Dr. Wright's Kitchen Table Math, Book 1, p. 18
- 713 The digit [number, Arabic numeral form] means the number [number, word form], or [number, word form] [ones, tens, hundreds, thousands, etc.].
  Ref.: Analyst's Original Work
- 370 The digit 1 means the number one, or one ones.
  Ref: Analyst's Original Work
- 371 The digit 2 means the number two, or two ones.
  Ref: Analyst's Original Work
- 372 The digit 3 means the number three, or three ones.
  Ref: Analyst's Original Work
- 373 The digit 4 means the number four, or four ones.
  Ref: Analyst's Original Work
- 374 The digit 5 means the number five, or five ones.
  Ref: Analyst's Original Work
- 375 The digit 6 means the number six, or six ones.
  Ref: Analyst's Original Work
- 376 The digit 7 means the number seven, or seven ones.
  Ref: Analyst's Original Work
- 377 The digit 8 means the number eight, or eight ones.
  Ref: Analyst's Original Work
- 378 The digit 9 means the number nine, or nine ones.
  Ref: Analyst's Original Work
- 380 The digits 1, 2, 3, 4, 5, 6, 7, 8, 9, and 0 make up the decimal system.
  Ref: Nelson, Penguin Dictionary, p. 110

Reading and Writing Mathematics
- 18 A mathematical expression is a finite combination of symbols with some collectively understood meaning.
  Ref.: http://en.wikipedia.org/wiki/Expression_(mathematics)
- 41 A way to express numbers in writing is also called a system of numeration.
  Ref: http://en.wikipedia.org/wiki/Numeral_system
- 51 An equation has a left-hand side and a right-hand side of equal value.
  Ref: Analyst's Original Work
- 52 An equation is a statement of equality between two mathematical expressions.
  Ref: Penguin Dictionary, Nelson, p. 147
- 119 Digits define a number system.
  Ref: Nelson, Penguin Dictionary, p. 314
- 253 Number words are words used to describe quantities.
  Ref: Analyst's Original Work
- 254 Number words include "one," "two," and "three."
  Ref: Analyst's Original Work
- 714 [Quantity] is symbolically expressed [Arabic numeral], means [number of ones, tens, hundreds, thousands, etc.], is written [number word"], and looks like [pictorial or graphic representation].
  Ref.: Analyst's Original Work
- 256 Numeral identification is the ability to attach the correct number words to a sequence of digits.
  Ref.: Early Numeracy, Wright, p. 17, 24
- 299 To minimize errors of reversed orientation in writing numbers, practice writing the digits.
  Ref.: Dr. Wright's Kitchen Table Math, Book 1, p. 14
- 300 It is often helpful for students to practice writing digits on surfaces with strong tactile feedback, like hard surfaces or even sand.
  Ref.: Dr. Wright's Kitchen Table Math, Book 1, p. 12
- 302 Quantities of different sizes have correspondingly different number words.
  Ref: Analyst's Original Work
- 715 The number [number word] is written with the digit [numerical symbol].
  Ref: Analyst's Original Work
- 410 The number eight is written with the digit 8.
  Ref: Dr. Wright's Kitchen Table Math, Book 1, p. 12
- 414 The number five is written with the digit 5.
  Ref: Dr. Wright's Kitchen Table Math, Book 1, p. 12
- 415 The number four is written with the digit 4.
  Ref: Dr. Wright's Kitchen Table Math, Book 1, p. 12
- 417 The number nine is written with the digit 9.
  Ref: Dr. Wright's Kitchen Table Math, Book 1, p. 12
- 423 The number one is written with the digit 1.
  Ref: Dr. Wright's Kitchen Table Math, Book 1, p. 12
- 425 The number seven is written with the digit 7.
  Ref: Dr. Wright's Kitchen Table Math, Book 1, p. 12
- 427 The number six is written with the digit 6.
  Ref: Dr. Wright's Kitchen Table Math, Book 1, p. 12
- 431 The number three is written with the digit 3.

Ref: Dr. Wright's Kitchen Table Math, Book 1, p. 12
434 The number two is written with the digit 2.
Ref: Dr. Wright's Kitchen Table Math, Book 1, p. 12
541 We write numbers with the digits 1, 2, 3, 4, 5, 6, 7, 8, 9, and 0.
Ref: Nelson, Penguin Dictionary, p. 124
559 Even with a comparative representation of the quantitative meaning of Hindu-Arabic numerals in their minds, it is easy and common for students to confuse the relative values of nearby numbers.
Ref.: Stanislas Dehaene, the Number Sense, p. 74
560 Without meaning, a combination of symbols appears to be just a string of symbols.
Ref.: http://en.wikipedia.org/wiki/Well-formed_formula
562 Writing counting numbers on objects as they are counted provides more information than marking them as having simply been counted.
Ref.: Analyst's Original Work
564 Writing the ordinal number on an object as it is counted allows for easy identification of the order used to count a collection.
Ref.: Analyst's Original Work
565 Writing the ordinal number on an object as it is counted provides a very concrete way to abide by the one-to-one principle.
Ref.: Analyst's Original Work Equivalency and Equals Sign
31 A statement of equality is made with an equals sign.
Ref: Penguin Dictionary, Nelson, p. 147
144 Equal numbers represent the same value and have the same number word.
Ref: Analyst's Original Work
145 Equal values can be joined together by an equation.
Ref: Analyst's Original Work
274 One [numeral] is the same as [numeral] [ones, tens, hundreds, thousands, etc.].
Ref: Number Sense, p. 98
275 One group of [numeral] never contains fewer than [numeral] [ones, tens, hundreds, thousands, etc.].
Ref.: Analyst's Original Work
276 One group of [numeral] never contains more than [numeral] [ones, tens, hundreds, thousands, etc.].
Ref.: Analyst's Original Work
382 The equals sign is denoted by the symbol "=."
Ref: Penguin Dictionary, Nelson, p. 147
495 The symbol "=" indicates the presence of an equation.
Ref: Penguin Dictionary, Nelson, p. 147
535 Two sides of an equation cannot have different values.
Ref: Analyst's Original Work Dynamic Construction of Math Problems In some versions of the systems and methods described herein, dynamic construction of math problems is governed by a set of algorithms that search the CLIs of a concept cloud for instructions and templates (or template parts that collectively form a template) to compose math problems. This search may be guided by an initial determination as to whether the requirement for returned results is to represent a unipolar or a multipolar concept cloud. Either way, the headline concept(s) that formulate the principal objective may be identified by associated metrics of CLIs and concept clouds (e.g., importance scores, weight scores, difficulty scores, rank among other nodes in a directed graph of prerequisites and dependencies, etc.), as well as, in some instances, data structures such as linked lists. When employed, this step narrows the number of CLIs in play in any operation and their possible roles. Therefore, coded instruction packets paired with CLIs can include categorized instructions such that, if a CLI is, in the context of some concept cloud, a principal objective formulated as the headline concept acting on its own (in a unipolar concept cloud), or several CLIs acting in tandem with each other (in a multipolar concept cloud), its behavior options are x, y, and z. If in its context a CLI is a contextual concept (e.g., an argument (noun) in a transformative method—see the dovetail extraction method in U.S. Pat. No. 8,727,780) it can fulfill other roles in composed math problems or expressions. If a CLI is an operational concept (e.g., functions and operations) or a capacitating concept (e.g., the root systems of the foregoing as they extend to the foundations of mathematics), its behaviors can be constrained and described in other ways by their CLI instruction packets.

In an alternative approach, vertical searches through the ontology for verbs (functions and operators) and nouns (objects) that match those in a subject concept cloud are used to perform either component of the two-part CCE/CCR Module (concept clouds distilled from math expressions or math expressions composed from concept clouds). If a concept cloud is to be distilled from an expression of mathematics, the LaTex or MathML components in the CLI instruction packets can highlight the key operators. Once the key operators are identified, the appropriate downlines (e.g., prerequisites, the RCC of the CLI that enables and describes each key operator) can also be readily identified. If a set of math expressions or math problems are to be composed from a concept cloud, then the key operators can be identified from the horizontal portion of the concept cloud, that is, those CLIs that are taught at the current grade level (not including their root systems; recall the "T" description of any concept cloud). So, the search can be two-way: (1) functions (vs. operators or objects) that are typically studied at (2) the highest grade level in the search terms (as per the standards of a selected country or five-country curriculum). This limits the possible combinations if the most advanced concepts are to be included in the results (if not, then the range of possible problems returned include the universe of possible exercises that are appropriate for the current grade level and every preceding grade level as well; for practicality, it is contemplated that CCE/CCR output needs to be limited). Following this method, roles of support concepts may not have to be as carefully choreographed as described in the previous method. Once the principal function is established, objects, functions, and operators that set the context or fulfill other roles in the math problems returned may be randomized. A such, the systems and methods described herein are non-deterministic. In a sense, they are genetic. They create their own unique output; even with identical inputs, the systems and methods generate distinct outputs. The system then tests each result for viability before the final set of math problems is delivered to the user.

CCR Module Examples

A first example of an implementation of the CCR Module is provided with respect to creating a math problem based on variables. A second example is provided using addition and equivalency.

In the first example, the user's UDP includes +, −, =, and single digit numbers. It also indicates the user's knowledge is limited to single variables and doesn't know how to work with more than one instance of a single variable in an expression (e.g., $x+3+x=6$, to deal with the multiple instances of the single variable, the user would need to know that $3+x=x+3$ to get $x+x+3=6$, then that $x+x=2x$, and finally how to divide to solve for x).

The first step in the CCR Module process for creating a math problem based on variables is to choose a variable, 'x', as the first "building block". A variable can have an operator (e.g., +, −, x, +, =) to the left or right, but it isn't required that anything be added to the right or left of the variable. Given this starting point, the CCR Module generates possible extended building blocks (e.g., '−x', 'x=', '+x=', '+x−'). Since nothing was added to the right in '−x' and to the left in 'x=', the right and left, respectively would be considered filled and would not be further extended in those directions.

After the first step, the building block (or each building block) has one of: (1) no connection; (2) an operator on one side; or (3) an operator on both sides. An operator can have an expression on both sides. An expression includes numbers, variables, or more complex combinations of number, variables, and operators. For this example, numbers between 0 and 9 can be used since the user's UDP is restricted to single digit numbers.

Because the user knows about single variables and doesn't know how to work with more than one instance of a single variable in an expression, the system can no longer add additional variables to the current building blocks. So, the CCR Module would extend some of the building blocks to include numbers and some to include more complex expression using known operators ('+', '−', and '='), numbers between 0 and 9.

This process continues until there is a set of candidate problems. The CCR Module then examines/solves the candidate variables and remove any problems that aren't valid. For example: if '=' doesn't appear or appears more than once (this could also be handled by guaranteeing in the problem generation that '=' appears exactly once). In another example, if when solving the problem, numbers outside the range 0 to 9 are needed it is invalid for this user's UDP. At this point the CCR has a set of valid problems which can be returned/displayed.

In the second example, for a given concept group there is a set of instances of "things" that make it concrete. For example, for variables there are possible representations of a variable such as: x, y, z, a, b, c, _. For numbers, if the user is limited to single-digit positive integers then the possibilities are: 1, 2, 3, 4, 5, 6, 7, 8, 9. And finally, for this example, there are operations: +, −, =. These are defined as "variables", "numbers", and "operations", respectively. Each of these "types" have certain other types that can be put to their left or right. For example, a variable, 'x', can have an operation added to either side. It can also have nothing. The same is true for numbers. Operations, on the other hand, need a variable or a number on both the left and right. With these simple concepts and rules, the CCR can construct possible problems: (1) start with a variable, 'x', since variables are the most advanced concept; (2) put 'x' in a list of currently active proto-problems; (3) for each proto-problem in the current list, make copies of it and attempt to add something to the left and right, including adding nothing if the type at the left and/or right doesn't require something to be added; (4) add the proto-problems generated in (3) to the list; (5) go through the list and remove duplicate and malformed proto-problems (e.g., expressions with no '=', more than one '=', more than one variable, proto-problems that still require something on the left or right, such as proto-problems with an operation on the left or right); (6) go back to (3) until a suitable number of proto-problems are formed; (7) solve proto-problems and determine if they require anything that's not part of the user's UDP (e.g., numbers that aren't single-digit positive integers), if so, remove them from the list. At this point, the CCR algorithm has generated a list of viable problems.

In this example, given the restricted nature of the variables, numbers, and operations, the problems generated quickly grows to include most of the simple problems (e.g., "x=3", "6+x=7") and larger problems that can be a bit non-standard (e.g., "6−4=1+x−3", "2+4+1=x+3"). As shown, the rules and restrictions for building and connecting variables, numbers, and operations can be very simple. This results in a multitude of proto-problems generated very quickly, but most of the proto-problems aren't viable, which is why an appropriate filter is required.

Alternatively, the rules and restrictions can be made more complicated and the proto-problems can be checked for viability as they are generated. For example, having two '=' signs make a proto-problem not viable because the extra '=' signs can never be removed. On the other hand, having no '=' sign could be fixed as the proto-problem grows. Also, following a more genetic tact, the proto-problems could be replicated as variables, numbers, and operations are connected and proto-problems could be joined with other proto-problems (if the ends match). Proto-problems could also "breed" by splitting and joining with other split proto-problems.

Branching Algorithms

The descriptions herein make reference to the use of branching algorithms. As contemplated herein, there are two primary applications of the branching algorithms. The first is to quickly, efficiently, and accurately map the user's math skill set across the many concepts represented in the ontology. To meet this objective, the systems run, in coordination with the user, an intelligent process to map the user's math skill set using branching algorithms and a spine of the ontology that is comprised of the primitive nodes of the ontology for each of the principle areas of skill with mathematics. Examples of areas of skill with mathematics could include sets, units, succession, zero, counting, ordinality, cardinality, the associative property, common denominations, and more. The output of that process may be, for example, a heat map. For example, a school may ask that, during the summer break, its students undertake a diagnostic exam with the systems described herein so that school administrators can begin the next school year with a detailed view of their students' math skill sets (their "SkillsMaps"). In response, the systems and methods may then deliver to the school individual and group SkillsMaps. Each block of a SkillsMap could be drillable; the information displayed when a block is selected may be user-configurable by user input. The thresholds for assessment may also be user-configurable (as per the pop-up scale at the lower center of the SkillsMap screen).

The second primary application of the branching algorithms is to constantly monitor a user's online work with the systems and methods, and, when the user either correctly or incorrectly responds to a problem offered by the systems, the branching algorithms may direct the systems and methods to interactively and dynamically search, at the finest level of granularity, for the source of the user's difficulties with any problem and direct the CCR module to create problems that remediate, practice, or extend the user's math skills. Each case represents an application of the system's CCE module, CCR module, and the user's UDP, as directed by the branching algorithms in their interaction with the spine of the system ontology. An example of this second application follows.

Assume that the system gives a user 6+x=7 and asks the user to find x. In the system interface, the user enters each solution step, but fails to find the correct value for x. The question to be assessed by the branching algorithms is whether the mistake was a simple computational error; a lack of comprehension of a headline concept such as variables, equality, addition, or counting (e.g., pattern recognition); whether the lack of comprehension might involve algebraic solution methods such as how to gather similar terms (e.g., variables or constants) to opposite sides of the equals sign by applying inverse operations; or whether the mistake might reflect a misunderstanding of a more fundamental concept such as counting, sets, or the meaning of the signs "+" or "=."

To assess each possibility, the branching algorithm may, for example, initially direct the CCR module to generate a set of perhaps five to ten problems that are similar to 6+x=7—not based on a similar problem template, but based on the same concept cloud (e.g., the output from the CCE module)—and ask the user to solve those problems. To generate the problem set, the CCR module can explore the segment of the spine of the ontology that is associated with the concept cloud of the original problem (i.e., 6+x=7). The general strategy followed by the branching algorithm can begin with primitive nodes of the spine related to the headline concepts of the original problem and steps of alternative solution strategies to find the value of x and progress in complexity (with those concepts as the primary focus, and then in combination with other concepts) until the user's skills relative to the problem and its solution, as described by their UDP (e.g., number of digits in the constants, number of expressions on either side of the equal sign, and number and diversity of variables included) are explored.

When the user takes a diagnostic exam using the systems and methods described herein, the branching algorithms can follow the progress of the spine segment and direct the CCR module to pursue either a constraints-first process (meaning, for each area of mathematics, to begin with the most advanced limits described in the user's UDP and as errors are detected progress toward increasingly simple expressions until the user's performance rises to a preset level), or a primitives-first process (meaning, again for each area of mathematics, to begin with the most basic concepts of any math area and present progressively more complex problems until the user's performance declines to a preset level of failure or the user's UDP is exhausted, whichever occurs first). When the user correctly responds to a problem, the branching algorithm can confirm the user's understanding with a number of other CCR module-generated problems. When the user incorrectly responds to a problem, the branching algorithm can direct the CCR module to create problems that follow along the nodes of the spine of the ontology (both the top bar and the vertical downline concepts) to progressively isolate and then identify the user's difficulties with any concept or combination of concepts. If the user fails to give sufficient evidence of understanding one or more of top bar concepts, the branching algorithm can explore the concept nodes of the spine segment that represents the vertical bar (the downline CLIs) to identify the nature of the user's difficulty and, by directing the CCR module to create problems that examine those concepts and asking the user to solve them, determine which of the downline concepts are the source of the user's difficulties. Once the difficulties have been identified, the system alerts the user's support network (e.g., professors, teachers, tutors, parents, and in certain cases peers), and dynamically generates customized study and practice program (a "CSSP") that includes a collection of multi-media content to discuss and explain those concepts. The systems and methods update the user's UDP, which is then reflected in the dynamic complexity matrix. The system delivers results and analyses from each test.

If the user is successful in solving a predetermined percentage of the auxiliary problems, then the systems and methods can determine that the user understands how to solve those types of problems and simply made a minor (perhaps clerical or computational) mistake in finding the value of x. If, in our example, the user confirms that she understands variables, addition, and equivalency, but still fails to be able to solve the problems correctly, then, the branching algorithms can, by way of example, test whether the user might have difficulties with solution strategies or how to apply them. If the user incorrectly responds to many of the auxiliary problems, then the branching algorithm can assume that the user does not understand one or more concepts that are needed to solve the problem. In that case, the top bar of the concept cloud (e.g., the most advanced concepts that are active in the problem's expression and solution) would be examined by the branching algorithms. The branching algorithms could direct the CCR module to create problems based on, for example, combinations and permutations of those concepts to test whether the user continues to handle the various concepts in context of or in combination with other concepts. However, the headline concepts of the concept cloud of an equation's expression, are often not as mathematically advanced or sophisticated as the insights and skills that are required to perform some of the steps that involved in the solution to that problem. The skills required to solve a problem frequently require more complex manipulations and insights than the concepts that are present in any expression might suggest. The problem 6+x=7 is a good example. The headline concepts are variables, addition, and equivalency. Yet successive steps to the solution involve either simple pattern recognition (i.e., simple counting: 6+1=7), or moving constants on one side of the equation and variables on the other, an application of the symmetric property of equality (if a=b, then b=a; or perhaps the reflexive property of equality, a=a), subtraction, additive inverse operations, the additive identity property of zero, and the notion that what is done to one side of an equation can be reflected on the other side of the equation as well (maintaining equivalency). Those concepts, and in particular what can be done with those concepts, can take their turns as headline concepts in individual steps toward finding the value of x. They require greater skill and insight than the headline concepts of the problem's initial expression: 6+x=7.

In this example, given that the user demonstrates that she understands the headline concepts of the problem (variables, addition, and equivalency), the branching algorithm can request the CCR module to generate problems that test for an understanding of the headline concepts that are involved in the student's solution approach or another solution approach (to be determined by the branching algorithms and the CCR module). The branching algorithm can begin with the simplest of the nodes of the spine segment of the ontology that are involved in the solution, and (in an example of a primitives-first process) one-by-one test each concept's simplest expression. The branching algorithms can then progress to more complex tests, perhaps mixing primitive concepts with other concepts, until the concepts that the user does and does not understand relative to the problem and its solution are identified and mapped.

In summary, given a set of solution strategies for the example problem and an idea of how the user went about solving the problem, the branching algorithm could determine which concepts are needed (e.g., some aspect of pre-algebra, subtraction, the additive identity of zero) and test each of these by using the CCR module to generate problems for the user to solve. Any of such issues that a user might have with a concept or set of concepts, independently or in some combination, can then be traced further down the spine to test the supporting concepts. In the end, the branching algorithm determines the concepts that the user failed to understand that are necessary to find x in the equation 6+x=7.

Example of the Branching Algorithm being Used in Connection with Headline Concepts in a Concept Cloud The following is an example of a branching algorithm used in connection with the headline concepts of a concept cloud and the CCR module to generate test problems to explore the user's difficulties with the problem. The following twenty-nine CLIs are headline concepts in the concept cloud related to the equation 6+x=7, for which a user has been asked to solve for x. If a user working on the equation 6+x=7, makes an error, and gives an answer that suggests that the user did not pick up on the pattern recognition of "one more than" in the problem, the branching algorithms runs through the headline concepts until it finds a matching headline concept. In this example, the matching CLI is CLI 570, "Variables." The CCR module then generates a test problem(s) for the student's awareness/skill with variables along with the CCE-generated CC and tagged content that explains the relevant concept(s) under that CC. After the user provides responses to the test problem(s), the branching algorithm moves to the next relevant headline concept, which in this case is CLI 622, "Inverse Operations." This pattern continues until the system detects that it has explored the user's potential difficulty(ies) with the original problem.

In another example, a user that is presented with "6+x=7" and asked to "solve for x" may provide the answer "x=2," which is incorrect. In such a case, the branching algorithm proceeds to give the user related problems utilizing the CCR, which itself uses the top bar and spine generated by the CCE.

In this example, the user gets a low percentage of these additional problems correct, demonstrating a lack of mastery of the CLIs required to solve problems of this form. At this point, the primary concepts needed to understand (and begin to solve the problem) are tested.

To do so, problems are generated that test an understanding of variables, addition, and equality. If the user solves these problems correctly, the assumption is that the user does not understand something in the spine specific to this problem.

The system tests CLI 1 and CLI 635 ("Succession (+)"), CLI 717 ("The Reflexive Property of Equality"), and CLI 701 ("Subtraction"). The user demonstrates a correct understanding of these by correctly solving the problems that were generate by the CCR.

This leaves one other possibility, CLI 625 ("Combining like terms"). When this CLI is tested, the user fails to solve the test problems correctly, the branching algorithm quantifies this result, and generates a report for the user and the user's support network. The CCR then generates a set of problems with attached multi-media content to remediate the problem and, thereby, build the user's math skill set.

29 CLIs Representing Headline Concepts in the CC for 6+x=7

[CLI 690] Naming Objects and Phenomena|Existential instantiation: if we know or suspect that an object exists, then we may give it a name, as long as we are not using the name for another object in our current discussion.

[CLI 30] Sets|A set is a collection of objects that are also called elements or members.

[CLI 721] Subsets|With respect to another set, a subset is a set such that each of its elements is also an element of the other set.

[CLI 689] Properties of Elements|Universal instantiation: If a property is true for elements of a set, then it is true for each individual element of the set.

[CLI 720] Units|A unit is any measurement of which there is one.

[CLI 259] Element Differentiation|Object classification sorts objects into separate groups on the basis of distinguishing and/or homogenizing characteristics.

[CLI 1 and CLI 635] Succession (+)|"One more than" some number is the successor to that number: the successor to x is (x+1).

[CLI 568] Zero|Zero represents the absence of quantity.

[CLI 500] Enumerating Collections|The universal principle states that any collection of objects can be counted.

[CLI 610] Counting|The process of counting a group or set is the following: (1) let 'the count' be equal to zero. 'The count' is a variable quantity, which though beginning with a value of zero, can have its value changed several times. (2) Find at least one object in the group which has not been labeled with a natural number. If no such object can be found (if they have been labeled or counted) then the counting is finished. Otherwise choose one of the unlabeled objects. (3) Increase the count by one. That is, replace the value of the count by its successor. (4) Assign the new value of the count, as a label, to the unlabeled object chosen in Step (2). (5) Go back to Step (2).

[CLI 54] Ordinality|An ordinal number refers to the order of a specific object in a collection.

[CLI 467] Cardinality|The size of a collection is called the cardinality or cardinal number of a set.

[CLI 714] Digits & Number Words|[Quantity] is symbolically expressed [Arabic numeral], means [number of ones, tens, hundreds, thousands, etc.], is written [number word"], and looks like [pictorial or graphic representation].

[CLI 380] Decimal System|The digits 1, 2, 3, 4, 5, 6, 7, 8, 9, and 0 make up the decimal system.

[CLI 18] Expressions|A mathematical expression is a finite combination of symbols with some collectively understood meaning.

[CLI 716] Equivalency|Equality is having the same quantity, value, or measure as another.

[CLI 717] Reflexive Property of Equality|Symmetric Property of Equality: for every natural number x, x=x.

[CLI 718] Symmetric Property of Equality|Reflexive Property of Equality: for natural numbers x and y, if x=y, then y=x.

[CLI 52] Equations|An equation is a statement of equality between two mathematical expressions.

[CLI 635] Addition|Addition property: If x=y, then x+z=y+z.

[CLI 719] Additive Identity Property of Zero|Additive Identity: for natural numbers n, 0+n=n=n+0.

[CLI 617] Associative Property|The Rules of Change in addition also have a formal name: the associative law.

[CLI 637] Common Denominations|To perform many operations, a common denomination is required.

[CLI 701 and CLI 704] Succession (−)|"One less than" some number is the same as the predecessor to that number: the predecessor to x is (x−1).

[CLI 701] Subtraction|Subtraction property: If x=y, then x−z=y−z.

[CLI 686] Parentheses|Parentheses indicate priorities of order in performing operations: their content is calculated first.

[CLI 622] Inverse Operations|An inverse operation is an operation that reverses the effect of another operation.

[CLI 570] Variables|Substitution property: If x=y, then y can be substituted for x in any expression.

[CLI 625] Combining Like Terms|"Combining like terms" means to gather numbers together on one side of an equation, and to gather variables together on the other side of the equation, each by adding them or subtracting as appropriate.

Independence of the CCE Module, CCR Module, and Branching Algorithms

Although primarily described herein from the perspective of the output of the CCE module feeding into the input of the CCR module, and the use of branching algorithms to make use of the CCR module to map a user's skill set, the order and interactions of these modules may take many forms. The following example is provided to demonstrate their independence.

For example, the CCE module can operate independently of the CCR module, taking as input quite a variety of materials and producing classes of concept clouds that we have identified as TextMaps, MediaMaps, and WidgetMaps. The CCR module can take as input—that is, input that is independent of output generated by the CCE module in the same cyclic process—a human-computer constructed concept cloud or concept cloud class; a UDP (which implies a SkillsMap); or a TextMap, MediaMap, or WidgetMap or any portion of such maps that has been stored in a system corpus or on a server that is accessible on the Internet (e.g., accessible when someone has taken the CCE module, generated a TextMap, WidgetMap, or MediaMap and posted it on the Internet). Further, as described, the branching algorithms take as input data from tracked user interaction with CCR-generated problem sets.

The primary example provided above illustrates a seven step process in which the operations described above function as part of a serial cycle in which the CCE module feed into the CCR module. In the following example, the CCR module feeds into the CCE module which then feed into the branching algorithms, which by contrast helps to illustrate the inter-operability of the output of the three modules.

By way of non-limiting example, assume that an aerospace firm has, as part of their competitive strategy development, an advanced class of airplane wing that provides significantly greater lift for lower thrust, thus rendering a savings in fuel costs and reducing the vehicle's impact on the environment. This is a seven-year plan, and so management wants to ensure that the company's employee base has, or will have, the requisite mathematical skills to meet the company's technical objectives. The hiring team works with the systems and methods described herein—in this scenario the CCR module first—to construct a concept cloud (step 1.d. in the example below) that describes the anticipated requisite math skills. This data set (i.e., concept cloud) is saved as a sample UDP profile of an ideal candidate for the team, optionally with CCR-generated sample problems to solve. Working with the CCE module next, the users of the systems and methods may optionally create a WidgetMap (2.c.iii.), perhaps with a TextMap of a white paper (2.c.iv.), that describes a mock airplane wing. The users then link the UDP profile with the WidgetMap/TextMap. The job advertisement may then be posted online with the sample problems, WidgetMap, and TextMap.

In this example, the CCE module analyzes the two concept clouds for overlap, antecedent/postcedent relationships, conceptual overlap, spine segments, and other relevant metrics (e.g., importance scores, headline concepts, weight scores, etc.). When current and candidate employees take a diagnostic exam, the branching algorithms then follow the progress of the spine segment ordering from the CCR module to pursue either a constraints-first process (meaning for each area of mathematics begin with the most advanced limits described in the UDP and as errors are detected progress toward increasingly simple expressions until the user reaches a preset level of performance) or a primitives-first process (meaning to begin with the most basic concepts of any math area and present progressively more complex problems until the user reaches a preset level of failure). The system delivers results from each test. In a further example of the functionality of the systems and methods described herein, given an online database of applicants and associated UDPs, the system can search for matches with the company's profile of requisite skill sets. The system can then establish a selection of candidates to contact.

In the seven-step example provided above, the functions of the CCE and CCR modules, describe a cycle in which the CCE module automatically extracts or compiles a concept cloud, (given various user inputs) and sends that concept cloud to the CCR module as input. The CCR module in turn automatically constructs a set of unique and viable math problems that incorporate, embody, or are otherwise based on the collection of concept line items that comprise the concept cloud. These problems, uniquely configured to the learning and informational requirements of the user, can then be delivered to the user for his/her review and study. Delivery of such problem sets can be accompanied by multi-media study content stored in the system's database and on servers that comprise the Internet (the user would receive links to such online content; such multi-media materials can, by way of non-limiting example, include: electronic textbooks; mapped locations in hard copy textbooks, white papers, and other books about the maths, the sciences, and any related subject as applied to educational, business, and/or industrial matters; videos; games; audio recordings; electronic and tactile manipulatives; blogs; and actual and electronic images of industrial components such as gears, wings, wheels, engines, and electronics). As such, the CCE and CCR modules, integrated with a diagnostic exam process that branches on the basis of user responses, can dynamically identify finely granular concepts of mathematics that the user needs to study or practice, and automatically construct algorithmic math problems customized to the user's requirements from problems that derive from unipolar concept clouds as well as problems that derive from more complex multi-polar concept clouds.

The example of an alternative process flow provided below is reconfigured to meet alternative user objectives. By way of non-limiting example, the alterative process described below reflects a re-formulation of the seven steps into three steps with multiple subcomponents. In the three step configuration, the CCR module, highlighted in step 1.g., the CCE module, highlighted in step 2.e., and the branching algorithms module, highlighted in steps 3.g. and 3.h., fulfill alternative roles and, in some cases, their respective output is repurposed in comparison to the primary examples used herein.

Again by way of non-limiting example, in the alternative flow, the CCR module first works with the user to construct a concept cloud that is saved as a UDP/SkillsMap that becomes a model by which the system can search for similar math skill sets. The CCE module then constructs a WidgetMap, perhaps with an attached TextMap of a white paper that explains the project mathematically encapsulated by the WidgetMap. Finally, the branching algorithms module dynamically and responsively runs tests, in concert with the CCR module, to examine and map the math skill sets of a team of people and to generate data that can enable online and automated searches for candidate team members.

This comparison of two configurations of the component steps of the CCE, CCR, and branching algorithm modules demonstrates that the various modular components of the system described herein are independent of any specific order of steps, underscoring that the system described in these specifications is non-deterministic. The entire CCE/CCR process may be performed in a single cycle, and the various modules may be reordered and repurposed to fulfill alternate objectives.

The following is an alternative embodiment, of the process flow.

Step 1. If the input is:
a. user input, such as:
  i. a checklist of concepts or features to be included in the math problem (see 1.d. below);
  ii. an indication of the textbook, unit, chapter, and section being studied;
  iii. a targeted math topic; and/or
  iv. one or several keywords;
b. detailed online data about a user's development, e.g., from his/her UDP;
c. graded test question from a diagnostic exam (whether system-originated or manually entered from a hard copy test);
d. human-computer constructed concept cloud (human directed—e.g., from 1.a.i. above—with computer-assisted completion of the concept cloud); or
e. human-selected math problem;
then:
f. distill a concept cloud from the input (unless already performed in a previous step); and
g. construct math problems that exactly fit the concept cloud and subsets of the concept cloud from user input;
h. solve each constructed problem so that it is prepared for binary grading (correct/not correct);
i. test the problem for system-required metrics for later data-mining and analysis;
j. save the problem to a system corpus with associated MSCICs for the concept cloud; and
k. deliver the problem or problem set to the user (without the answer(s)).

Step 2. If the input is:
a. graded test questions from a diagnostic exam that has applied branching algorithms;
b. human-selected math problems; or
c. user input, such as:
  i. a human-computer compiled concept cloud;
  ii. an indication of the textbook, unit, chapter, and section being studied;
  iii. mathematical description of an object;
  iv. an electronic copy of a book, textbook, or other written document;
  v. a checklist of concepts or features to be included in a math problem;
  vi. a targeted math topic; and/or
  vii. one or several keywords; perhaps with
d. assess user data packet (or "UDP") (if not already performed) to determine user(s) needs with respect to the necessary problem or problem set (which may be represented by a concept cloud and which can be generated by the CCR module) so that the output is customized to the user's math skills or expected math skills (in the event that the UDP is an example of what is required, e.g., a mock UDP; in the event that the system does not have a user data packet (UDP) in the system's database for the intended user(s) of the output, the system may offer a template for the user to fill out, prior to the system generating the requested output);
then:
e. distill a concept cloud that exactly fits the user input;
f. present the concept cloud as a list;
g. present the concept cloud in a roots-and-branches (tree) configuration;
h. automatically analyze it and store it in a corpus; and
i. deliver the concept cloud to the user.

Step 3. Receive input as to what kind of math problem is required by the user, as indicated either by:
a. user input, such as:
  i. a checklist of concepts or features to be included in the math problem (see 1.d. below);
  ii. an indication of the textbook, unit, chapter, and section being studied;
  iii. a WidgetMap, MediaMap, or TextMap;
  iv. a targeted math topic; or
  v. one or several keywords;
b. stored data about a user's development, e.g., from his/her UDP;
c. graded test question from a diagnostic exam (whether system-originated or manually entered from a hard copy test);
d. human-computer constructed concept cloud (human directed—e.g., from 3.a.i. above—with computer-assisted completion of the concept cloud);
e. human-selected math problem; and, optionally,
f. detailed online data about the user's development alone or in concert with one or more items from a. through e. preceding;
then, from:
g. a computer-selected segment of the spine of the ontology;
h. direct the CCR module to construct requisite math problems;
i. solve each constructed problem so that it is prepared for binary grading (correct/not correct);
j. test the problem for system-required metrics for later data-mining and analysis;
k. save the problem to a system corpus with associated MSCICs for the concept cloud; and
l. deliver the problem or problem set to the user (without the answer(s)).

The alternative process flow above is merely one example of an alternate flow. Those skilled in the art will recognize the modules may inter-relate in numerous additional variations.

Dynamic Complexity

The systems and methods described herein track and analyze user progress on the basis of dynamic complexity. Dynamic complexity (or "DC") is an analytical construct that identifies and measures—as data attributes—the relative degree of dynamism vs. complexity in a user's progress. Dynamism has two components: the type of change and the rate of change. Similarly, complexity has two components: the number of variables inherent in any circumstance and the degree of interplay between those variables. As a tool, dynamic complexity may (as an option) be applied by the systems and methods to direct dynamic construction of math problems, to analyze online user behavior, to assess user and group performance, and to manage user and group progress.

In one example, there are four quadrants of a simplified dynamic complexity matrix. The four quadrants of the simplified dynamic complexity matrix summarize and characterize four modes of user learning and progress. This analysis construct is one method to identify the possible nature of user/group progress and dynamically adjust content to support learning, practice, and application.

Given the relative degree of dynamic complexity of a user's work progress, the systems and methods dynamically change the content of concept clouds the user is provided to help the user through any difficulties or, if the user's pace signals rapid assimilation of the material, to extend the user's practice and the breadth and depth of application of those concepts or topics (via the whole concept model). If important, the systems and methods signal for help on behalf of the user with an e-mail to his or her parents, teacher, or tutor.

For example, if a user's progress falls within the quadrant labeled NO WIND IN THE SAILS, the user is at risk to fail in his/her ownership of a particular concept, or perhaps in his/her ownership of math as an academic course of study. Coordinates for online work—as corroborated by in-school grades and online data—that fall within the lower left quadrant and remain there over a period of time may also be accompanied by other attributes of online behavior. Those attributes can include infrequent visits to the online system and inactive math work files. When a user's performance enters the lower left quadrant, the online system can automatically send a broadcast e-mail to his/her teacher, tutor, parents, and system administrators to notify them of the problem and provide them with details of the user's performance and the identified sources of difficulty.

For users whose performance consistently fails, automatically-generated sets of math problems can be shorter. Topics and related content can be at the simplest and finest possible level of granularity to help the user achieve a sense of progress and develop a sense of motivation. Once the systems and methods have operated over a certain period of time, the analysts can complete a detailed assessment of the population of users whose performance consistently settles within this quadrant. One potential outcome of the study may be to develop particularly simple content to help users through certain topics or concepts. By contrast, performance characterized by attributes located in the quadrant labelled INTENSE INDIVIDUAL/GROUP R&D may suggest active learning and significant effort devoted to material that the user experiences to be relatively difficult. Users whose performance metrics fall within this quadrant may experience slow progress and measured acquisition of new concepts and skills sets. Online activity, however, may reflect study and practice patterns reflective of work to assimilate a foundational concept.

To help users progress through this quadrant, the systems and methods reference causal links between CLIs and concept clouds at one grade level, and CLIs and concept clouds at subsequent grade levels (i.e., prerequisite relationships between concepts), and automatically check for attributes of the user's math skill set that define the quality of the user's math skills developed at previous grade levels (as evidenced either by previous online work, an initial diagnostic exam, or a special-purpose diagnostic test run to detail the extent and nature of weaknesses in the user's mathematical skill set that might slow the user's progress though this quadrant). In the event that no causal relationship is detected between the user's current difficulties and the quality of his/her mathematics skill set, the systems and methods generate new math problems specifically designed to help move the user through this quadrant. This is an application of the whole concept model, described further herein. For example, new or amended problem sets may: focus on the granular concepts of math concepts; build, carefully and more slowly, concept clouds up to the desired knowledge set; gradually and with measured progress make changes to the composition of concept clouds; provide an ample supply of examples of application; help users at every opportunity to extend the depth of their knowledge about the topic or concepts; and run frequent tests to check progress in users' acquisition and ownership of the skill set at the level of mathematical literacy or fluency.

Online and in-school dynamic complexity coordinates that fall within the quadrant labelled RUNNING THROUGH GREEN PASTURES may reflect a period of consolidation of perhaps multiple mathematical concepts into one or more topics. This is a period of significant "Ah-Has." Users whose performance metrics locate in this quadrant may, for example, be focusing on broad applications of a mathematical concept. Dynamically generated content for such users concentrates on material that deepens the concept and on appropriate applications (the fourth concentric ring of the whole concept model).

Finally, if the attribute coordinates of a user's online work and progress—rate of progress at a given level of complexity, as corroborated by his/her in-school grades and analysis of online work with the online systems—are most closely characterized by the quadrant of the matrix labelled GOING FOR THE GOLD, then most online content created for that user (or, perhaps, a group of users) for those concepts or concept clouds currently under study, practice, or application by the user typically include multi-variable math concepts (the number of variables in equations, the number of variables in applications of the mathematic concept, and the combinations and permutations of attributes that characterize the problems and applications, i.e., via concept clouds), perhaps a broad array of potential applications of the math concept, and rapid development that leads to particularly complex word problems. Given the potential for developmental error, failure tolerance levels can be lower, PSTT reports can be more frequent, and correlations between online work and in-school grades can be carefully monitored. In the event that the level of complexity proves to be too great for any user, the online system automatically detects and analyzes the difficulties, scales back the level of complexity in dynamically generated math problems, eases the pace, and automatically adjusts the content to help the user regain his/her traction and resume progress toward achievement of complete command, at the level of the whole concept, in those concepts and concept clouds.

Note that a period of work, the coordinates of dynamic complexity for which locate in RUNNING THROUGH GREEN PASTURES quadrant, may naturally follow an extended period of coordinates in the INTENSE INDIVIDUAL/GROUP R&D quadrant and may precede a migration of learning attributes to the upper right quadrant GOING FOR THE GOLD. It is anticipated that users can readily move from one quadrant to another, rather than remain in one quadrant over an extended period of time. Users very likely can move from quadrant to quadrant with some frequency.

The Expanded Dynamic Complexity Matrix

A simplified dynamic complexity matrix may, for example, depict sixteen sectors. The quadrants of the simplified dynamic complexity matrix are repeated by the four center cells of the example above. The labels in the top row indicate the various possible combinations of the two elements of complexity (number of variables and degree of variable interplay). The far left column lists possible pairs between the elements of dynamism (amount of positive change, or progress, and the period over which the progress takes place). The label of each sector is associated with one of the four scenarios, described in the simplified dynamic complexity matrix, that highlight typical stages of knowledge acquisition in schools (Running Through Green Pastures ("Green"), Going for the Gold ("Gold"), No Wind in the Sails ("Wind"), and Intense Individual/Group R&D ("R&D")). The "+" symbol represents the word "positive." Note that the expanded dynamic complexity matrix can be applied to map, for every user and every group of users, performance attributes with each math concept and concept clouds as well as the prerequisites and dependencies thereof.

Application of the Expanded Dynamic Complexity Matrix

Each sector of the expanded dynamic complexity matrix is colored to correspond with a quadrant in the simplified version of the matrix. Sectors are ordered by combinations of attributes, from the best possible circumstance, for a user whose performance attributes plot in any given quadrant (comprised of four sectors), to the least desirable circumstance. For example, among the four gold sectors in the matrix in the expanded version, it is preferable for a user's performance attributes to indicate that s/he has made great progress (much positive change) in a short period of time with problems that include many variables and extensive interplay among those variables. Such performance attributes would map to the GOLD 1 sector. By contrast, it would be less preferable for a user's performance attributes to map to the sector that suggests that he or she has made much progress over a sustained period of time, limited to problems with many variables and limited variable interplay (GOLD 4).

Similarly, a user whose progress has been limited over a short period of time while he or she learns to work with moderately difficult problems (WIND 1) is in a better position and may be on a more dynamic track than a user who has over a long period of time made very little progress with the very simplest of problems (WIND 4).

Over time, the systems and methods track and correlate user learning, study, and performance attributes for every math concept (and combinations thereof via concept clouds) and for every model of user learning behavior. Such learning models can be associated with local and state educational systems, pedagogical methods, math and science textbooks, national performance on the periodic OECD PISA studies, and international peer rankings of individuals to detect and codify factors that contribute to development of G.A.T.E. users, successful support of users who perform poorly, successful programs for ADD/ADHD users, and for broad-based strength in most users in each math concept.

SkillsMap

The SkillsMap is one of the principal features of the systems and methods described herein. The SkillsMap is a drillable report, presented in graphic, tabular, spreadsheet, or other format, that reflects user interaction with the online system, math problems the user has worked, the status of the user's math skill set on the basis of concept line items and concept clouds (of any type), and analyses. The scope of SkillsMaps can by dynamically adjusted by user-PSTTs (parents, students, teachers, tudors) to focus on the status of a single user's math skill set, or the skill set of a group of users, however defined. The SkillsMap is interactive. The drillable features link to other content stored in the databases of the online system and content on the Internet. As such, it can become one of several home screens for user-PSTTs.

Model for TextMaps and WidgetMaps

The SkillsMap is also the model for its TextMap and WidgetMap features. TextMaps are similar to SkillsMaps in that they present a configuration of concept line items and concept clouds, and they are drillable. What differentiates them is that TextMaps represent the concept coverage by textbooks of math and highlight where concepts, concept clouds, insights, and nuances—in other words, y-intersections, speed bumps, potholes, gaps, and chasms—are not explicitly or clearly discussed in the textbook, or are otherwise not covered by the textbook's examples or exercise problems. When this data is mined along with the system's data with respect to the identity of predictors of concept formulation/consolidation, concepts known to develop procedural flexibility, links in the secondary cloud, and the performance of international populations with other textbooks (and their TextMaps), the tool that is to be made available to teachers and school districts can be powerful. On the basis of TextMap data, the online system can be able to automatically suggest supplementary materials to fill or replace the five kinds of concept gaps (y-intersections, speed bumps, potholes, gaps, and chasms), dynamically analyze and compose concept clouds to create exercise problems that supply missing information, link the effectiveness of textbooks to known predictors of concept formulation/consolidation and developers of procedural flexibility, and assess the effectiveness of teachers' lesson plans. The TextMap data and related features provide users and teachers a means to access an integrated and canonical series of math resources that spans the curriculum of mathematics from Pre-Kindergarten through twelfth grade ("PK-12").

WidgetMaps are similar, though they map the concepts incorporated by events and physical objects. WidgetMaps developed via the Ontology Editor Software demonstrate and activate user work with applications of certain math concepts. Further, the WidgetMaps are to be deployed via the online system as an activity and method of study and exploration for users to build themselves. By means of a graphic user interface, users enter math concept data, compose their own concept clouds, and see it presented by the graphic SkillsMap-like interface.

TextMaps, WidgetMaps, and the Ontology Editor Software

When the systems and methods herein construct a TextMap or WidgetMap, they do so with the Ontology Editor Software. The Ontology Editor Software enables math analysts to quickly review a textbook or other supplementary material (whether printed material or tactile manipulatives), identify concepts and key concept clouds, parse concept clouds from algorithmic examples and exercise problems, and thereby construct a TextMap. Once checked for accuracy, the TextMap and its data are uploaded to the online system for application by any PSTT, school, or school district.

Similarly, the Ontology Editor Software helps math analysts construct WidgetMaps. Given the databases in the Ontology Editor, analysts are able to creatively compile the concepts of mathematics—at the level of any age, grade, skill, or math subject—to describe the physical or animate features of a physical object or event.

Attributes of the SkillsMap

Each attribute of the SkillsMap has meaning. The following description is of one example of an interactive graphical representation of a SkillsMap. In this example, the regions are dynamically sized and positioned by the online system.

In general, however, the regions progress in a semi-circular pattern from the upper left to the lower right. As the user masters each concept, the block for that concept becomes darker, shrinks in size, and progressively moves from the left region to the upper right, down to the middle region, then to the immediate right, and finally to the region in the lower right-hand corner of the map. Concepts in the lower right-hand region of the SkillsMap have been mastered and are ready for significant advancement in greater complexity and advanced applications.

There is a legend at the lower right corner of the map to indicate, that the more shaded a concept block becomes, the more the user is improving his or her skill with that concept. The educational plan for each user is set by the vertical slider in the middle of the screen shot. This setting directs the online system to dynamically adjust the map if the hurdle for the user is set at progressive gradations of five points. These scores are like grades and essentially tell the online system to configure the SkillsMap if the user is expected to achieve (for example) a score of 85%. If that is the plan, the configuration of which concepts are in the left region, which are in the upper right region, and which are in the lower-right region, etc., may be different. Further, the size of the blocks and the shading of the blocks can change.

If a user selects any pattern in the legend, the entire map focuses on just that pattern. Users may also click on the drop down list that upper left to select the grade level that they want the map to exhibit. An "All" button at the upper left corner of the map displays a comprehensive map of the user's performance with all concepts from the earliest data the user has stored on the online system. If the user selects any block, a pop-up window appears that reflects basic information about the concept of that block, namely a textual description of the concept, the textbook the user is studying, location of the concept in the textbook, when a test is/was scheduled that involves the concept, dependency concepts that are about to be studied and when, the concept's weight score, the concept's importance score, the concept's inherent difficulty score, the user's performance on the concept, his/her proximity to the performance level set, the range of difficulty scores for the problems that tested the concept (on a diagnostic exam and/or a previous test, per user settings), and what percentage of content on the online system that applies to the concept the user has completed.

As described above, the SkillsMap is also drillable. Selecting any block opens a report of data that applies to that block. Five buttons at the lower left-hand corner determine what data is presented when a block is double-clicked. A set of examples appears below.

Far left button—Data Scores. The data that the system uses to base its determination of the size, shade, and location of the concept block. In most cases, this can be the scores on any diagnostic tests.

Left button—Review of Worked Content, Questions and Problems Posed with User Responses. The online content that the user has performed, including problems on diagnostic exams and the automated branches the system pursued to map the user's SkillsMap.

Middle button—Outstanding Content, any online content or offline content (as reported by a PSTT) that is available to the user that the user has not worked.

Right button—Relevant Concept Clouds, the concept clouds that have accompanied the concept when it was presented to the user with the root system for each and highlights of any causes of the user's difficulties that may lie in the roots (i.e., perhaps the user did not master a prerequisite concept covered in a previous school year).

Far right button—Performance on All Prerequisites and Dependencies of the Concept Block. This includes not just those represented in the main SkillsMap screen, but the RCCs and BCCs (within the bounds of relevant curricula) as well.

These buttons are user-configurable so that users can determine from a set of options which data sets can be presented in greater detail with each of the five buttons. Other options available are include the following.

Related In-School Scores (As Reported). Any relevant in-school scores as reported by a parent, the user, a teacher, or a tutor can appear.

Gestalt Critical Path. The critical path that leads up to and away from the concept selected.

Textbooks and Standards. The user's primary textbook (as reported by any PSTT) and places in other textbook or places on the Internet that address the problem as well as performance relative to state and national education standards for mathematics and international standards.

Concentric Rings of the Whole Concept Model. As discussed below, the regions of the SkillsMap represent repeated passes through the four tiers of the whole concept model until the concept is thoroughly mastered. Data as relate to each WCM tier for each region is drillable data that can be presented as user-PSTTs double-click on any concept.

Regions of Dynamic Complexity. The sixteen regions of the Dynamic Complexity matrix also represent drillable data that can be presented to user-PSTTs to help them pinpoint the sources and effects of a user's progress, whether that progress is swift or slow.

A detailed schedule of examples of attributes that may be used to visually represent elements of the SkillsMap follows.

Patterns: Pattern #1—Given the difficulty setting, pattern #1 blocks represent those MSCICs on which the test subject performs at or below 60% of the desired performance level. Pattern #2—Given the difficulty setting, pattern #2 blocks represent those MSCICs on which the test subject performs at or below 70% of the desired performance level. Pattern #3—Given the difficulty setting, pattern #3 blocks represent those MSCICs on which the test subject performs at or below 80% of the desired performance level. Pattern #4—Given the difficulty setting, pattern #4 blocks represent those MSCICs on which the test subject performs at or below 90% of the desired performance level. Pattern #5—Given the difficulty setting, pattern #5 blocks represent those MSCICs on which the test subject performs at or below 100% of the desired performance level.

Shades of Patterns: Bright—Below 70% of pattern performance level to move up to the next tier (i.e., pattern #1 to pattern #2). Medium—70% to 84% of pattern performance level to move up to the next tier (i.e., pattern #1 to pattern #2). Dark—85% to 94% of pattern performance level to move up to the next tier (i.e., pattern #1 to pattern #2). Black—95% to 100% of pattern performance level to move up to the next tier (i.e., pattern #1 to pattern #2).

Size of concept blocks and position of concept blocks within the pattern collection (shades of the same pattern are located together): When the block is bigger, there is either a test coming up on this concept block, or a soon-to-be-studied concept that is a dependency on this concept block (as determined from a lesson planner that can be available to teachers, otherwise block size can indicate relative urgency of the block as other blocks are dependencies on it). Users are able to select the block to see details about when the test is scheduled and what dependency concepts are about to be studied and when. The bigger the block, the closer to the upper left corner of the color collection that block is positioned. When the block is smaller, there is no announced test coming up on this concept block, or soon-to-be-studied concepts are not dependencies on this concept block for the block, though the user's performance on that concept is not as strong as it needs to be. Users are able to select the concept block to see what concepts the critical path to/from that concept includes. Users are able to select the block to see details about when the test is scheduled and what dependency concepts are about to be studied and when. The smaller the block, the closer to the lower right corner of the pattern collection that block is positioned.

Two user-configurable options are available to determine information a user sees when he or she left-clicks or right-clicks on a block. For example, a left-click on a block may highlight the prerequisites and dependencies of that block that also appear in the SkillsMap (each involved block can be highlighted with a white glow and connected with lines as in a directed graph). A right-click on a block may highlight the critical path (the pattern of predictors of concept consolidation and related links in the Secondary Cloud) leading up to that block (each involved block is highlighted with a gold glow).

Position of Pattern Collections Relative to Each Other: Pattern #1—The pattern #1 collection is at the left or upper left corner of the screen. Pattern #2—The pattern #2 collection is at the lower left corner of the screen (if the number of pattern #1 blocks to be presented do not take up the entire left margin of the screen) or right next to the upper right corner of the pattern #1 block. Pattern #3—The pattern #3 color collection fits between the pattern #2 and the pattern #4 collections. Pattern #4—The pattern #4 collection fits between the pattern #3 and the pattern #5 collections. Pattern #5—The pattern #5 collection is at the right or lower right corner of the screen.

Tabs Above the Screen: The SkillsMap may include a set of tabs that reflect SkillsMaps from previous diagnostic exams taken by the same user or user group. The SkillsMap may include a set of tabs that reflect SkillsMaps for the same user or user group from previous dates. The SkillsMap may include a set of tabs that reflect the SkillsMap of the general population segmented by age, school, school district, state, concept cloud, grade level, math subject, relative performance, and country.

Integration of the SkillsMap with the Gestalt/Special-Purpose Diagnostic Tests, the Whole Concept Model, and Dynamic Complexity One application of both SkillsMap and the whole concept model is to lead the user through progressive development of a concept or concept cloud (i.e., an MOCC). Each region of the SkillsMap, as defined by a certain pattern, represents an epoch in the development of a user's math skill set. It is a period of time when concepts assimilate in the mind of the user, when the implications of concepts in terms of new capabilities come into sharper focus, and when the user realizes how those capabilities can be applied. At each epoch, thorough development of math skills implies that the user become familiar with the CoreCon, progress on to master the concept to some depth, take that mastery to greater depth and complexity, and finally deploy the concept to meaningful achievement.

So, when a user's skills are in pattern #1, the online system may dynamically lead him or her—by means of dynamically constructed math problems and their concept clouds—through four tiers of concept development. Each of the four tiers represent (Tier 1) the simplest explanations of the CoreCon, (Tier 2) the lightest expansion of the concept toward mastery, (Tier 3) the lowest level of complexity, and (Tier 4) the easiest applications. As the user's performance with the concept in its current region progresses, the concept block migrates from the first region marked by pattern #1, to the region marked by pattern #2, and so on until the concept block arrives at the region marked by pattern #5 (in the example described, the lower right-hand corner of the SkillsMap). At each region, the online system cycles the user through progressively more complex material at each WCM tier.

For example, if a user is a nascent multiplier, he or she can work through all four concentric rings for multiplication at his or her level of current accomplishment. As he or she becomes more proficient, he or she can then work through the four concentric circles at the new level of advancement (progressing from the region marked by pattern #1 to the region marked by pattern #5). This process can continue until the user's SkillsMap shows that concept block in pattern #5, and that would indicate that the entire WCM for that concept is well mastered by the user and he or she is ready to progress to the next course level knowing that the skill set is solid. That work can support greater accomplishment in future studies.

The effect of the paired SkillsMap and the whole concept model has significant implications for the gestalt and special-purpose diagnostic testing modules of the systems and methods described herein. User-PSTTs are able to adjust the settings of the gestalt and special-purpose diagnostic testing modules to focus on certain tiers of the whole concept model. As described herein, a user's progress through the whole concept model should be a tiered progression through each concentric circle, and (optionally) be staged to guide the user through each region of the SkillsMap. Both the gestalt and special-purpose diagnostic testing modules are guided by the nodes of the spine of the ontology for each grade level and math subject. Branching algorithms respond to a user's performance (given binary data, namely correct or incorrect) on each problem by causing the system to generate or otherwise select (from the online system's corpus of problems and concept clouds) another algorithmic problem or problem set with headline concepts that focus on suspected deficits in the user's skill set. If mastery of a concept is the focus of the PSTT-instantiated test, then the online system generates those types of problems. If greater complexity it desired, then the online system adds more variables and greater interplay among those variables (discussed in the section on applications of Dynamic Complexity). Applications derive from templates in the online system's database and are dynamically adjusted to meet the user's capabilities and educational needs as determined by his/her abstract data type (ADT).

To lay the technological foundation for this, the various layers of proficiency are embedded in the templates developed for each CLI and MOCC, and may later be selected by a dynamic complexity slider available in the system's lesson planner for teachers and parents and tutors.

Pedagogical Applications of Dynamic Complexity

Dynamic complexity represents an excellent tool to diagnose, track, and analyze user educational progress and needs. The systems and method described herein also apply dynamic complexity to manage the content of user online work. The systems and methods described herein provide a methodology to progressively increase the complexity of any mathematic concept, or concept cloud, and deepen and broaden users' knowledge of applications to technology and the social sciences. This organizational construct also provides the online system with a means to continually monitor users' progress and fine-tune the complexity of problems they study and practice such that their acquisition of each concepts is thorough and their progress is supported and guided. These dynamic problem generation capabilities, developed on the basis of concept clouds, provide each user with an endless variety of problems until he or she has mastered the focus concept(s) and progressed to achieve command of the material in depth (greater complexity) and in breadth (applications).

The matrix may be a graphic user interface for teachers, tutors, parents, and (when users are capable of managing their own work) users. In an example of the matrix, a right column labeled "Px" reflects hypothetical identification codes for each concept line item or concept cloud (R1 to Rx for prerequisite concepts, and P1 to Px for problems associated with the focus area of competency required by the teacher, and dependency concepts), and the order of concepts or concept clouds from least complex to most complex. Brackets to the left of the Px column identify groups of problems ordered from the simplest, when the core concepts are first introduced to users, to those that represent the expected level of competency (a level to be set by schools and/or PSTTs), and on to advanced applications of focus concept(s). These areas mirror the concentric circles of the whole concept model. When a user has mastered the concepts at the level of expected competency, he or she may increase the depth of his/her knowledge and application of the concept(s) by practice and work on dynamically-generated problem sets that involve more variables, richer interplay of variables, more steps to solve the problems, and computations of meta-variables. Users are also able to increase the breadth of their knowledge of applications of the concepts with progressively more complex versions of scientific and technological ("SciTech") math application modules.

The column in the organizational matrix labeled "Vx" identifies the number of variables in each math problem (whether that math problem is a word problem, an equation, a geometric problems, or a problem that involves graphic interpretation). "Sx" denotes the number of steps required to solve the equation. The number of steps is a summary metric to indicate how many times each variable is used in the equation and whether the user could derive key variables him/herself from the information provided ("meta-variables"). Detailed variable usage and meta-variable development metrics for each problem and problem template may be employed. A "SciTech" column matches identification codes for each application module (in its skill level-appropriate version) to problems and problem sets associated with each concept line item (or concept cloud) and to users' capability to work at a certain level of problem complexity.

Users who are mature enough to assume autonomous responsibility for their studies are able to interact with the program that creates math problems to configure the system to their own needs. Until that moment, users, their parents, teachers, and tutors are able to configure the online system on the user's behalf based upon the online system's assessment of the quality and nature of the user's mathematical skill set (i.e., the user's SkillsMap).

Application of the Dynamic Complexity Organizational Matrix

In one example, user-PSTTs are able to size and slide the brackets to the left of the Px column to indicate to the system the specific level of competency required of the users, concept-by-concept. In response, each bracket outlines one of the four tiers of the whole concept model. When the teacher goes to the online system, he or she is able to open a user's records, notice by the pattern the level of proficiency of the user, and by red brackets where the user's competency lies at the teacher's set plans for his or her class (the default level for the online system can be 100%).

Objects and Advantages

An object of the present systems and methods is to empower each user to develop functional and flexible math skill sets by exposing the user to granular information— meaning relevant concepts of mathematics—and support the user's exploration of and practice with those concepts. The automated systems and methods described herein are adapted to resolve this problem by identifying, explaining, demonstrating, and supporting the user's exploration of and practice with the concepts that, from the user's unique perspective of a problem, are missing and, in their absence, raise obstacles to the user's comprehension, achievement, and progress. Such concepts are frequently expressed in finely granular insights and nuances.

From a teacher's perspective, another object of the systems and methods described herein is to identify, on a student-individual basis and on a class-wide basis, concepts that students and study materials are missing, and pairs those concepts with pedagogical methods proven to be successful for students with divergent learning attributes Another object of the present systems and methods is to fulfill a critical need in the PK-12 (and beyond) math education space.

Another object of the present systems and methods is to level the education field for students with teachers who are not strong mathematicians.

Another object of the present systems and methods is to map the math education background of students, teachers, tutors, parents, employees, applicants, etc.

Another object of the present systems and methods is to map the contents of textbooks and provide comparative insights and automated recommendations.

Another object of the present systems and methods is to open opportunities for further research, exploration, and development on the basis of population characteristics.

Another object of the present systems and methods is to identify the attributes, properties, and variables of population brackets and the drivers of migration among such groups.

Another object of the present systems and methods is to highlight successful pedagogical methods and the cognitive and developmental logic behind them.

Another object of the present systems and methods is to track population responses to pedagogical methods.

Another object of the present systems and methods is to detail development in student math skills from a baseline established at the beginning of a school year through the course of an academic year.

Another object of the present systems and methods is to provide international transparency to the mathematical development of a nation's students and thereby define a world-class standard for each grade level and the means for every student to reach it.

An advantage of the present systems and methods is the ability to automatically distill concepts from math problems and dynamically construct and test the creation of math problems from a collection of math concepts.

An additional advantage of the present systems and methods is the use of branching algorithms to test and map a user's skills.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 is an example of a method of translation of CLIs into machine readable code.

DETAILED DESCRIPTION OF THE INVENTION

Figure 1:
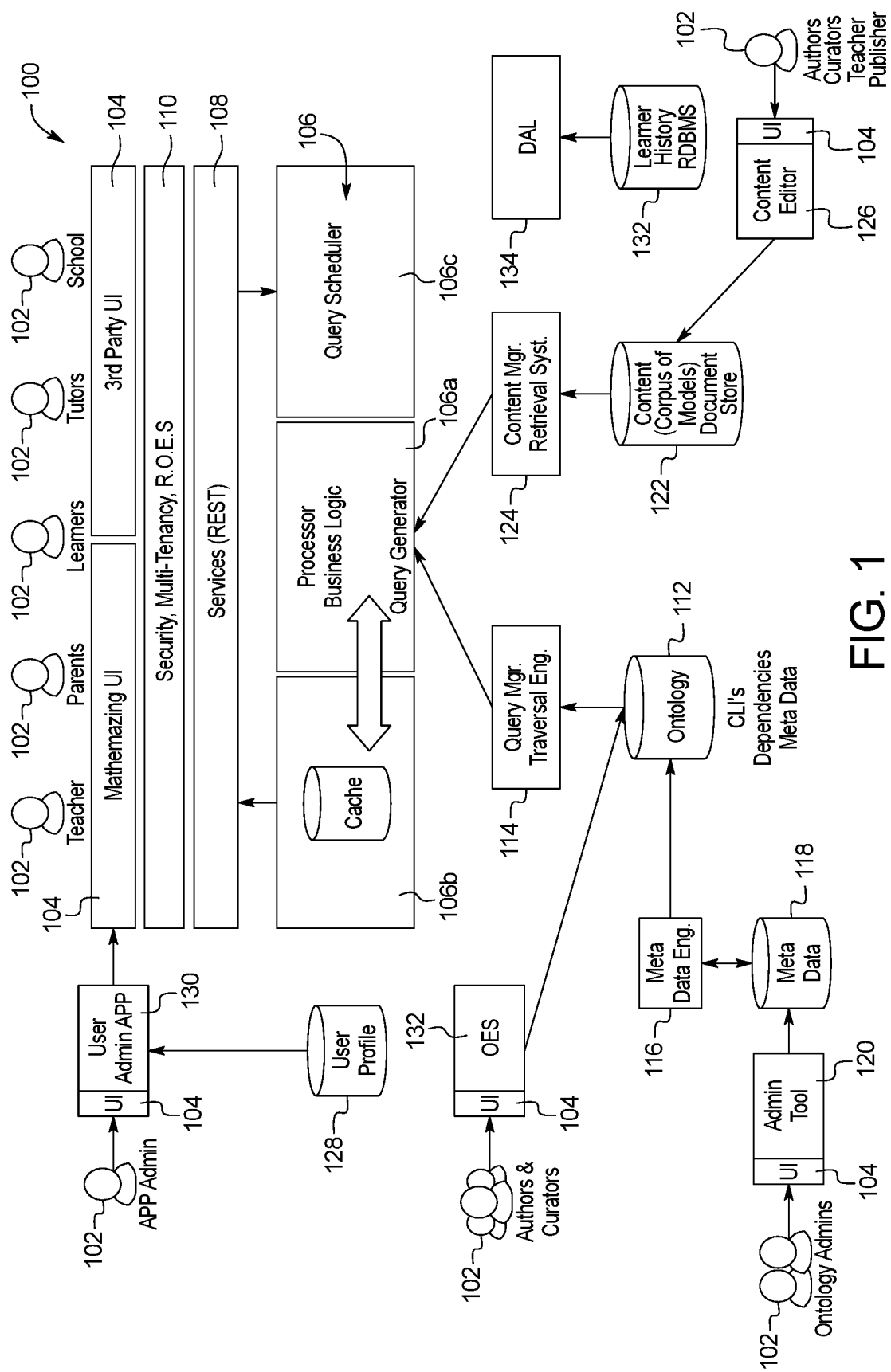
FIG. 1 is a schematic representation of an example of a system architecture that may be employed by the systems and methods described herein.
Figure 2A:
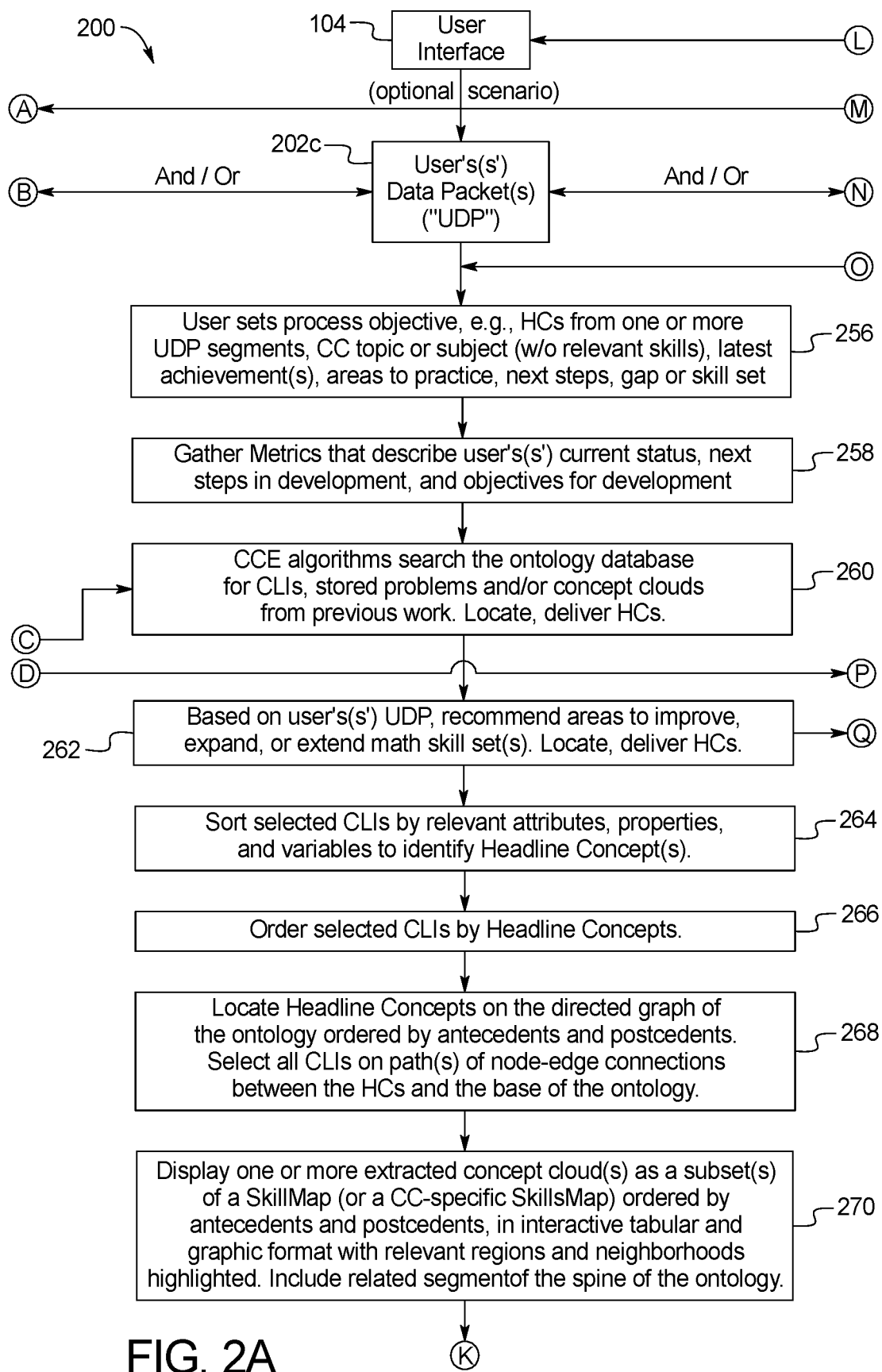
FIGS. 2A-2F are a flow chart representing a process embodying the concept cloud extraction module and the concept cloud reconstruction module.
Figure 2B:
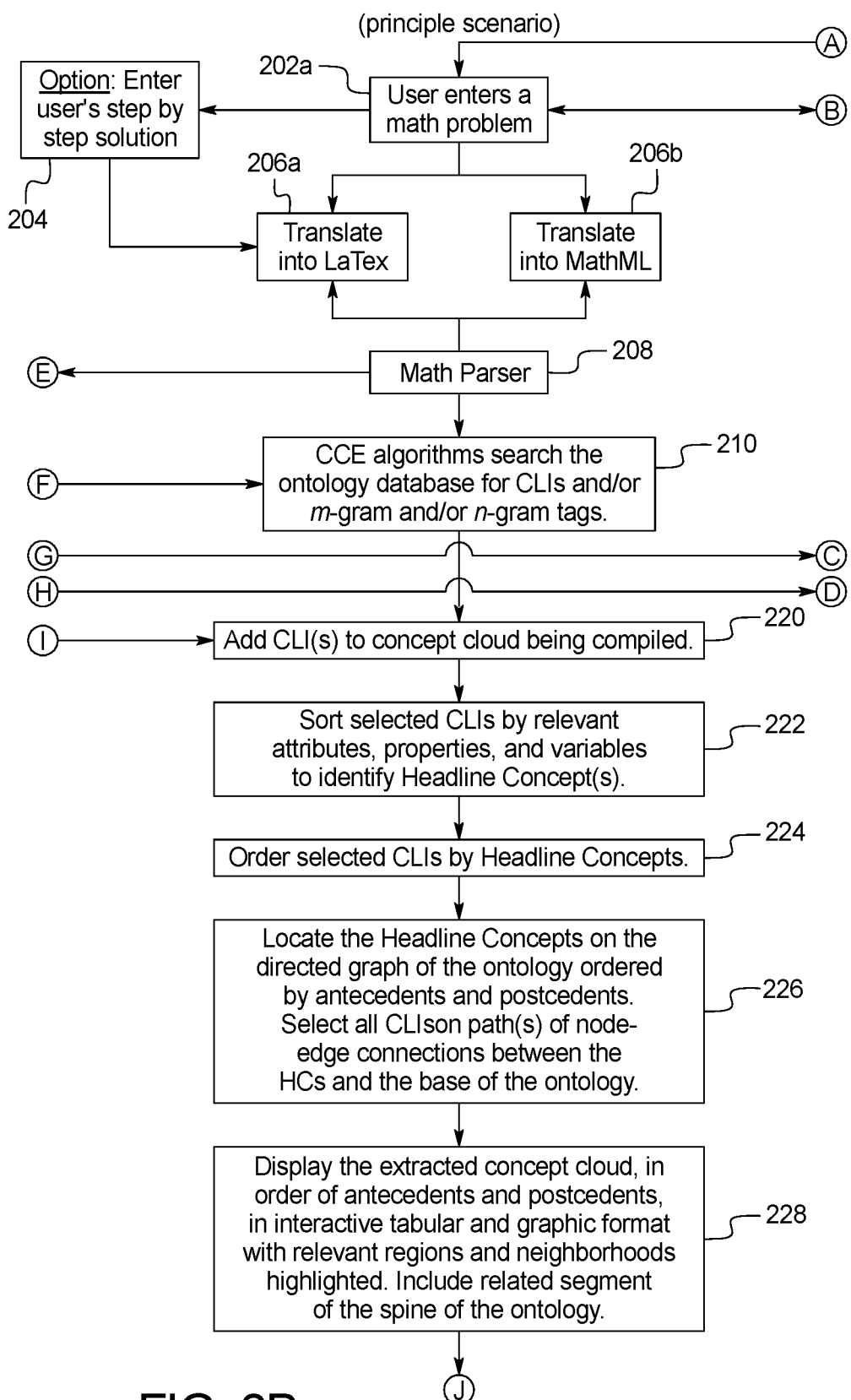
Figure 2C:
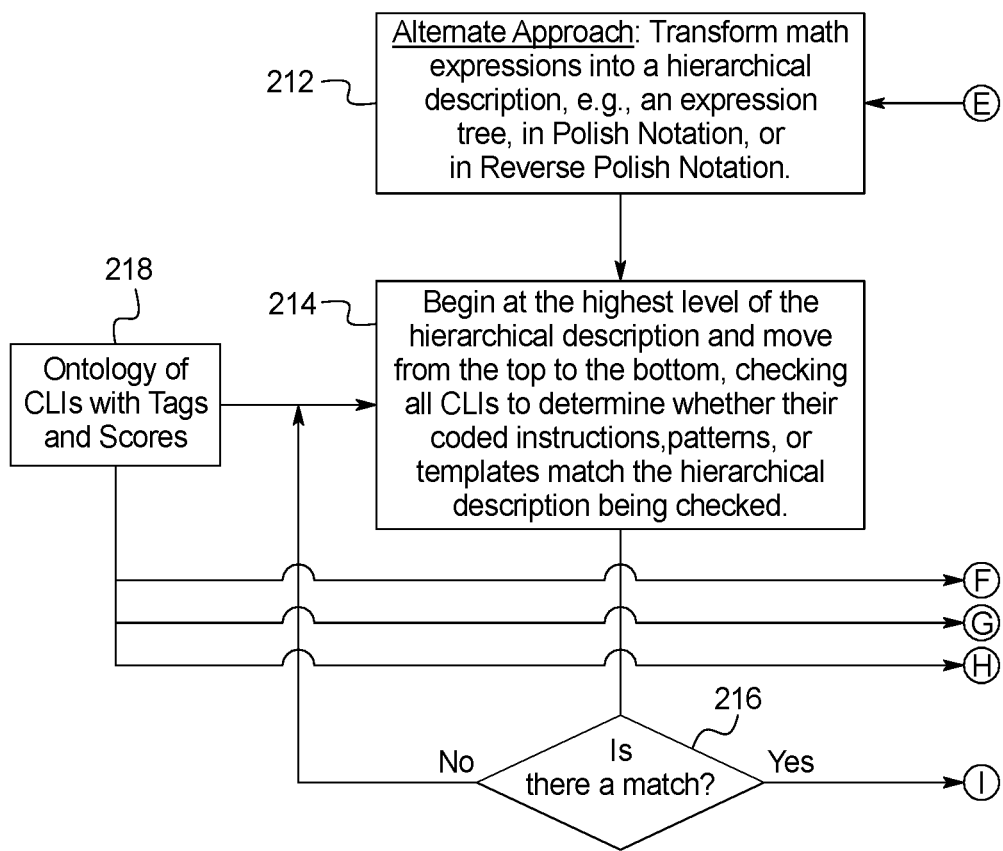
Figure 2D:
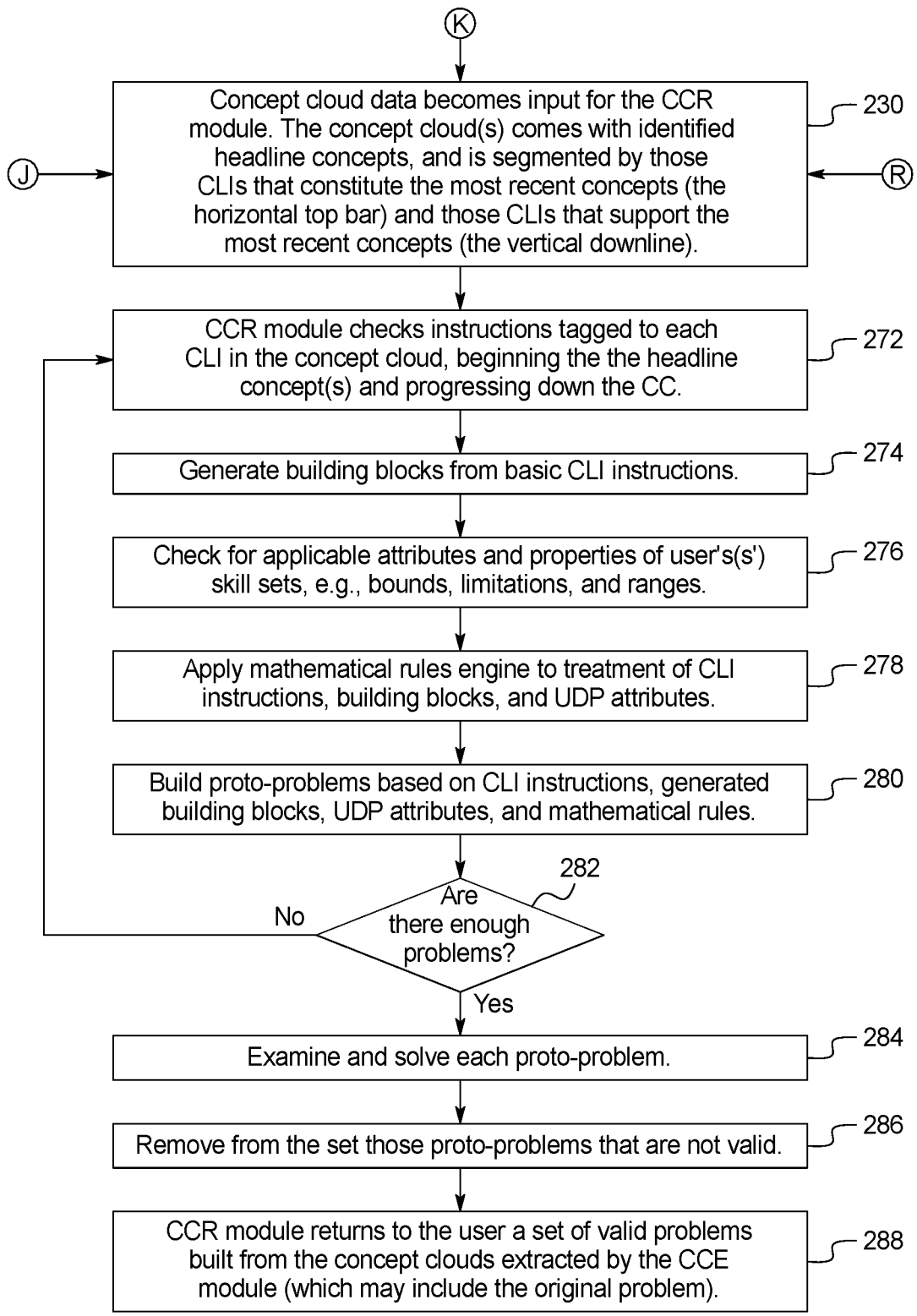
Figure 2E:
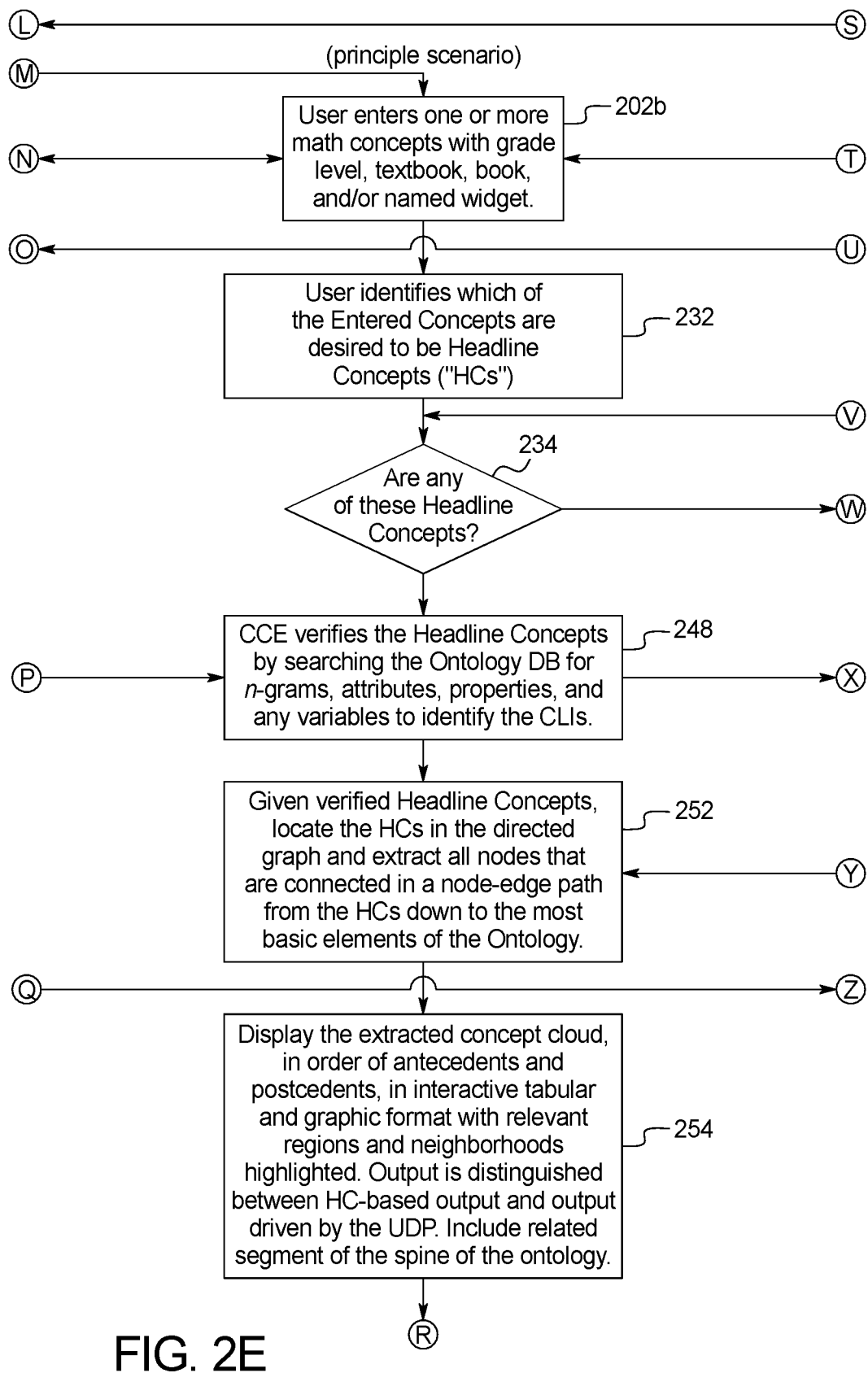
Figure 2F:
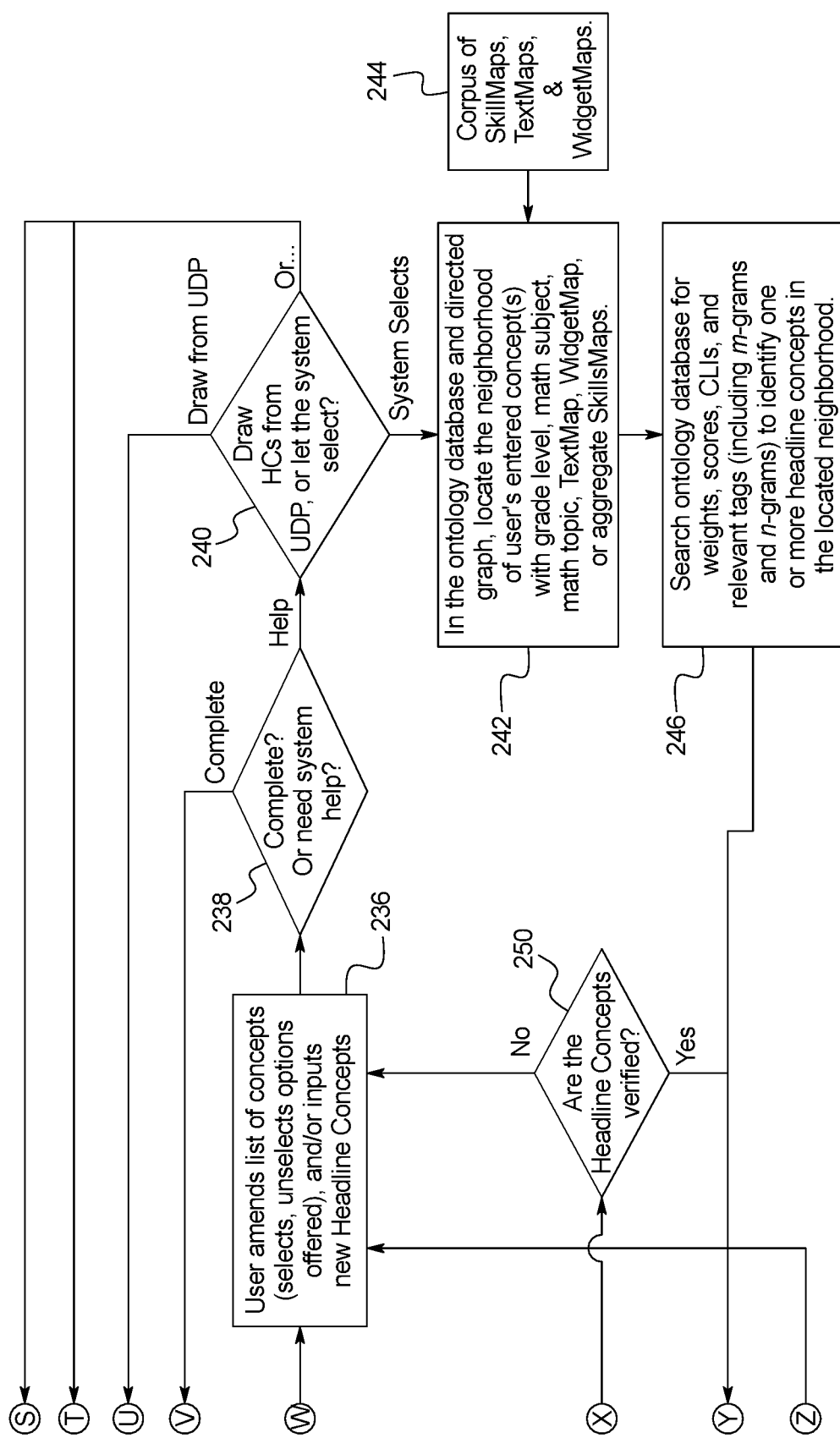
Figure 3A:
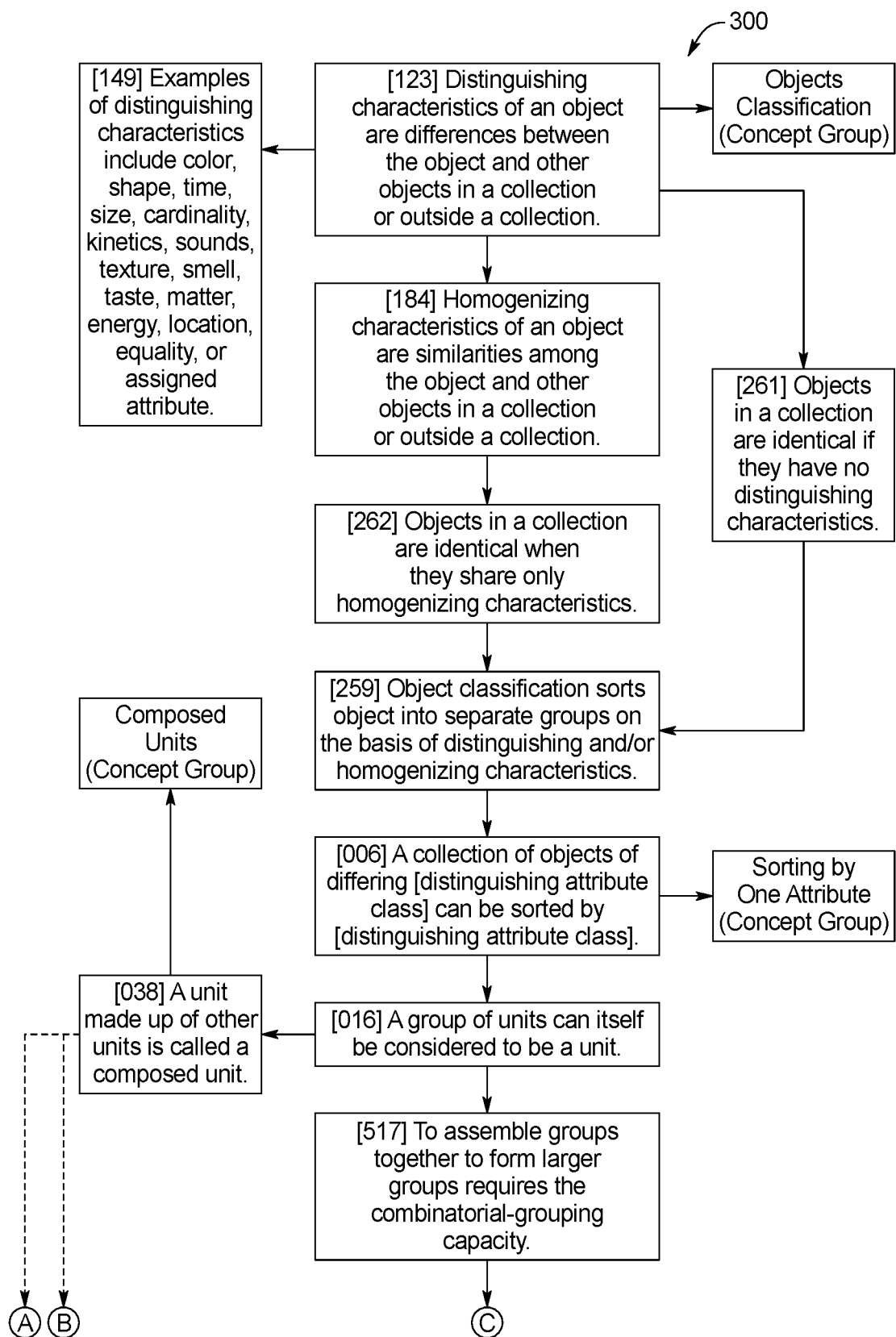
FIGS. 3A-3E are a block diagram representing a directed graph displaying concept line item relationships of prerequisites and dependencies.
Figure 3B:
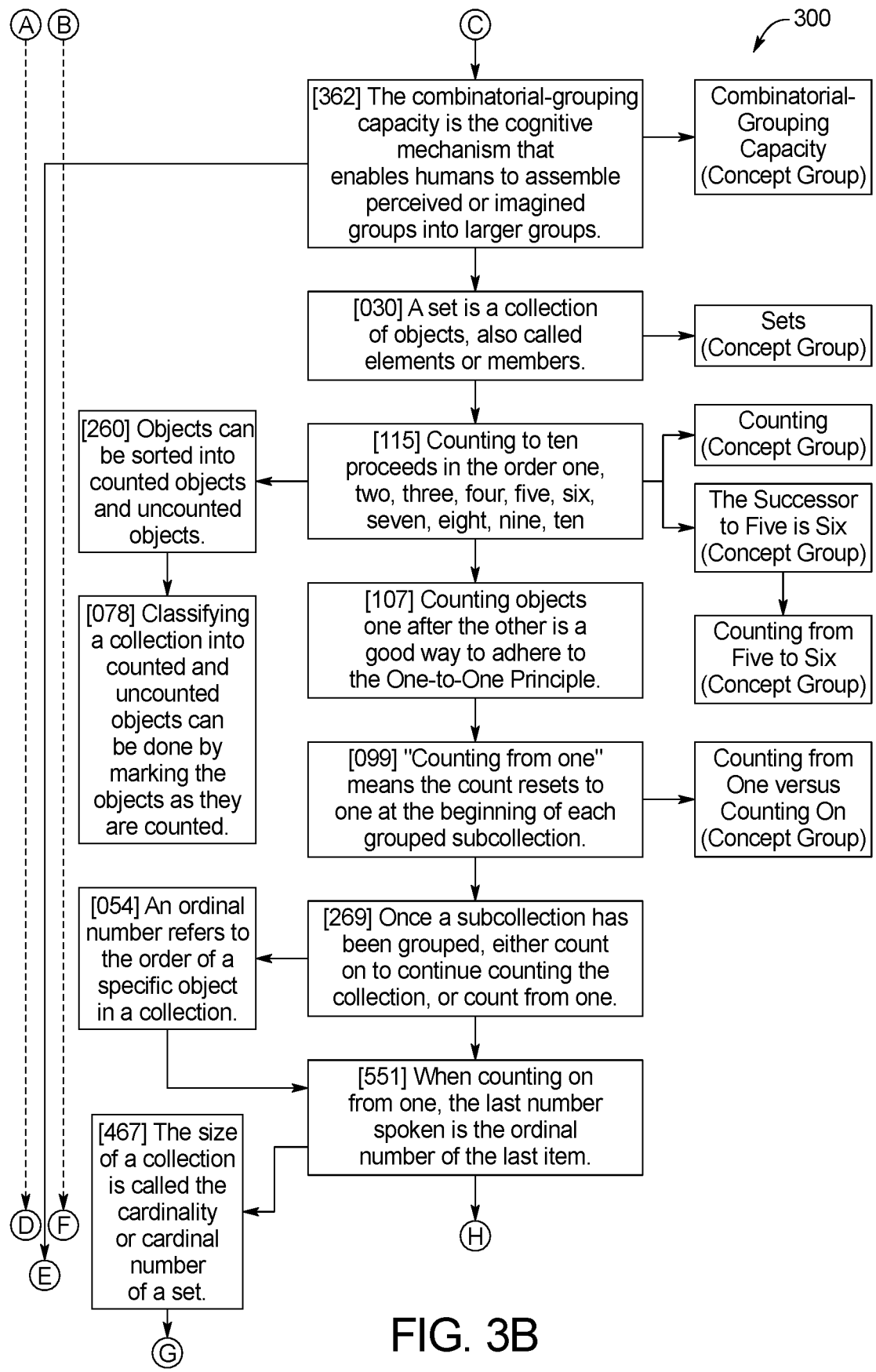
Figure 3C:
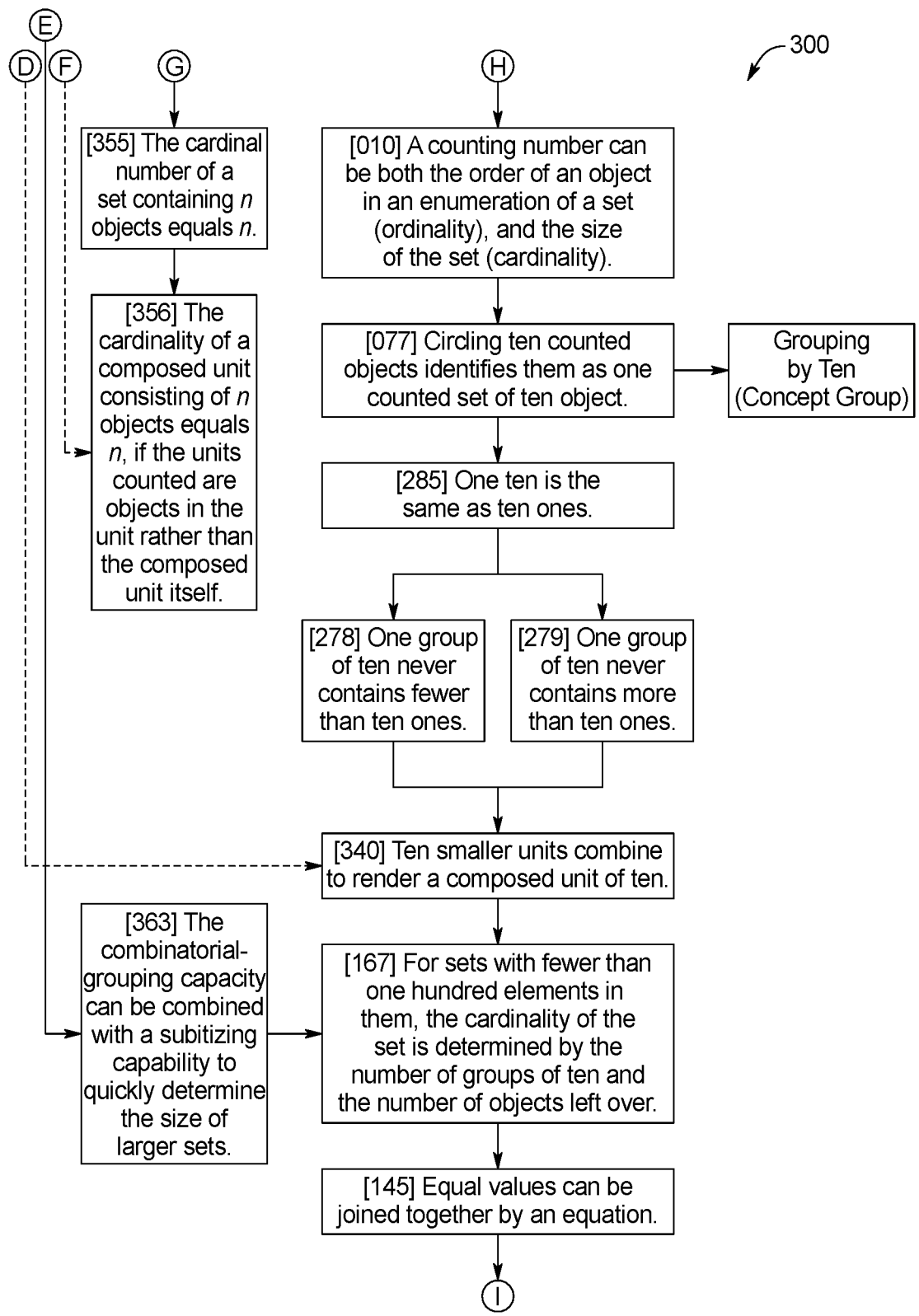
Figure 3D:
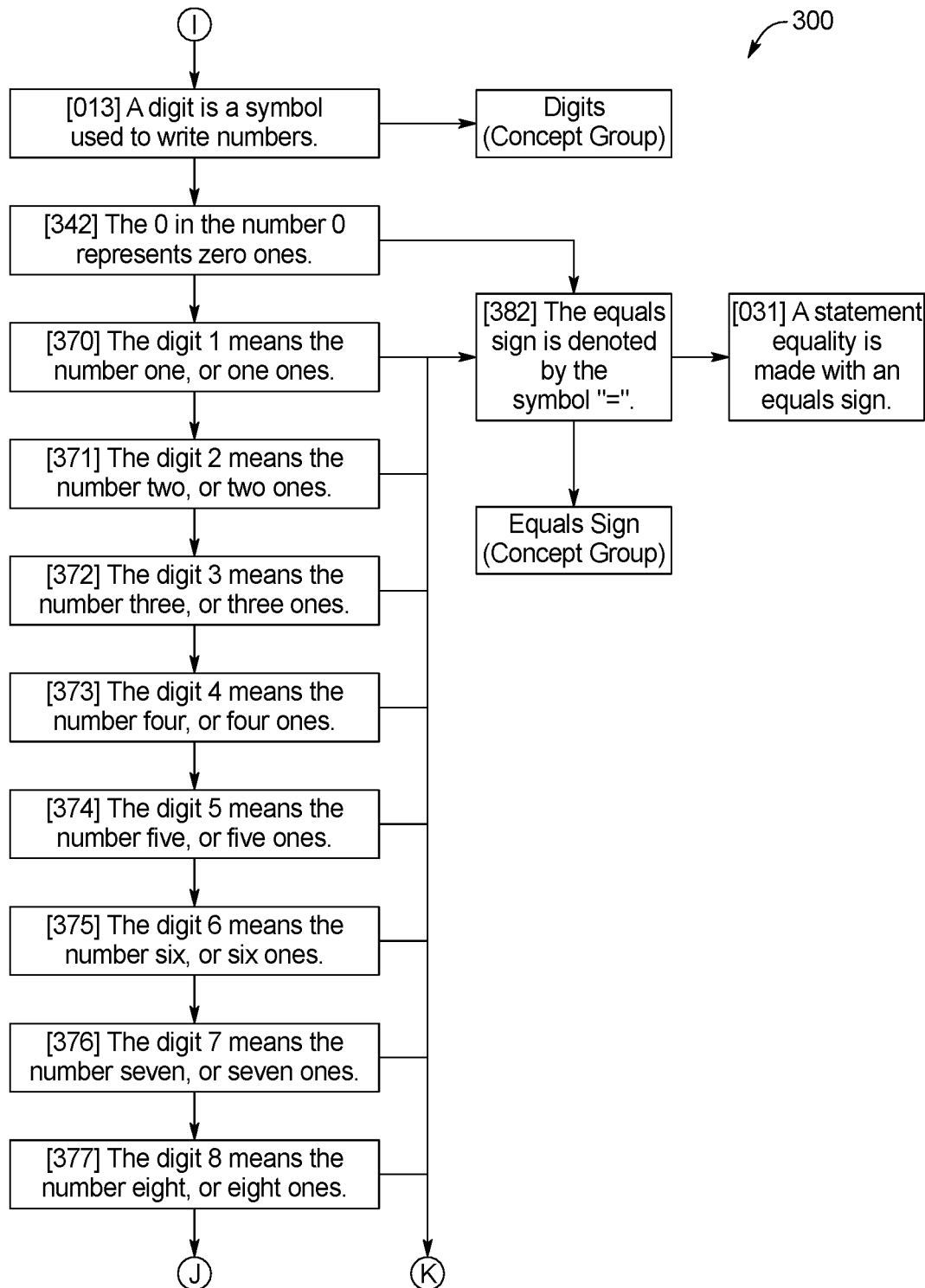
Figure 3E:
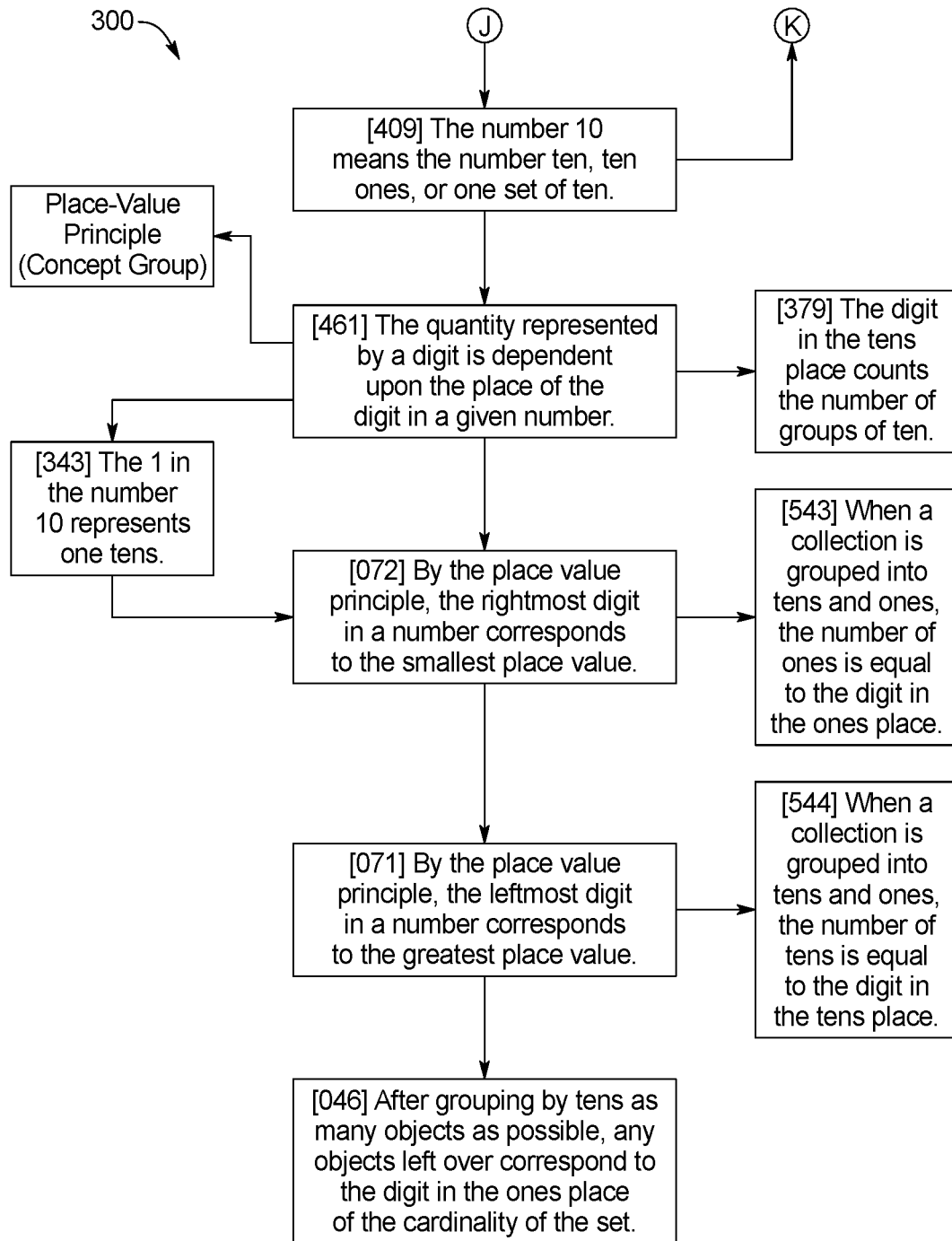

The systems and methods disclosed herein are described by way of the following examples. In one example, a system for automatically distilling concepts from math problems and dynamically constructing and testing the creation of math problems from a collection of math concepts includes: one or more databases storing two or more concept line items (CLIs), wherein each CLI is an expression of a mathematical concept, and a set of two or more defined interrelationships between the two or more CLIs, wherein the defined interrelationships include one or more of a prerequisite to another CLI, a dependency on another CLI, and a lack of relationship to another CLI; and a processor in communication with the one or more databases, the processor including memory storing computer executable instructions such that, when the instructions are executed by the processor, they cause the processor to perform the steps of: providing a user interface to a user through which the user interacts with the system; receiving as input one or more of: a math problem; one or more math concepts; and a user data packet (UDP), wherein a UDP is a collection of attributes, properties, and variables that describe a math skill set; extracting and compiling a concept cloud of one or more CLIs that comprise the mathematical concepts embodied in the input, describe the operation of the one or more math concepts, or relate to the UDP, respectively; generating one or more math problem building blocks from the concept cloud CLIs; applying a mathematical rules engine to the one or more math problem building blocks to build one or more additional math problems; and returning to the user, through the user interface, the one or more additional math problems built from the CLIs that define the concept cloud extracted from the input.

In some embodiments, in the step of extracting and compiling the concept cloud, the processor parses the input into a machine readable expression including one or more components, and selects one or more CLIs based on their relationship to the parsed components, and compiles a collection of CLIs dependent from each of the selected one or more CLIs.

In some embodiments the processor further compiles a collection of headline concepts from the one or more CLIs in the concept cloud.

In some embodiments the one or more databases store the set of two or more defined interrelationships between the two or more CLIs as a directed graph.

In some embodiments the input includes both: (i) the math problem or the one or more math concepts; and (ii) the UDP, further wherein the one or more math problems built from the CLIs that define the concept cloud extracted from the input are constrained in subject matter by the math problem or the one or more math concepts and the UDP.

In some embodiments the UDP is specifically related to the user. In other embodiments the UDP related to a group of users.

In some embodiments the step of generating one or more math problem building blocks from the concept cloud CLIs includes incorporating one or more building blocks from a preexisting ontology.

In some embodiments the step of applying a mathematical rules engine to the one or more math problem building blocks to build one or more additional math problems includes choosing a variable as a first building block.

In some embodiments the step of applying a mathematical rules engine to the one or more math problem building blocks to build one or more additional math problems includes adding one or more operators to the left, right, both sides, or neither side of the variable.

In some embodiments the step of applying a mathematical rules engine to the one or more math problem building blocks to build one or more additional math problems includes adding an expression including one or more of: one or more numbers; one or more variables; and one or more complex combinations of numbers, variables, and operators.

In some embodiments the step of applying a mathematical rules engine to the one or more math problem building blocks to build one or more additional math problems includes solving the one or more additional math problems and discarding those that are invalid.

In some embodiments the step of applying a mathematical rules engine to the one or more math problem building blocks to build one or more additional math problems includes solving the one or more additional math problems and discarding those that requires CLIs not included in the UDP.

In some embodiments when the instructions are executed by the processor, they cause the processor to further perform the steps of: receiving a math problem solution through the user interface; in response to receiving an incorrect solution, returning to the user, through the user interface, one or more additional math problems built from the CLIs that define the concept cloud of the math problem solution for which the incorrect solution was received; receive solutions to the one or more additional math problems built from the CLIs that define the concept cloud of the math problem solution for which the incorrect solution was received; and in response to any subsequent incorrect solution, returning to the user, through the user interface, one or more additional math problems built from the CLIs that define the concept cloud of the subsequent math problem for which an incorrect solution was received.

In some embodiments when the instructions are executed by the processor, they cause the processor to further perform the steps of: transmitting an alert regarding the incorrect solution; dynamically generating a customized study and practice program related to the incorrect solution; and updating the UDP with respect to the incorrect solution.

Example of System Architecture

FIG. 1 is an example of a system architecture 100 that may be employed by the systems and methods described herein. As shown in FIG. 1, users 102 interact with the system through various user interfaces 104. As shown, the users 102 may be teachers, parents, students, tutors, school administrators, application administrators, authors, curators, ontology administrators, publishers, etc. It is understood that the benefits provided by the systems and methods taught herein may be applicable to "students" and "teachers" in any context, whether in the field of education, businesses, personal development, etc. It is also important to note that the examples used throughout the present disclosure are based on an ontology of mathematics. However, this is merely one example of the subject matter to which the systems and methods can be applied. There is no limit to the range of subject matter that may benefit from the application of the systems and methods described herein.

For example, the system architecture 100 and methods embodied in its operation may be used to automatically distill concepts from chemistry problems and dynamically construct and test the creation of chemistry problems from a collection of chemistry concepts and further use branching algorithms to test and map a user's skills within the field of chemistry. In another example, the system architecture 100 and methods embodied in its operation may be used to automatically distill concepts from Pilates exercises and dynamically construct and test the creation of Pilates exercise routines from a collection of Pilates concepts and further use branching algorithms to test and map a user's skills within the field of Pilates. For example, a Pilates student may struggle to execute a given exercise to the instructor's satisfaction. The systems and methods may be employed to receive a given Pilates exercise as input, distill the movement concepts embodied in the exercise (e.g., which muscles are engaged, type of movement, etc.), dynamically construct additional exercises that embody the movement concepts from the exercise, and test and map the user's skill over a range of exercises and movement concepts. As shown, the systems and methods taught herein may be applied to any field in which an ontology of skills may be established and mapped in a directed graph of prerequisites and dependencies or similar directional relationships.

The user interfaces 104 shown in FIG. 1 are the portals through which the users 102 interact with and direct the operation of the system architecture 100 to accomplish the functions of the systems and methods described herein. In a primary embodiment of the system architecture 100, each user interface 104 is a graphical user interface (GUI) provided through a computing device, such as a personal computer, a smartphone, a tablet computer, or another mobile device.

In the example shown in FIG. 1, there are a number of distinct user interfaces 104. For example, moving clockwise from the upper left portion of the figure, there is: a user interface 104 through which one or more users 102 (e.g., application administrators) to interact with a user admin application 130; a user interface 104 through which the one or more users 102 (e.g., teachers, parents, students, tutors, schools) interact with a processor 106 through one or more services applications 108 and one or more security and multi-tenancy applications 110; one or more third-party user interfaces through which one or more users 102 (e.g., teachers, parents, students, tutors, schools) interact with the processor 106 through one or more services applications 108 and one or more security, multi-tenancy applications, remote order entry systems, and role-based access controls 110; a user interface 104 through which one or more users (e.g., authors, curators, teachers, publishers) interact with a content editor 126; a user interface 104 through which one or more users (e.g., ontology administrators) interact with an administration tool 120; and a user interface 104 through which one or more users (e.g., authors and curators) interact with an ontology editor system (OES) 132. While shown as multiple distinct user interfaces 104 in FIG. 1, it is understood that the various user interfaces 104 may be embodied in a greater or lesser number of individual user interfaces 104.

In the example shown, the central "brain" of the system architecture 100 is the processor 106. In the example shown in FIG. 1, the processor 106 is described as including a query generator 106a that embodies the central logic, a cache 106b, and a query scheduler 106c. The operation and functions of the processor 106 is known by those skilled in the art and primarily includes the execution of software program instructions loaded into the processor to perform the features and functions of the systems and methods described herein. In a primary example, the processor 106 is embodied in a central network server or a collection of network servers and the cache 106b is the memory into which the processor 106 stores executable application instructions and from which the processor 106 executes those instructions to perform the functions described herein.

As further shown in FIG. 1, an ontology database 112 stores data related to the ontology. In the primary example provided herein, the ontology data includes the CLIs, the dependency and prerequisite relationships between CLIs, and all related metadata. The processor 106 communicates with the ontology database 112 through a query manager traversal engine 114. The ontology database 112 is additionally populated with data through the OES 132 and a metadata engine 116 that communicates metadata related to the information received through the administration tool 120.

Similarly, the system architecture 100 shown in FIG. 1 includes a content database 122 that stores additional content related to the systems and methods described herein, including a corpus of models, UDPs, previously generated math problems, SkillsMaps, TextMaps, WidgetMaps, and other documents described herein. As shown, the processor 106 communicates with the content database 122 through a content manager retrieval system 124. The content database 122 is additionally populated with data through the content editor 126. Such content may come through the content editor 126 by way of users 102 such as authors, curators, teachers, and publishers.

The system architecture shown in FIG. 1 further includes a learner history relational database management system 132 and data access layer 134 through which access to the database may be provided to any one or more of the user interfaces 104.

Although FIG. 1 is used as the primary example of a system architecture 100 assembled to accomplish the objects and advantages of the systems and methods described herein, it is understood that the system architecture 100 may take numerous alternative forms. For example, while shown as separate databases, the ontology database 112 and content database 122 may be embodied in any greater or lesser number of databases as will be appreciated by those skilled in the art.

As described, a processor 106 controls aspects of the system architecture 100 described herein. The processor 106 may be interchangeably referred to as a controller 106. The processor 106 may be embodied in one or more controllers 106 that are adapted run a variety of application programs, access and store data, including accessing and storing data in the associated databases (which may be embodied in one or more databases), and enable one or more interactions with the other components of the systems and methods described herein.

Typically, the one or more controllers 106 are embodied in one or more programmable data processing devices. The hardware elements, operating systems, and programming languages of such devices are conventional in nature.

For example, the one or more controllers 106 may be a PC-based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the one or more controllers 106 and data for processing in accord with the executed instructions.

The one or more controllers 106 may also include one or more input/output interfaces for communications with one or more processing systems. As shown, one or more such interfaces may enable communications via a network, e.g., to enable sending and receiving instructions electronically. The communication links may be wired or wireless.

The one or more controllers 106 may further include appropriate input/output ports for interconnection with one or more output displays and one or more input mechanisms serving as one or more user interfaces for the controller 106. For example, the one or more controllers 106 may include a graphics subsystem to drive the digital display panels. The links of the peripherals to the system may be wired connections or use wireless communications.

Although summarized above as a PC-type implementation, those skilled in the art recognize that the one or more controllers 106 also encompasses systems such as host computers, servers, workstations, network terminals, and the like. In fact, the use of the term controller 106 is intended to represent a broad category of components that are well known in the art.

Aspects of the systems and methods provided herein encompass hardware and software for controlling the relevant functions. Software may take the form of code or executable instructions that when loaded onto a controller 106 and executed by the controller 106 cause the controller to perform the relevant steps, where the code or instructions are carried by or otherwise embodied in a medium readable by the controller 106. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

The operation of the system architecture 100 shown in FIG. 1 enables the functionality described below with respect to FIGS. 2-6.

Example of CCE/CCR Module Process

FIG. 2 illustrates an example of a process embodying the concept cloud extraction module and the concept cloud reconstruction module (process 200). In the example shown, the process 200 starts with the CCE module, which is embodied in steps 202a-230. In this example, the CCR module is embodied in steps 230-288.

As shown in FIG. 2, input to the CCE module is received through a user interface 104. Input may be in the form of: a user 102 entering a math problem via step 202a; a user 102 entering math concepts with grade level, keywords, textbook or book, section or topic, and/or named widget via step 202b; or a user data packet (UDP) via step 202c. As shown, each one of these initial input steps leads to a unique branched portion of the process 200 until they meet at step 230.

Turning first to the portion of the process 200 that flows from step 202a, in step 204, the user's step-by-step solution (graded or not) to the problem may be entered. Once the math problem is entered via step 202a and, optionally, the solution is entered via step 204, the input is translated into either LaTex, via step 206a, or MathML, via step 206b. It is understood that any suitable mathematical markup language or suitable computer readable format may be used.

In step 208, the machine readable problem and solution enter the math parser. In the example shown, there are two paths branching from the math parser; the first is step 210, in which the CCE algorithms search the ontology database for CLIs and/or m-gram and/or n-gram tags.

An alternate approach is shown in step 212, in which the math expressions are transformed into a hierarchical description, e.g., an expression tree, in Polish Notation, or in Reverse Polish Notation. Then, in step 214, the module begins at the highest level of the hierarchical description and moves from the top to the bottom, checking all of the CLIs to determine whether their coded instructions, patterns, or templates match the hierarchical description being checked. As shown in step 216, the module determines whether there is a match and, if not, cycles back to step 214. If there is a match, the module proceeds to step 220.

As shown in FIG. 2, whether progressing through step 212 or step 214, the module receives the ontology of CLIs with tags and scores, as shown in step 218.

For each match identified in step 212 or 214, the matched CLI(s) are added to the concept cloud being compiled in step 220. Next, in step 222, the selected CLIs are sorted by their relevant attributes, properties, and variables to identify the headline concept(s). Then, in step 224, the selected CLIs are ordered by their headline concepts. In step 226, the module locates the headline concepts on the directed graph of the ontology ordered by antecedents and postcedents and selects all of the CLIs on path(s) of node-edge connections between the headline concepts and the base of the ontology. Next, in step 228, the module displays the extracted concept cloud, in order of antecedents and postcedents, in interactive tabular and graphic format, with relevant regions and neighborhoods highlighted, including any related segment of the spine of the ontology. The next step in the process 200 is step 230, in which the CCR module receives, as input, the output of the CCE module, as described further herein.

Turning next to the portion of the process 200 that flows from step 202*b* in which the user 102 enters math concepts with grade level, keywords, textbook or book, section or topic, and/or named widget, in step 232 the user 102 identifies which of the entered concepts are desired to be headline concepts. In step 234, the module determines whether any of the entered concepts are in fact headline concepts. If not, the user 102 amends the list of concepts, e.g., selects or unselects the options offered and/or inputs new headline concepts, via step 236. In step 238, the module verifies whether or not the list of headline concepts is complete or whether the user 102 needs help. If complete, the module loops back to step 234. If the user 102 needs help, the module presents the user 102 with the options of restarting the process 200, drawing headline concepts from an associated UDP, or to letting the system select the headline concepts. If the user 102 chooses to restart the process 200, the module loops back to step 202*a*, 202*b*, or 202*c*. If the user 102 chooses to draw the headline concepts from a UDP, the module moves to step 256, discussed further herein. If the user 102 chooses to let the system select the headline concepts, the module moves to step 242. In step 242, the module locates, in the ontology database and directed graph, the neighborhood of the user's entered concept(s) with grade level, math subject, math topic, TextMap, WidgetMap, or aggregate SkillsMaps. As shown, in step 244, the module receives the corpus of SkillsMaps, TextMaps, and WidgetMaps from the system architecture 100 shown in FIG. 1 to be used in step 242.

After the completion of step 242, In step 246, the module searches the ontology database for weights, scores, CLIs, and relevant tags (including m-grams and n-grams) to identify one or more headline concepts in the located neighborhood. The module then proceeds to step 252.

Returning to the analysis in step 234, if one or more of the concepts identified in step 232 are headline concepts, the module verifies the headline concepts by searching the ontology database for n-grams, attributes, properties, and any variables to Identify the CLIs in step 248. In doing so, the module receives the ontology of CLIs with tags and scores, as shown in step 218. As shown in step 250, if all of the headline concepts are verified, then the module locates the headline concepts in the directed graph and extracts all of the nodes that are connected in a node-edge path from the headline concepts down to the most basic elements of the ontology in step 252. Then, the module displays the extracted concept cloud, in order of antecedents and postcedents, in interactive tabular and graphic format with relevant regions and neighborhoods highlighted in step 254. In step 254, the output is distinguished between headline concept based output and output driven by the UDP. The output Includes any related segments of the spine of the ontology.

The next step in the process 200 is step 230, in which the CCR module receives, as input, the output of the CCE module, as described further herein.

Turning next to the portion of the process 200 that flows from step 202*c* in which a UDP is the input received through the user interface 104, in step 256, the user 102 sets process objective, e.g., headline concepts from one or more UDP segments, concept cloud topic or subject (without the relevant skills), latest achievement(s), areas to practice, next steps, gaps or skill set, etc. In response, in step 258, the module gathers metrics that describe the user's(s') current status, next steps in development, and objectives for development. Then, in step 260, CCE algorithms search the ontology database for CLIs, stored problems and/or concept clouds from previous work to locate and deliver headline concepts. In doing so, the module receives the ontology of CLIs with tags and scores, as shown in step 218.

Then, in step 262, based on user's(s') UDP, the module recommends areas to improve, expand, or extend the user's math skill set(s). Next, in step 264, the module sorts the selected CLIs by their relevant attributes, properties, and variables to identify the headline concept(s). In step 266, the module orders the selected CLIs by headline concepts given input from the UDP. Then, in step 268, the module locates the headline concepts on the directed graph of the ontology ordered by antecedents and postcedents and select all of the CLIs on path(s) of node-edge connections between the headline concepts and the base of the ontology. In step 270, the module displays one or more extracted concept cloud(s), customized to the bounds and objectives of the UDP, as a subset(s) of a SkillsMap (or a concept cloud class-specific SkillsMap) ordered by antecedents and postcedents, in interactive tabular and graphic format with relevant regions and neighborhoods highlighted, including any related segments of the spine of the ontology.

The next step in the process 200 is step 230, in which the CCR module receives, as input, the output of the CCE module, as described next.

In step 272, the CCR module checks the instructions tagged to each CLI in the concept cloud, beginning with the headline concept(s) and progresses down the concept cloud. In step 274, the module generates building blocks from the basic CLI instructions. Next, in step 276, the module checks for applicable attributes and properties of user's(s') skillsets, e.g., bounds, limitations, and ranges. In step 278, the module applies a mathematical rules engine to the treatment of CLI instructions, building blocks, and UDP attributes. The module then builds proto-problems based on CLI-instructions, generated building blocks, UDP attributes, and mathematics rules in step 280.

In step 282, the module determines whether there are enough problems to proceed. If not, the module returns to step 272. If so, the module proceeds to step 284, in which the module examines and solves each proto-problem, step 286, in which the module removes from the set those proto-problems that are not valid, and, in step 288, the CCR module returns to the user 102 a set of valid problems built from the concept clouds extracted by the CCE module. As shown, the returned set may include the original problem.

Example of a Directed Graph of CLIs

From extraction of a single problem written for Kindergarten, an analyst distilled 549 unique concept line items. FIGS. 3A-3F illustrate a directed graph that comprises a subset of the 549 CLIs.

From extraction of a single solution to a single problem of Pre-Algebra, analysts distilled about 730 unique concept line items. In experimentations with problems of trigonometry, the typical extraction produced some 3,000 concept line items. To manually array CLI data from the Pre-Algebra problem into a directed graph, and to create a node-edge incidence matrix to store those data relationships, squares the number of cells to be filled with data. Storage of concept line items extracted from the Pre-Algebra problem calls for a node-edge incidence matrix with $730^2=532,900$ cells. By the time a student reaches Algebra 1, estimates suggest that support of her math skill set can require 50,000 or more concept line items; $50,000^2=2,500,000,000$. That is two billion five hundred million cells in a node-edge incidence matrix populated with data that store some numeric description of an attribute of the relationship between pairs of concept line items. Clearly, the system architecture 100 must include a processor 106, extensive database storage, and its analysis capabilities are essential to accomplishing the goals of the present disclosure.

Example of Branching Algorithm

Figure 4A:
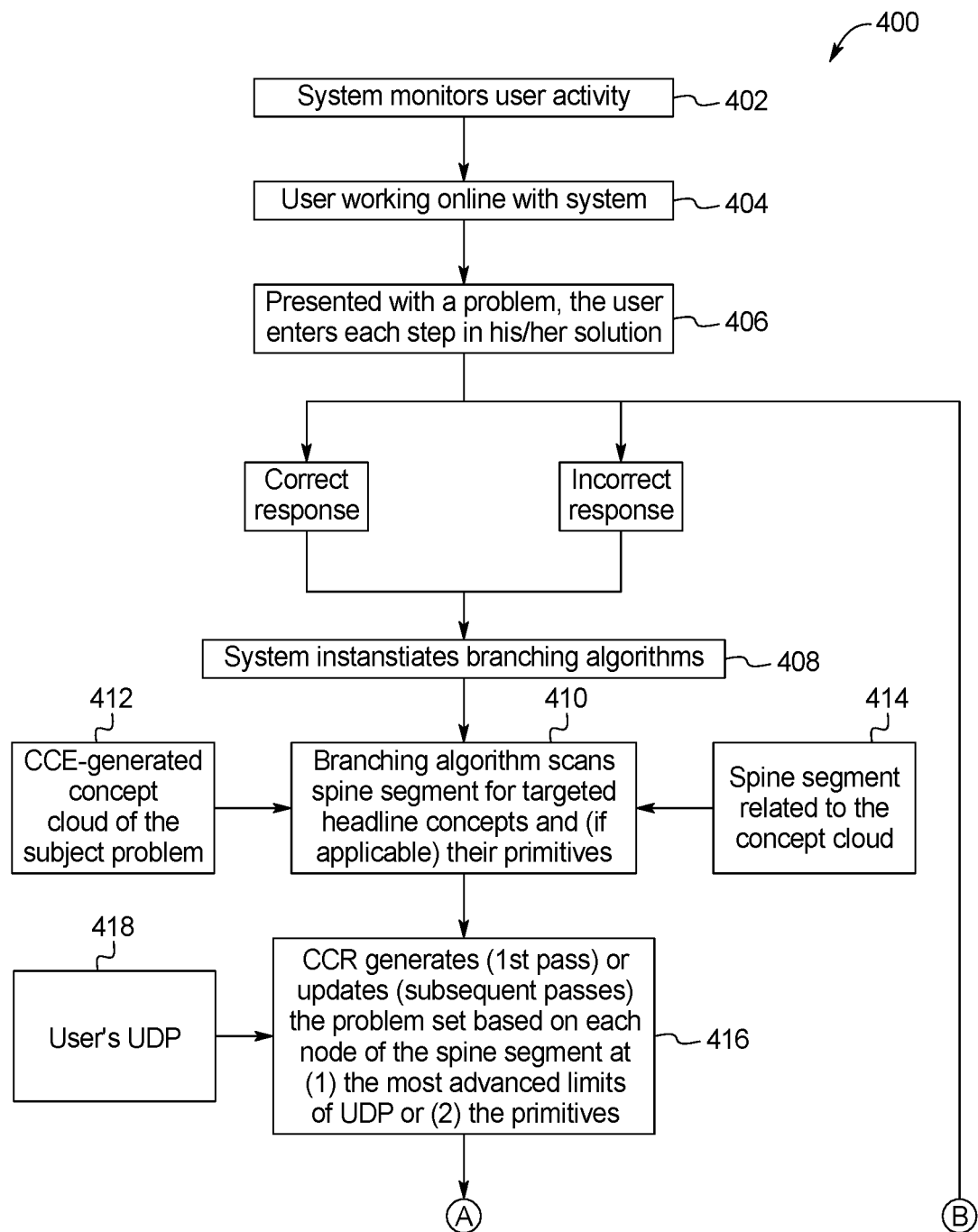
FIGS. 4A-4B are a flow chart representing a process embodying a branching algorithm.
Figure 4B:
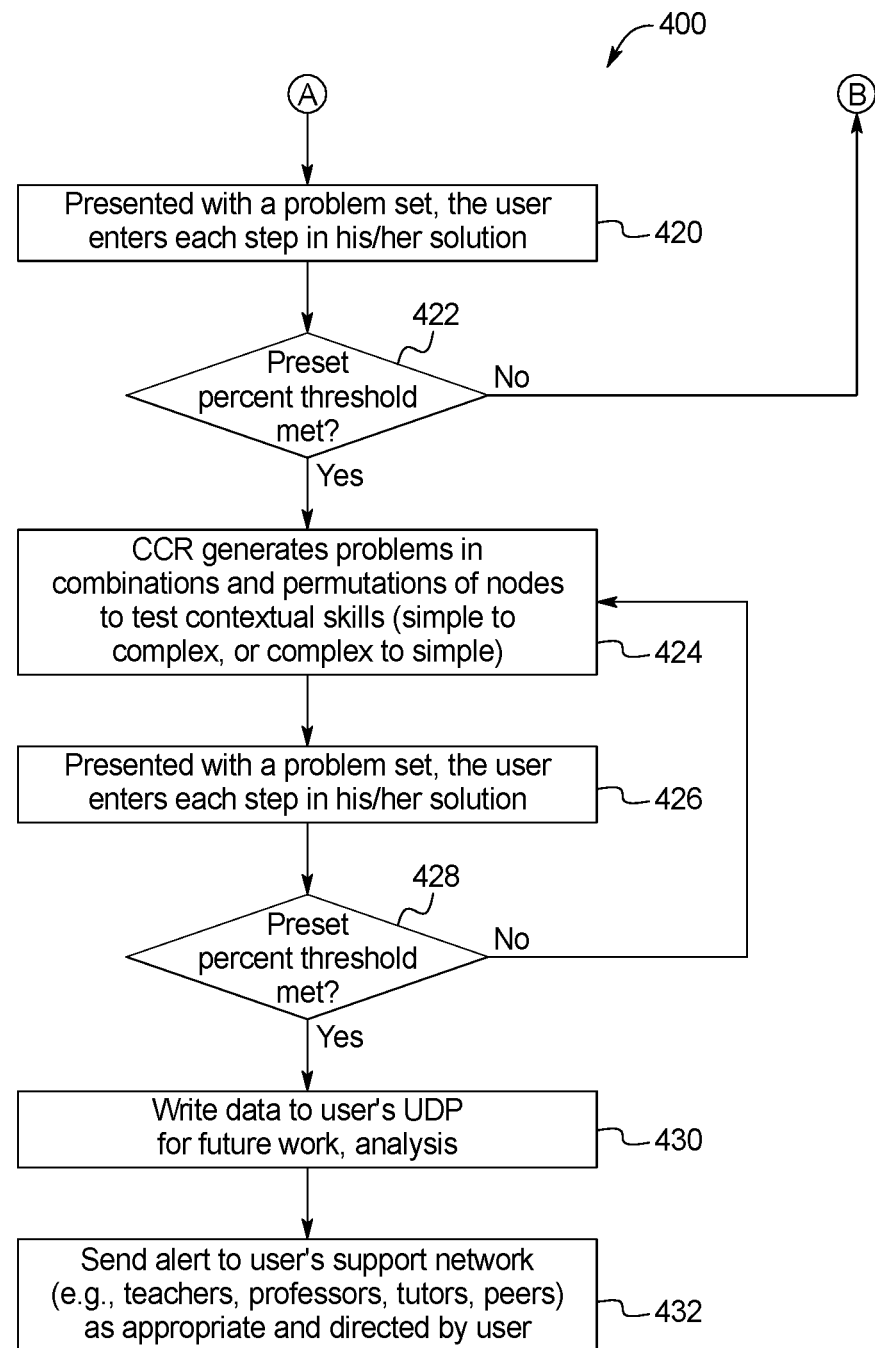

FIGS. 4A-4B illustrate an example of a branching algorithm process 400. As shown in FIG. 4A, the process 400 begins with step 402 in which the system monitors user activity with respect to the user's interactions with the system architecture 100. In step 404, the branching algorithm module identifies the user 102 is working online with the system, particularly with respect to solving problems presented to the user 102. As the user 102 works with the system, the user 102 is presented with a problem and the user 102 enters each step in his/her solution to the problem via step 406. The user may enter correct responses or incorrect responses which feed into step 408, in which the branching algorithm module instantiates the branching algorithms.

Once initiated, the next step 410 of the branching algorithm process 400 calls for the system to scan a spine segment for targeted headline concepts and (if applicable) their primitives. Step 410 is fed information not only from step 408, but also from two other steps 412 and 414. Step 412 calls for a CCE-generated concept cloud of the subject problem to be passed to the branching algorithm module, while step 414 calls for a spine segment related to the concept cloud be passed along as well. From step 410, the next step of the branching algorithm process 400, step 416, is where the CCR generates (1st pass) or updates (subsequent pass or passes) a problem set based on each node of the spine segment at either the most advanced limits of UDP or the primitives. As shown, step 416 is also fed the user's UDP via step 418.

Step 416 flows into step 420 shown on FIG. 4B. In step 420, the branching algorithm module presents the user 102 a problem set (generated in step 416) and the user 102 then enters each step in his/her solution to the problem set. After the user 102 enters the solution, the branching algorithm module determines whether the preset percent threshold has been met in step 422. If it has not, the branching algorithm process 400 loops back to step 408 and the branching algorithm process 400 repeats until the threshold is met by the user 102. When the threshold has been met, the CCR module then generates problems in combinations and permutations of nodes to test contextual skills (simple to complex, complex to simple) in step 424. The problems are then presented as a problem set with the user 102 entering each step in his or her solution in step 426. Then at step 428, the branching algorithm process 400 again determines if a preset percent threshold has been met. If the threshold has not been met, the branching algorithm process 400 loops back to step 424 and repeats until the threshold is met. When the threshold is met, step 430 calls for data to be written to the user's UDP for future work and/or analysis and, at a final step 432, for an alert to be sent to a user's support network (e.g., teachers, professors, tutors, peers) as appropriate and/or directed by the user.

Alternative Example of CCE/CCR Module Process

Figure 5A:
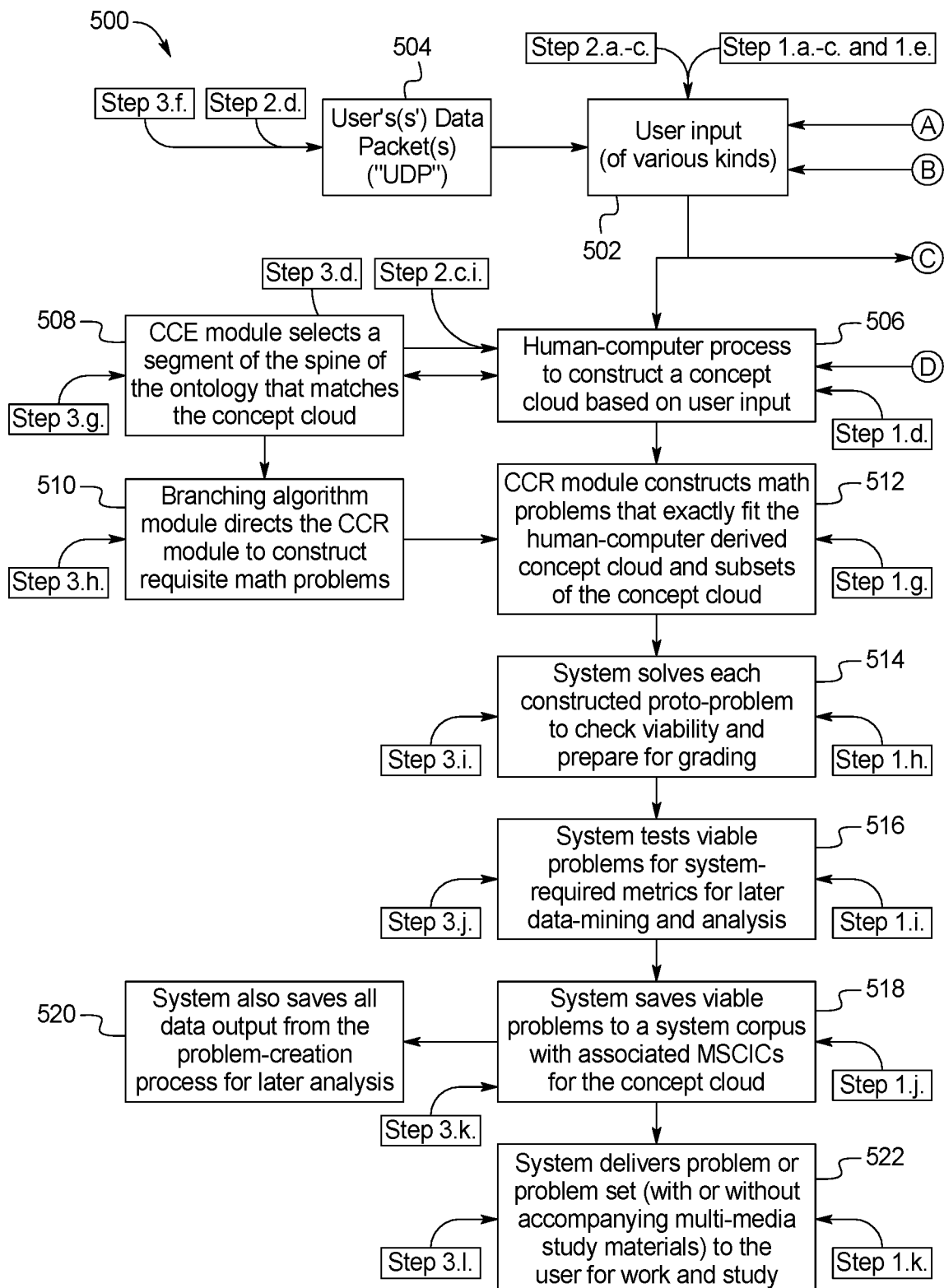
FIGS. 5A-5B are a flow chart representing an alternative process embodying the concept cloud extraction module and the concept cloud reconstruction module.
Figure 5B:
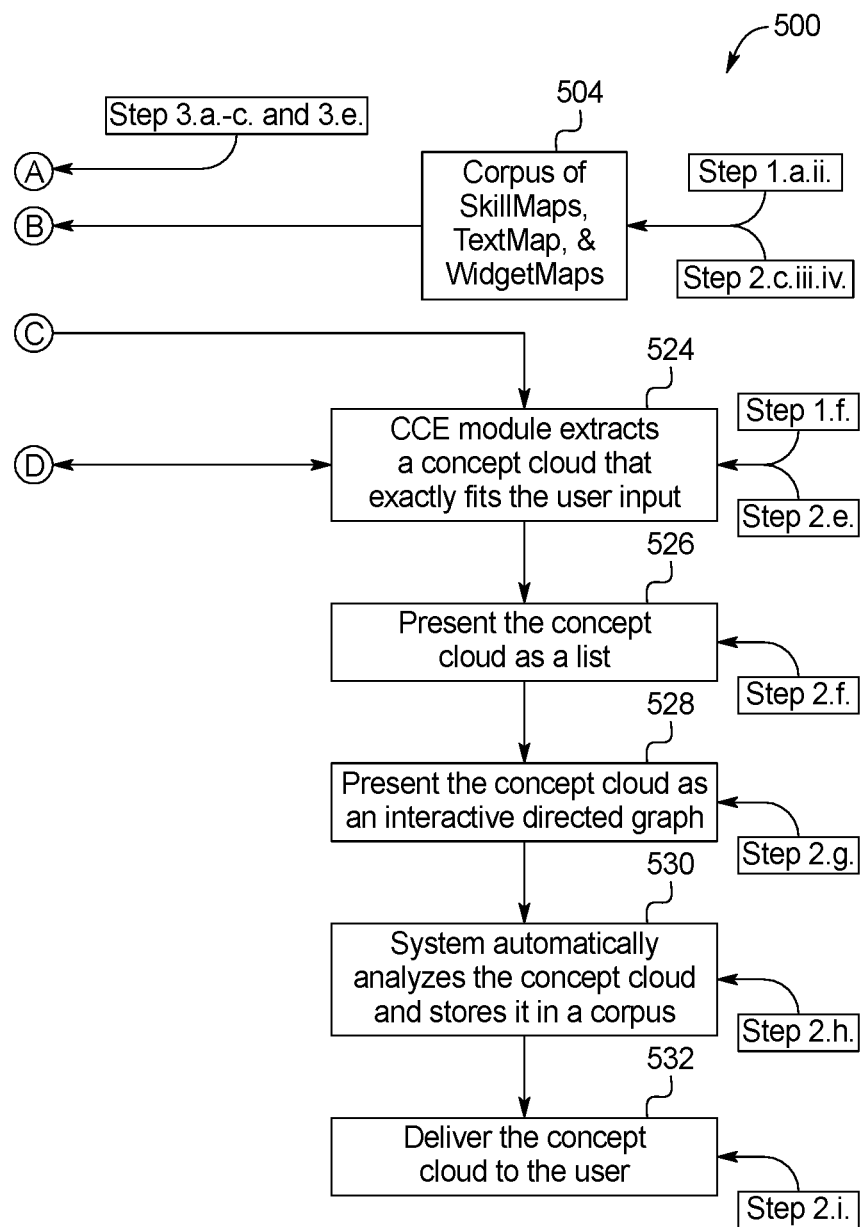

FIGS. 5A-5B illustrate a flow chart representing an alternative process 500 embodying the concept cloud extraction module and the concept cloud reconstruction module. As shown in FIG. 5A, the process 500 begins with step 502, in which inputs of various kinds are received from one or more users 102. Such inputs can further include user's(s') data packet(s), received in step 504, and/or a corpus of Skillmaps, Textmap, and Widgetmap received in step 505. From these inputs, there are two branches to the process 500, step 506 discussed here and step 524 discussed below.

Step 506 involves a human-computer process to construct a concept cloud based on user input. The step of constructing the concept cloud in step 506 may include trading information back and forth with a CCE module that selects a segment of the spine of the ontology that matches the concept cloud in step 508. The step of constructing the concept cloud in step 506 may also include receiving data from step 524 (discussed below). Step 508 then feeds into step 510, which calls for a branching algorithm module to direct the CCR module to construct requisite math problems. Steps 510 and 506 each lead to step 512, in which the CCR module constructs math problems that exactly fit the human-computer derived concept cloud and subsets of the concept cloud.

Once the problems are constructed, the process 500 then calls for the system to solve each constructed proto-problem to check viability and prepare for grading as step 514. Step 514 leads to step 516, in which the system tests viable problems for the system-required metrics for later data-mining and analysis. After this step, the system then saves viable problems to a system corpus with associated MSCICs for the concept cloud in step 518 and also saves all data output from the problem-creation process for later analysis in step 520. The system then delivers a problem or problem set (with or without accompanying multi-media study materials) to the user 102 for work or study as step 522.

As mentioned above, step 502 may also lead into step 524 which is shown in FIG. 5B. In step 524 the CCE module extracts a concept cloud that exactly fits the user input. The concept cloud extracted at step 524 may be passed back to step 506 (discussed above) and/or passed on to step 526, in which the concept cloud is presented as a list. The concept cloud is then presented as an interactive directed graph in step 528, with the system automatically analyzing the concept cloud and storing it in a corpus at step 530. The concept cloud is then delivered to the user in step 532.

FIGS. 5A-5B are also marked to correspond to the steps outlined in the process below. Viewing FIGS. 5A-5B in light of the process 500 described above and the outlined process flow below may provide a greater understanding of the systems and methods described herein.

Step 1. If the input is:
  a. user input, such as:
    i. a checklist of concepts or features to be included in the math problem (see 1.d. below);
    ii. an indication of the textbook, unit, chapter, and section being studied;
    iii. a targeted math topic; and/or
    iv. one or several keywords;
  b. detailed online data about a user's development, e.g., from his/her UDP;

c. graded test question from a diagnostic exam (whether system-originated or manually entered from a hard copy test);
d. human-computer constructed concept cloud (human directed—e.g., from 1.a.i. above—with computer-assisted completion of the concept cloud); or
e. human-selected math problem;
then:
f. distill a concept cloud from the input (unless already performed in a previous step); and
g. construct math problems that exactly fit the concept cloud and subsets of the concept cloud from user input;
h. solve each constructed problem so that it is prepared for binary grading (correct/not correct);
i. test the problem for system-required metrics for later data-mining and analysis;
j. save the problem to a system corpus with associated MSCICs for the concept cloud; and
k. deliver the problem or problem set to the user (without the answer(s)).

Step 2. If the input is:
a. graded test questions from a diagnostic exam that has applied branching algorithms;
b. human-selected math problems; or
c. user input, such as:
  i. a human-computer compiled concept cloud;
  ii. an indication of the textbook, unit, chapter, and section being studied;
  iii. mathematical description of an object;
  iv. an electronic copy of a book, textbook, or other written document;
  v. a checklist of concepts or features to be included in a math problem;
  vi. a targeted math topic; and/or
  vii. one or several keywords; perhaps with
d. assess user data packet (or "UDP") (if not already performed) to determine user(s) needs with respect to the necessary problem or problem set (which may be represented by a concept cloud and which can be generated by the CCR module) so that the output is customized to the user's math skills or expected math skills (in the event that the UDP is an example of what is required, e.g., a mock UDP; in the event that the system does not have a user data packet (UDP) in the system's database for the intended user(s) of the output, the system may offer a template for the user to fill out, prior to the system generating the requested output);
then:
e. distill a concept cloud that exactly fits the user input;
f. present the concept cloud as a list;
g. present the concept cloud in a roots-and-branches (tree) configuration;
h. automatically analyze it and store it in a corpus; and
i. deliver the concept cloud to the user.

Step 3. Receive input as to what kind of math problem is required by the user, as indicated either by:
a. user input, such as:
  i. a checklist of concepts or features to be included in the math problem (see 1.d. below);
  ii. an indication of the textbook, unit, chapter, and section being studied;
  iii. a WidgetMap, MediaMap, or TextMap;
  iv. a targeted math topic; or
  v. one or several keywords;
b. stored data about a user's development, e.g., from his/her UDP;
c. graded test question from a diagnostic exam (whether system-originated or manually entered from a hard copy test);
d. human-computer constructed concept cloud (human directed—e.g., from 3.a.i. above—with computer-assisted completion of the concept cloud);
e. human-selected math problem; and, optionally,
f. detailed online data about the user's development alone or in concert with one or more items from a. through e. preceding;
then, from:
g. a computer-selected segment of the spine of the ontology;
h. direct the CCR module to construct requisite math problems;
i. solve each constructed problem so that it is prepared for binary grading (correct/not correct);
j. test the problem for system-required metrics for later data-mining and analysis;
k. save the problem to a system corpus with associated MSCICs for the concept cloud; and
l. deliver the problem or problem set to the user (without the answer(s)).

Example of Integration Method

The key link between concept line items that comprise the ontology and the system (CCE/CCR) operations is conversion of linguistic CLIs into machine-readable code and an overarching logic that defines the rules of construction of math problems. Since computers cannot derive meaning from textual data, an ontology of mathematics is not operational until the OES, and the math analysts and data engineers who work with the OES, prepare the CLIs that describe mathematical functions such that the CLIs support and enable the operations required by the systems and methods as described herein.

In one contemplated embodiment, the concept line items of the ontology are written such that their mathematical functions and operators are expressed as verbs, and the objects acted upon by functions and operators are expressed as nouns. This structure enables data engineers and system developers to leverage the generic architecture to parse CLIs to assign part-of-speech labels, construct CLI-specific UDPs with instructions as to how each CLI interacts with system algorithms, and search the ontology for functions, operators, and objects.

FIG. 6 provides examples of addition that include integers, real numbers, imaginary numbers, and irrational numbers. One example demonstrates partial addition of two polynomials (addition of the leftmost monomials). These examples illustrate a method of translating concept line items into functions for computer code. Each example is presumed to be proceeded by a CLI or concept cloud.

A basic form for the function based on nouns as objects and verbs as functions: system response=function–call (argument1, argument2, argument3, . . . argument n.). In this example, the function is the verb and the parenthetical arguments are the nouns.

The basic form cited in the examples shown in FIG. 6 support objects with class inheritance: types of numbers (integer, real, imaginary, irrational), types of operators (binary, unary, tertiary), functions to apply each (recursive PEMDAS, for example), and equation orientation (vertical or horizontal). When one function is significantly different in the operation of a class (i.e., adding integers vs. adding polynomials), the system requires the implementation of a new function (one configured for that class, e.g., addition for integers vs. addition for polynomials). However, it is contemplated that the system is able to reuse the same function across a number of operations when the expression to be returned is suitably similar (e.g., 2+4, 29+42, 675+929) to another operation. Also, per these examples, established classes of objects can be used across operations. For example, the same real number can be used to for adding and in real multiplication. There are economies of scale that are realized in development of the OES, and systems and methods that embed and output the OES.

The examples shown in FIG. 6 also suggest at least two ways to distill concept clouds from algorithmic expressions. The first is to include sample algebraic LaTex or MathML expressions in CLI instructions (CLI instructions are the properties, attributes, variables, and templates that describe a CLI and how the CLI interacts with the system's logic.). To parse an algorithmic expression into a set of concept line items that formulate that expression's unique concept cloud is a search-and-match operation: once the functions (verbs), operations, and arguments (nouns), and other properties, variables, attributes, of the of the templates of the subject math expression have been expressed in terms of LaTex or MathML, then the CCE module searches its database for CLI instructions that match those functions, operators, and arguments, etc., as encapsulated in abstract form in instructions associated with each CLI.

The second way is to back into a collection of CLIs that compose a concept cloud by reading the functions (verbs), operators, and arguments (nouns) that compose, or would compose (in a pro forma construction of math that is then reverse-engineered), such an expression of mathematics, and then search for matching CLIs. The most advanced CLIs, or the CLIs with the highest degree of derivation (e.g., concepts comprised of concepts), what would often be headline concepts (perhaps with the lowest weight scores or perhaps the highest importance scores), would then point to appropriate RCCs (root concept clouds) to fill out the rest of the concept cloud.

As shown herein, instructions that are paired with CLIs of the ontology are the linchpins between the ontology and systems that embed the ontology at their core and function on the basis of its capabilities. In some embodiments, to efficiently develop instructions for written CLIs, it may be beneficial for mathematicians and data engineers to use a template (with occasional customizations to meet the requirements of certain concepts) as they extract the concepts in the OES environment and write the instructions for operational CLIs. Such templates may be most efficient when their design enables them to be assembled (i.e., linked together) to configure viable math problems.

It is also understood that some CLIs are not operational. In some examples of the system, the CLIs may include those that are operational (e.g., the half-angle formula), descriptive (e.g., how the memory capacity keeps track of previously counted objects and previously used fingers to count objects), or informative (e.g., the Latin root for the word "identity" is "idem"). In addition, some CLIs may be classified as "nice-to-know," as opposed to "important-to-know." Some nice-to-know concepts may be operational, and some important-to-know concepts may be descriptive. Within the systems and methods described herein, there may be advantages to categorizing CLIs according to whether they are operational and whether they are important-to-know.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method may be provided based on various combinations of the features and functions from the subject matter provided herein.

We claim:

1. A system for automatically distilling concepts from problems and dynamically constructing and testing the creation of problems from a collection of concepts comprising:
   one or more databases storing a plurality of concept line items (CLIs), wherein each CLI is an expression of a concept, and a set of interrelationships between each pair of CLIs, wherein the plurality of CLIs includes a minimum of 549 CLIs; and
   a processor in communication with the one or more databases, the processor including memory storing computer executable instructions such that, when the instructions are executed by the processor, they cause the processor to perform the steps of:
   a) providing a user interface to a user through which the user interacts with the system;
   b) receiving, as input, one or more of a sensory input, an expression, a math concept, a user data packet (UDP), wherein the UDP is a collection of attributes, properties, and variables that describe a skill set;
   c) analyzing the input in relation to each of the 549 CLIs and the set of interrelationships to identify which CLIs to use in dynamically constructing and testing problems;
   d) extracting and compiling a concept cloud of one or more of the plurality of CLIs where each of the CLIs to be used in dynamically constructing and testing problems is included in the concept cloud and each of the CLIs not to be used in dynamically constructing and testing problems is not included in the concept cloud;
   e) generating one or more problem building blocks from the concept cloud CLIs;
   f) applying a rules engine to the one or more problem building blocks to build one or more problems;
   g) returning to the user, through the user interface, the one or more problems built from the CLIs that define the concept cloud extracted from the input;
   h) receiving from the user, through the user interface, responses to the one or more problems; and
   i) iteratively one or more times, repeating steps (c)-(g) within a dynamic diagnostic exam process.

2. The system of claim 1 wherein, in the step of extracting and compiling the concept cloud, the processor parses the input into a machine readable expression including one or more components, and selects one or more CLIs based on their relationship to the parsed components, and compiles a collection of CLIs dependent from each of the selected one or more CLIs.

3. The system of claim 2 wherein the processor further compiles a collection of headline concepts from the one or more CLIs in the concept cloud.

4. The system of claim 1 wherein the set of interrelationships includes one or more of a prerequisite to another CLI, a dependency on another CLI, a lack of relationship to another CLI, an undefined relationship to another CLI, and a relationship to another CLI defined by another method.

5. The system of claim 4 wherein the one or more databases store the interrelationships between each pair of CLIs as a directed graph.

6. The system of claim 1 wherein the one or more math problems built from the CLIs that define the concept cloud extracted from the input are constrained in subject matter by the UDP.

7. The system of claim 1 wherein the input is related to the user or a group of users.

8. The system of claim 1 wherein the step of generating one or more math problem building blocks from the concept cloud CLIs includes incorporating one or more building blocks from a preexisting ontology.

9. The system of claim 1 wherein the step of applying the mathematical rules engine to the one or more math problem building blocks to build one or more additional math problems includes choosing a variable as a first building block.

10. The system of claim 9 wherein the step of applying the mathematical rules engine to the one or more math problem building blocks to build one or more additional math problems includes adding one or more operators to the left, right, both sides, or neither side of the variable.

11. The system of claim 10 wherein the step of applying the mathematical rules engine to the one or more math problem building blocks to build one or more additional math problems includes adding an expression including one or more of: one or more numbers; one or more variables; and one or more complex combinations of numbers, variables, and operators.

12. The system of claim 1 wherein the step of applying the mathematical rules engine to the one or more math problem building blocks to build one or more additional math problems includes solving the one or more additional math problems and discarding those that are invalid.

13. The system of claim 1 wherein the step of applying the mathematical rules engine to the one or more math problem building blocks to build one or more additional math problems includes solving the one or more additional math problems and discarding those that require CLIs not included in the UDP.

14. The system of claim 1 wherein when the instructions are executed by the processor, they cause the processor to further perform the steps of:
receiving a math problem solution through the user interface, wherein the math problem solution is incorrect;
in response to receiving the math problem solution, returning to the user, through the user interface, one or more additional math problems built from the CLIs that define the concept cloud of the math problem for which the math problem solution was received;
receive one or more solutions to the one or more additional math problems built from the CLIs that define the concept cloud of the math problem for which the math problem solution was received, wherein the one or more solutions include a subsequent incorrect solution; and
in response to the subsequent incorrect solution, returning to the user, through the user interface, one or more further additional math problems built from the CLIs that define the concept cloud of the subsequent math problem for which the subsequent incorrect solution was received.

15. The system of claim 14 wherein when the instructions are executed by the processor, they cause the processor to further perform the steps of:
transmitting an alert regarding the math problem solution;
dynamically generating a customized study and practice program related to the math problem solution; and
updating the UDP with respect to the math problem solution.

16. The system of claim 1 wherein information represented by the map of the skill set includes historical and current information.

17. The system of claim 16 wherein the information represented by the map of the skill set further includes projected information.

18. The system of claim 1 wherein the responses received from the user include a plurality of solution steps to one of the one or more math problems, and wherein the method comprises:
identifying a mistake in the plurality of solution steps;
identifying a CLI associated with the mistake;
identifying an antecedent CLI that is a prerequisite to the CLI associated with the mistake in the set of interrelationships;
generating additional math problem building blocks from the antecedent CLI;
applying the mathematical rules engine to the additional math problem building blocks to build a further math problem; and
returning to the user, through the user interface, the further math problem.

19. The system of claim 1 wherein the mathematical rules engine builds a first math problem and a second math problem, the first math problem being associated with a first concept cloud of CLIs, the second math problem being associated with a second concept cloud of CLIs, wherein the method comprises:
returning to the user, through the user interface, the first math problem and the second math problem built from the CLIs that define the concept cloud extracted from the input;
receiving from the user, through the user interface, a first response and a second response to the first math problem and the second math problem, respectively, the first response being correct and the second response being incorrect;
identifying commonalities and differences between the first concept cloud of CLIs and the second concept cloud of CLIs;
identifying CLIs associated with the differences between the first concept cloud of CLIs and the second concept cloud of CLIs;
generating one or more additional math problem building blocks from the CLIs associated with the differences;
applying the mathematical rules engine to the one or more additional math problem building blocks to build a third math problem; and
returning to the user, through the user interface, the third math problem.

* * * * *